(12) United States Patent
Savvides et al.

(10) Patent No.: US 9,922,256 B2
(45) Date of Patent: Mar. 20, 2018

(54) SUBJECT SENSING IN AN ENVIRONMENT

(75) Inventors: Andreas Savvides, Holliston, MA (US); Thiago Teixeira, San Francisco, CA (US)

(73) Assignee: YALE UNIVERSITY, New Haven, CT (US)

( * ) Notice: Subject to any disclaimer, the term of this patent is extended or adjusted under 35 U.S.C. 154(b) by 1030 days.

(21) Appl. No.: 14/130,298

(22) PCT Filed: Jul. 2, 2012

(86) PCT No.: PCT/US2012/045319
§ 371 (c)(1),
(2), (4) Date: Apr. 25, 2014

(87) PCT Pub. No.: WO2013/003860
PCT Pub. Date: Jan. 3, 2013

(65) Prior Publication Data
US 2014/0226855 A1      Aug. 14, 2014

Related U.S. Application Data

(60) Provisional application No. 61/503,032, filed on Jun. 30, 2011.

(51) Int. Cl.
*G06K 9/00* (2006.01)
*G06K 9/62* (2006.01)
(Continued)

(52) U.S. Cl.
CPC ....... *G06K 9/00771* (2013.01); *G06K 9/6277* (2013.01); *H04W 4/021* (2013.01); *H04W 4/206* (2013.01)

(58) Field of Classification Search
CPC . G06K 9/00771; G06K 9/6277; H04W 4/021; H04W 4/206
See application file for complete search history.

(56) References Cited

U.S. PATENT DOCUMENTS 7,505,607 B2 * 3/2009 Meunier ............ H04B 10/1149
348/154
2007/0031038 A1 * 2/2007 Curtner .............. G06K 9/00771
382/173
(Continued)

FOREIGN PATENT DOCUMENTS

WO    WO-2013/003860 A1    1/2013

OTHER PUBLICATIONS

K. Bernardin, A. Elbs, and R. Stiefelhagen. Multiple object tracking performance metrics and evaluation in a smart room environment. In IEEE (2006) (8 pages).
(Continued)

*Primary Examiner* — Amara Abdi
(74) *Attorney, Agent, or Firm* — Ballard Spahr LLP

(57) ABSTRACT

A multimodal sensor network is designed to extract a plurality of fundamental properties associated with subject sensing. In one aspect, such network can combine cameras distributed in an environment with inertial sensors available in subjects' wearable devices. The network can permit anonymous detection, counting, and localization of one or more subjects utilizing the cameras. In one aspect, by fusing such information with positional data from the inertial sensors contained or coupled to wearable devices associated with the one or more subjects, the network can track and can identify each subject carrying a wearable device functionally coupled to inertial sensor(s). In one aspect, the problem of subject sensing can be divided into two parts: (1) a detection, counting, and localization (DCL) layer and (2) a tracking and identification (TI) layer, wherein such layers can be implemented via simulations and a real sensor network deployment.

21 Claims, 37 Drawing Sheets

(51) Int. Cl.
*H04W 4/02* (2018.01)
*H04W 4/20* (2018.01)

(56) References Cited

U.S. PATENT DOCUMENTS

2007/0253596 A1* 11/2007 Murata ................ G06K 9/6203
382/103
2008/0118106 A1* 5/2008 Kilambi ............. G06K 9/00362
382/103
2010/0083169 A1 4/2010 Athsani et al.

OTHER PUBLICATIONS

J. E. A. Bertram and A. Ruina, Multiple walking speed-frequency relations are predicted by constrained optimization. Journal of Theoretical Biology, (2001) 209(4):445-453.
D. C. Brogan and N. L. Johnson. Realistic human walking paths. In IEEE CASA, (2003) (8 pages).
D. Schulz, D. Fox, and J. Hightower. People Tracking with Anonymous and ID-Sensors Using Rao-Blackwellised Particle Filters, In Proc. of the International Joint Conference on Artificial Intelligence IJCAI, (2003) (6 pages).
W. T. Willis, K. J. Ganley, and R. M. Herman. Fuel oxidation during human walking. Metabolism—Clinical and Experimental, (2005) pp. 793-799.
O. Cappe, E. Moulines, and T. Ryden, Inference in hidden Markov models, Springer Verlag, (2005) (entire book).
L. D. Stone, C. A. Barlow, and T. L. Corwin. Bayesian Multiple Target Tracking, Artech House Publishers, (1999) (entire book).
International Preliminary Report on Patentability dated Jan. 7, 2014 for International Application No. PCT/US2012/045319, which was filed on Jul. 2, 2012 and published as WO 2013/003860 on Jan. 3, 2013 (Inventor—Savvides; Applicant—Yale University) (7 pages).
International Search Report dated Oct. 19, 2012 for International Application No. PCT/US2012/045319, which was filed on Jul. 2, 2012 and published as WO 2013/003860 on Jan. 3, 2013 (Inventor—Savvides; Applicant—Yale University) (2 pages).
Written Opinion dated Oct. 19, 2012 for International Application No. PCT/US2012/045319, which was filed on Jul. 2, 2012 and published as WO 2013/003860 on Jan. 3, 2013 (Inventor—Savvides; Applicant—Yale University) (6 pages).

* cited by examiner

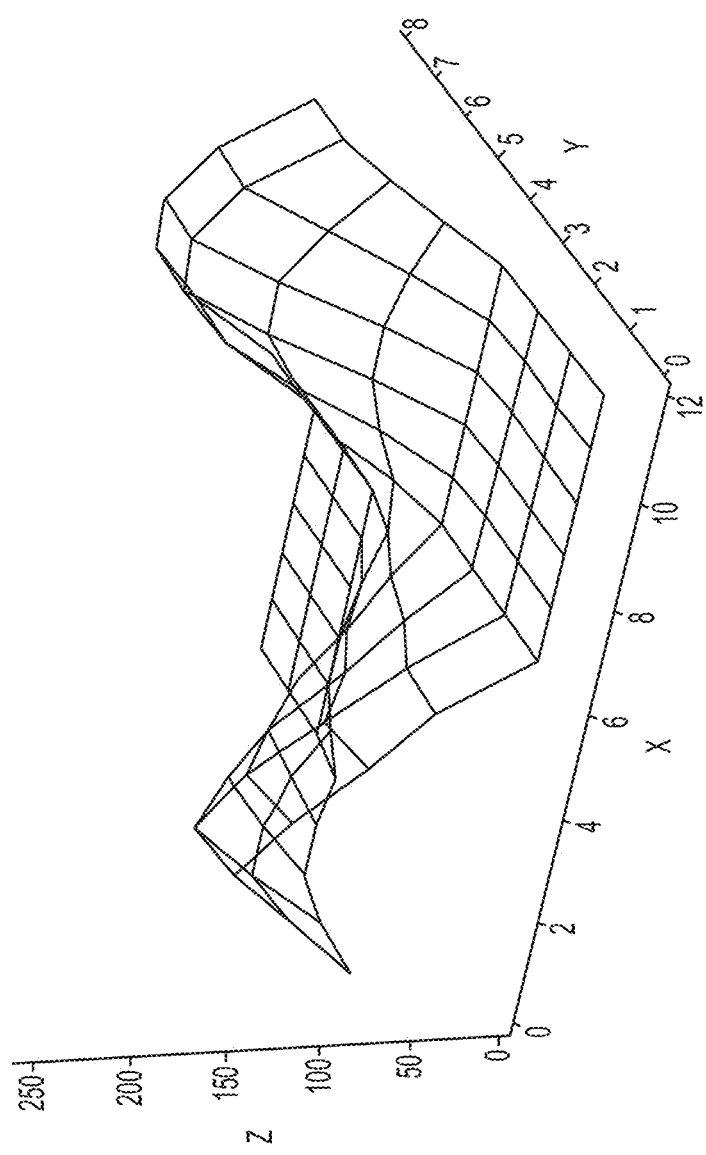

```
OnNewBooleanImage(I)
  for each b ∈ H
   ⌊ H(b) ← 0 for each (x, y) ∈ I
   │ if I(x, y) = 1
   │  │ for each {b ∈ H | (x, y) ∈ b}
   │  ⌊ ⌊ H(b) ← H(b) + 1
```

FIG. 8

SUBJECT SENSING IN AN ENVIRONMENT

CROSS REFERENCE TO RELATED PATENT APPLICATIONS

This application is a National Phase Application of International Application No. PCT/US2012/045319, filed Jul. 2, 2012, which claims priority to U.S. Patent Application No. 61/503,032, filed Jun. 30, 2011, both of which are incorporated herein fully by this reference.

STATEMENT REGARDING FEDERALLY SPONSORED RESEARCH

This invention was made with government support under 0622133 awarded by National Science Foundation. The government has certain rights in the invention.

SUMMARY

The disclosure relates, in one aspect, to sensing of subjects within an environment. The disclosure recognized that in tomorrow's smart and assistive environments it will be of utmost importance for computer systems to interact seamlessly with the people within them. Although the needs and design constraints of these environments are expected to vary greatly from application to application, the disclosure identifies five spatio-temporal properties stand out as fundamental to the human-sensing field: (1) human presence, (2) count, (3) location, (4) track (spatio-temporal history), and (5) identity. In one aspect, the disclosure provides a multimodal sensor network that is designed to extract these five fundamental properties. Such network can combine cameras scattered in an environment with inertial sensors (such as accelerometers and magnetometers) present in wearable devices coupled to at least some of the people that may be present in the environment. This allows it to anonymously detect, count, and localize people using the cameras, and by fusing this information with the data from the phone's sensors, it can also track and identify each person carrying a phone. The disclosure and related embodiments for subject sensing can divide the problem into two parts, a detection, counting, and localization (DCL) layer and the tracking and identification (TI) layer, which, in certain implementations, can be evaluated with extensive simulations and a real sensor network deployment.

While various features of the disclosure are illustrated for human sensing, the disclosure is not so limited and can be applied to sensing of subjects that are human or non-humans (e.g., animals or non-living entities, such as vehicles fitted with inertial sensors and related communication circuitry).

Additional aspects, features, or advantages of the subject disclosure will be set forth in part in the description which follows, and in part will be obvious from the description, or may be learned by practice of the subject disclosure. The advantages of the subject disclosure will be realized and attained by means of the elements and combinations particularly pointed out in the appended claims. It is to be understood that both the foregoing general description and the following detailed description are exemplary and explanatory only and are not restrictive of the subject disclosure.

BRIEF DESCRIPTION OF THE DRAWINGS

The accompanying drawings are incorporated and illustrate exemplary embodiment(s) of the subject disclosure and together with the description and claims appended hereto serve to explain various principles, features, or aspects of the subject disclosure.

FIG. 5B illustrates an example histogram resulting from the analysis performed in accordance with one or more aspects of the disclosure.

FIG. 8 illustrates pseudocode for an example histogram computation method in accordance with one or more aspects of the disclosure.

FIG. 12 illustrates static ambiguity, which can exist when using motion sensitive cameras: For instance, since a negative detection does not imply negative presence, it is not possible to tell whether or not one of the people was left behind, completely motionless.

DETAILED DESCRIPTION

Figure 1:
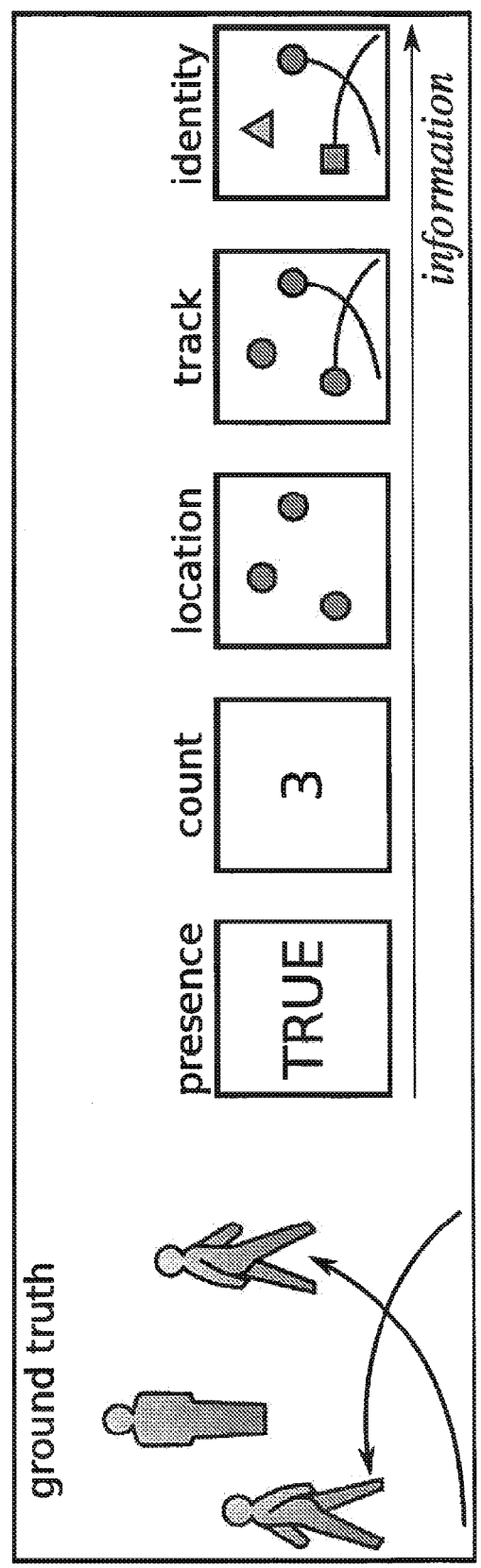
FIG. 1 illustrates five fundamental properties of human sensing in accordance with one or more aspects of the disclosure.

The subject disclosure may be understood more readily by reference to the following detailed description of exemplary embodiments of the subject disclosure and to the Figures and their previous and following description.

Before the present compounds, compositions, articles, systems, devices, and/or methods are disclosed and described, it is to be understood that the subject disclosure is not limited to specific systems and methods for subject sensing in an environment. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

In the subject specification and in the claims which follow, reference may be made to a number of terms which shall be defined to have the following meanings: "Optional" or "optionally" means that the subsequently described event or circumstance may or may not occur, and that the description includes instances where said event or circumstance occurs and instances where it does not.

As employed in this specification and annexed drawings, the terms "layer," "unit," "component," "interface," "system," "platform," and the like are intended to include a computer-related entity or an entity related to an operational apparatus with one or more specific functionalities, wherein the computer-related entity or the entity related to the operational apparatus can be either hardware, a combination of hardware and software, software, or software in execution. One or more of such entities are also referred to as "functional elements." As an example, a unit may be, but is not limited to being, a process running on a processor, a processor, an object, an executable computer program, a thread of execution, a program, a memory (e.g., a hard disc drive), and/or a computer. As another example, a unit can be an apparatus with specific functionality provided by mechanical parts operated by electric or electronic circuitry which is operated by a software or a firmware application executed by a processor, wherein the processor can be internal or external to the apparatus and executes at least a part of the software or firmware application. In addition or in the alternative, a unit can provide specific functionality based on physical structure or specific arrangement of hardware elements. As yet another example, a unit can be an apparatus that provides specific functionality through electronic functional elements without mechanical parts, the electronic functional elements can include a processor therein to execute software or firmware that provides at least in part the functionality of the electronic functional elements. An illustration of such apparatus can be control circuitry, such as a programmable logic controller. The foregoing example and related illustrations are but a few examples and are not intended to be limiting. Moreover, while such illustrations are presented for a unit, the foregoing examples also apply to a component, a system, a platform, and the like. It is noted that in certain embodiments, or in connection with certain aspects or features thereof, the terms "layer," "unit," "component," "system," "interface," "platform" can be utilized interchangeably.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Reference will now be made in detail to the various embodiment(s), aspects, and features of the disclosure, example(s) of which are illustrated in the accompanying drawings. Wherever possible, the same reference numbers are used throughout the drawings to refer to the same or like parts.

1. INTRODUCTION

From the moment of their inception, computers have become increasingly numerous and increasingly personal, to the point where billions of people around the world carry some form of computing device on themselves at most times of the day. One of the consequences of this trend is the extraordinary growth of person-centric services such as mapping, social networking, geo-tagging, to name a few, pointing to a future where people are as much the controllers of computers as they are part of the data itself, and where people interact with computers through everyday actions rather than explicit specialized commands.

To this end, computing devices are beginning to be instrumented with sensors of all kinds—such as cellular radios, WiFi radios, RFIDs, proximity sensors, light sensors, thermometers, accelerometers, magnetometers, gyroscopes, global positioning system (GPS) devices, microphones, cameras—all of which are routinely used to acquire some sort of information about a person. For instance, cameras in the environment may be used to capture a person's pose, and microphones to identify a person through their voice. However, in the realm of all information that is useful in subject-sensing (e.g., human-sensing) applications, five fundamental properties can be identified, such properties can make up the building blocks of the next generation of personalized services in view of their ubiquity. FIG. 1 illustrates a block diagram of such fundamental properties in accordance with one or more aspects of the disclosure. As illustrated, the five fundamental properties are the following:
(1) Presence—Is there at least one person present?
(2) Count—How many people are present?
(3) Location—Where is each person?
(4) Track—Where was this person before?
(5) Identity—Who is each person? Is this person John?

Upon or after one or more of these properties are defined, it is possible to state the Basic Human Sensing Problem in terms of extraction of such five fundamental properties from any choice of sensors, whether placed in the environment, or on each person, or a combination thereof.

Figure 2:
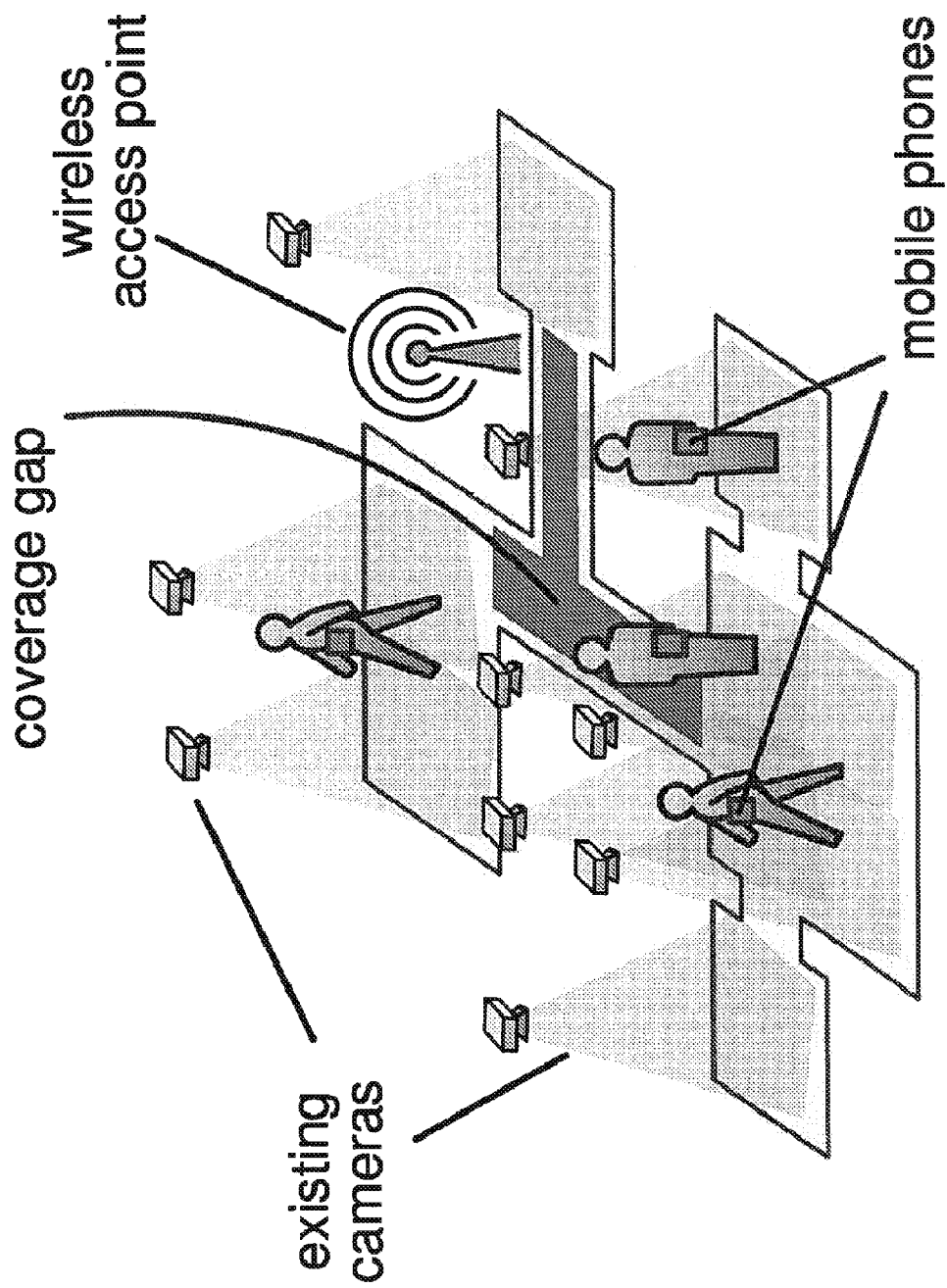
FIG. 2 illustrates an example system comprising a network of overhead cameras and inertial sensors in accordance with one or more aspects of the subject disclosure.

The disclosure provides, in one aspect, a system that can solve the basic human sensing problem by fusing data from a camera sensor network with data from inertial sensors (accelerometers and magnetometers) in mobile phones. This setup, as illustrated in FIG. 2, can leverage the closed camera television (CCTV) camera infrastructure that is already installed in many public spaces, as well as the millions of compatible smart phones already in use today. As such, one of the many advantages of the proposed system is its relatively low installation cost, through the reuse of a pre-existing hardware base.

In certain embodiments, using the camera infrastructure, each person moving in the environment can be detected and their location can be extracted. This provides us with the anonymous coordinates of each person, but cannot dependably associate these coordinates across timestamps to obtain each person's spatio-temporal history (e.g., track). Without wishing to be bound by theory, simulation, and/or modeling, it is believed the reason for this is the so-called Correspondence Problem from computer vision. This problem arises from ambiguous situations which lead to multiple competing track hypotheses. This happens, for instance, when a person is temporarily not detected due to a false negative, or when two people cross paths, or when a person leaves the scene and returns on the next day. In the worst case, when neither motion nor appearance models suffice to resolve the ambiguity, a person's correct track will be completely lost and can only be recovered by using some method of person-identification, such as biometrics.

The disclosed systems and methods for subject sensing can solve these issues by leveraging functionality and associated data of a wearable device (such as a mobile phone). In one aspect, the person's motion as observed locally by the mobile phone can be fused with the different people detected by the cameras in order to find the best match. In response to obtaining the persons' locations, such locations can be given by the camera measurements and their IDs can be given by the wearable devices.

It should be noted that although the disclosed systems and methods for human sensing can conform with existing camera network hardware, it is not necessarily bound by current hardware limitations such as high energy expenditure, high processing costs, and privacy invasiveness. Instead, in one aspect, the disclosed systems and methods for subject sensing are designed from the ground up to be compatible with novel low-power, privacy-preserving cameras that employ motion-sensitive imagers which are unable to take conventional pictures, and therefore can be used to preserve a great deal of the users' visual privacy. These cameras operate in a biologically-inspired manner, extracting visual features within each pixel's individual circuitry, and never transmit a full, privacy-invasive image off-chip.

Several aspects of the disclosure comprise:
(1) The derivation and characterization of a lightweight method for localizing people using overhead cameras. This method works with both conventional cameras and feature-detecting ones, and has already been implemented in low-power embedded systems and successfully field-tested in real-world home deployments.
(2) The derivation of a framework to identify people and bypass the Correspondence Problem through the use of simple wearable sensors. Through the combination of hidden Markov models (HMMs) and bipartite graph matching, this framework calculates the best match between each person detected with the camera network and measurements taken from mobile phones. This framework is general enough to apply to several combinations of sensor modalities, such as radars (instead of cameras) and RFIDs (instead of inertial sensors).

In the next section, related work and example aspects of how the disclosed system and methods for subject sensing can improve existing solutions. Then in Section 3 we outline our solution as the combination of two conceptual layers: (1) The DCL layer, which performs detection, counting, and localization of all people in an environment; And (2) the TI layer, which handles tracking and unique-identification. Several aspects of these two layers are described in Sections 4 and 5. Then, Section 6 describes example implementation details of our implementation, which is subsequently evaluated in Section 7 through extensive simulations and experiments. Finally, Section 8 discusses some advantages of the disclosure.

2. RELATED WORK

Most of the existing work in human sensing fall into one of two categories: instrumented and uninstrumented solutions. Approaches are classified as instrumented if they require each person to carry a device on them. In contrast, uninstrumented approaches are those that do not rely on any carried device, and are more suited to opportunistic use in public environments or even adversarial situations where people may be actively trying to fool the system.

Examples of uninstrumented human sensors include passive infrared (PIR) motion sensors, breakbeam sensors, radars, ladars, and cameras. Of these, scalar sensors such as PIRs and breakbeams are certainly the most ubiquitous. They are employed to turn lights on when people walk by and activate/deactivate devices when a person is present (such as faucets and elevator doors). Although PIRs and breakbeams are mostly used for presence detection, they have also been employed in localization and tracking research, albeit with limited spatial resolution or tracking accuracy. On the other side of the resolution/accuracy spectrum are cameras and scanning range-finders (e.g., radars, ladars, sonars). These are able to obtain either a 2D or 3D image of the environment, therefore providing higher spatial resolution than scalar sensors. In addition, a number of other properties can be extracted from the sensing domain (either the electromagnetic or acoustic domains) including color, texture, Doppler shift, and high-level features, all of which aid in the process of tracking and even allow for person-identification using biometrics.

An advantage of uninstrumented solutions is that they present a lower barrier-of-entry when used in public spaces. That is, in theory any person who enters the sensing area can be automatically detected by one or more uninstrumented sensors placed, for example, on the environment's infrastructure. While the clear advantage of this is that uninstrumented solutions are less cumbersome by nature, a disadvantage is that they are also potentially invasive to the users' privacies as they are given no chance to opt-out of being observed.

Among uninstrumented human-sensing solutions, those using cameras offer a number of advantages. Cameras are able to localize multiple people at a time with high accuracy, their large fields of view allow for relatively low-density networks, and they can additionally be used to detect poses and interactions of each person with the surrounding environment, objects, or other people. Besides, cameras are already widely deployed in a great number of public spaces. However, three main challenges still persist, not only for cameras but also other uninstrumented solutions:

(1) Presence detection—Although several methods exist for detecting people using cameras, they tend to rely heavily on the manual calibration of several scene-dependent parameters and heuristics, thus having a negative impact in time and cost of deployment. In addition, such parameters often have to be manually-tweaked online when the scene changes sufficiently, or the person-detector's performance will suffer over time.
(2) Tracking—When multiple people or large sensing gaps are involved, maintaining a consistent spatio-temporal history of each individual quickly becomes infeasible due to the Correspondence Problem. To give an idea of the magnitude of this issue, if all possible track hypotheses are equally considered, then the number of hypotheses grows with $N!^K$, where N is the number of people in the scene, and K the number of timesteps during which the people were tracked. Here, N and K are natural numbers greater than or equal to unity.
(3) Identification—Most importantly, current camera-based systems simply cannot be used to reliably identify people in most real-world scenarios due to factors such as sensitivity to different skin colors, inconsistent lighting, and partial occlusions. In addition, camera-based person-identification solutions frequently require a database containing each person to be detected, which must be set up a priori, and is prohibitive at large scales.

To remedy these issues, the disclosure recognizes that a viable tactic is to employ wearable devices having sensor(s) that can supply position information (e.g., data and/or metadata). By carrying wearable devices, people in the scene become cooperating agents within the system who simply broadcast their own identities through a wireless channel along with any other information that may help localize them. And if people wish to be left anonymous, they can always deactivate their wearable device (or wearable sensor at will. Furthermore, instrumented solutions typically offer higher spatial resolution than uninstrumented ones. Examples in the literature can comprise the several device-to-device ranging systems that exist, based on signal properties such as angle of arrival, signal strength, time difference of arrival, and Doppler shifts. Other instrumented approaches include environment recognition with cameras, ladars, or radios (e.g. WiFi fingerprinting), as well as dead-reckoning with inertial sensors.

In certain embodiments, device-to-device ranging can be best in terms of spatial resolution, achieving a precision in the order of a few centimeters, but requiring a relatively complex infrastructure in comparison. However, while simpler in terms of the required infrastructure, environment recognition and dead-reckoning approaches present their own glaring disadvantages: environment recognition requires a painstaking mapping process to take place a priori and may not respond well to temporal variations; and dead-reckoning famously leads to displacement measurements errors that quickly add up beyond repair.

The disclosure addresses such matters by providing a hybrid approach that incorporates advantages from both the instrumented and uninstrumented worlds, through sensor fusion. Certain conventional approaches can combine a laser ranging device with a dense network of infrared/ultrasound ID sensors and tags. Their formulation, like ours, is based on identifying anonymous location measurements by using ID-carrying measurements. However, our solutions deviate on at least four principal levels: (1) We consider the issue of identification separately from that of localization, which greatly reduces the state space of the problem. (2) This, when combined with our bipartite graph matching solution, allows our method to execute in real time, differently from their particle-filter approach. (3) In addition, as opposed to ours, the approach in [Schulz et al. 2003] cannot recover from losing the correct ID hypotheses. (4) And finally, while the implementation of their system would require the widespread installation of unorthodox sensors, we emphasize the pressing need to reuse existing infrastructure, by employing ubiquitous CCTV cameras and mobile phones. A high-level overview of the disclosed approach is presented in the following section.

3. OUTLINE OF EXEMPLARY SOLUTION

The disclosed systems and methods can solve the Basic Human Sensing Problem by dividing it into two parts, one purely uninstrumented and the other a combination of instrumented and uninstrumented: first, cameras placed in the environment are tasked with performing best-effort detection of presence, count, and locations; then, accelerometers and magnetometers on each person's mobile phones produce local measurements that let us track and identify all people while also correcting any of the best-effort detections if necessary.

Figure 3:
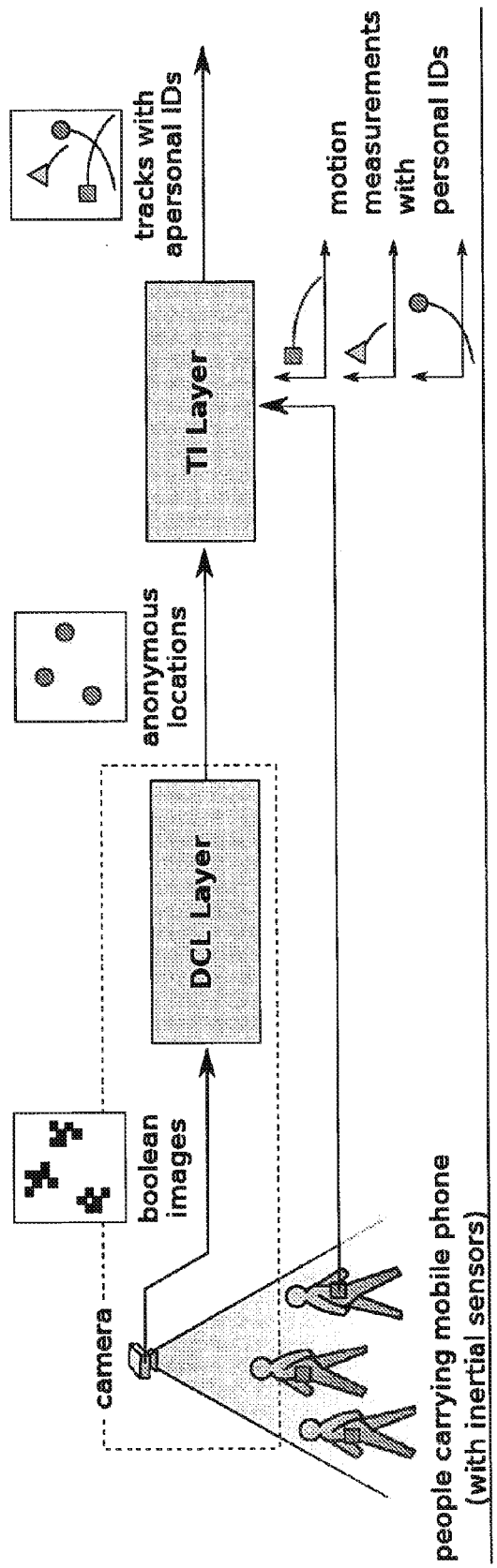
FIG. 3 illustrates an example technique for human sensing in which anonymous locations can be fused with ID-labeled motion measurements through a two-layer system in accordance with one or more aspects of the disclosure.

This setup, which is shown in FIG. 3, can be implemented, in one aspect, as two separate layers:

(1) The Detection, Counting, and Localization (DCL) Layer, which executes within the camera network, somewhere along the environment's infrastructure. The DCL layer takes as input image streams from the cameras and produces as its output the locations of each detected person, irrespective of whether they are carrying a mobile phone. The coordinates of all detected people are then broadcast over existing wireless channels (e.g., Wi-Fi) to be received by mobile phones in the area. It should be appreciated that, in one aspect, the disclosed systems and methods for human sensing utilize frame-differenced "temporal" images and therefore can detect the presence, count, and location of moving people. This aspect is addressed on the tracking and identification layer, which is also in charge of tracking and identifying all phone-carrying people.

(2) The Tracking and Identification (TI) Layer, operates partially within each mobile phone, and partially in the camera network. In one aspect, the TI layer can take the stream of location detections received from the wireless network and fuses them with inertial measurements extracted from mobile phones. The output of the TI layer can comprise locations-ID pairs representing each person carrying wearable devices (e.g., mobile phones), and simply locations (no IDs, for example) for people without phones, who therefore remain anonymous. Internally, in one aspect, each wearable device (e.g., a mobile phone) can compute a satisfactory (e.g., the best, the second best, or the like) ID-to-location match, and thus can produce an inference of the location of the wearable device. In addition or in the alternative, one or more of the wearable devices can transmit their local results back to the camera network, which can compute a global optimization for additional precision, and can retransmit them to the wearable devices in return. In another aspect, since each wearable device can carry a unique ID, if a person leaves the sensing area and returns after a certain period (e.g., few days), the person can be consistently assigned the same ID. Accordingly, the TI layer can resolve long spatiotemporal gaps in a seamless manner.

Figure 4:
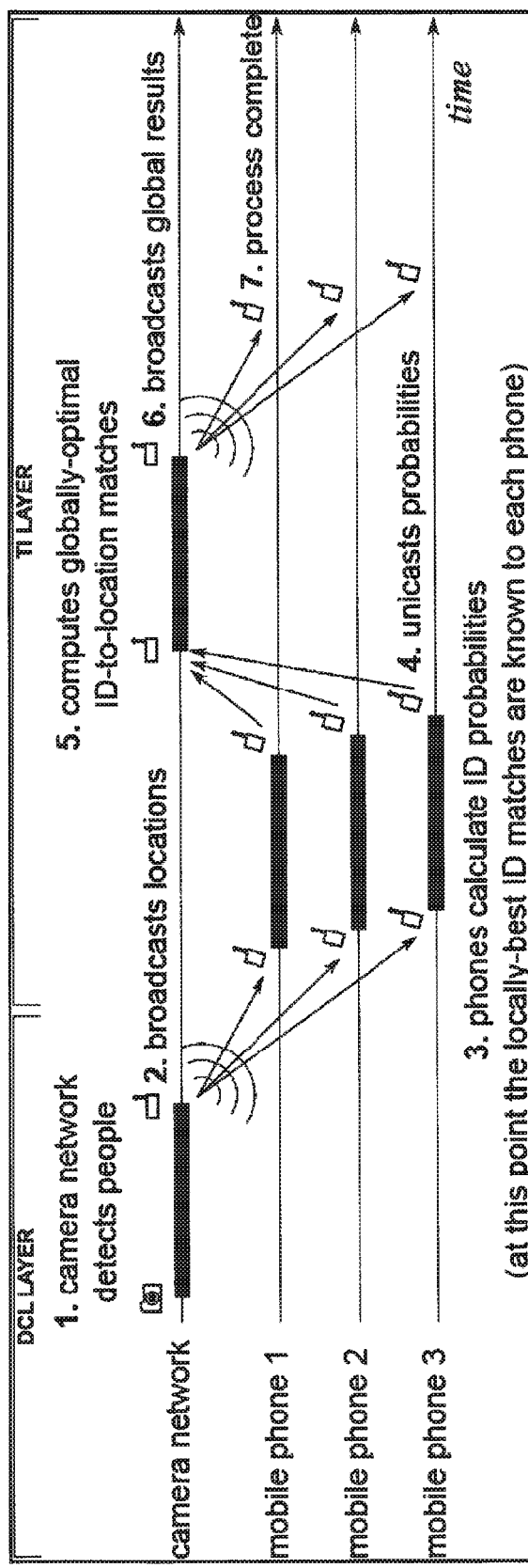
FIG. 4 illustrates a high-level timing diagram of an example technique for human-sensing in accordance with one or more aspects of the disclosure.

FIG. 4 illustrates a high-level timing diagram of the human sensing process in accordance with one or more aspects of the disclosure. In the disclosure, in certain embodiments, lower-level details such as handshaking protocols and timing/synchronization issues are abstracted for the sake of simplicity and such details would be understood by a person of ordinary skill in the art. In the next two sections, the DCL layer and the TI layer are described sin greater detail.

4. EXAMPLE ASPECTS OF THE DCL LAYER

In at least some of the disclosed systems and methods for human sensing, the anonymous detection, counting, and localization of people in the environment can be performed based at least on the sensory information generated by or extracted from the cameras alone. To at least such end, the DCL layer can extract the location of each person in the scene from an input stream of one or more Boolean images where pixels carry a value of 1 or 0 depending on whether or not they are believed to contain a person. There are various methods of obtaining such a Boolean image, but in our implementation this is done through a process known as frame differencing. Accordingly, in our case a value of 1 in the Boolean image can indicate that the corresponding pixel has experienced an above-threshold variation in value from the previous frame to the current frame.

The disclosure identifies addresses in this section the production of a Boolean image and the clustering of Boolean pixels into the groups representing the different people in the scene. Such clustering can be referred to as "segmentation".

It should be appreciated that, in contrast to most approaches from computer vision, the disclosed DCL layer can rely on a higher-level layer (e.g., the TI layer) that utilizes wearable devices (e.g., mobile phones) to correct errors that may occur in the DCL layer. As such, it is possible to make a few simplifying assumptions at this level so long as they lead to well-known and predictable errors. The assumptions that can be made include the following:

(1) People's sizes in different regions of the image are within known and predictable ranges. This example assumption is generally true is scenarios in which the environment geography is known a priori and the cameras are calibrated. In one embodiment, the cameras can be placed on the ceiling, facing down, to minimize occlusions. Accordingly, this requirement translates to knowing the ceiling height and ensuring a substantially planar floor. The same effect, however, can be achieved for cameras placed at traditional closed circuit television (CCTV) camera angles by performing a conventional camera calibration and registration procedures to fuse their information. Various conventional algorithm are available to produce a 2D top-view image from multiple side-view cameras.

(2) People are often in motion. It is readily apparent that even though this example assumption does not always hold, it certainly can be true for each person at some instant in time. Furthermore, the two predominant types of ambiguous situations that can arise in a scene can only occur in scenarios in which someone is moving (see, e.g., Section 6.2). Accordingly, moving states are, in one aspect, the most important ones to account for during tracking.

Relying on at least the foregoing two example assumptions, the DCL layer can solve the following more specific problem: to classify as a human each group of pixels that fulfills a specific movement criterion and/or size criterion, and to extract their discrete physical location from the measurements.

4.1 Example Issues with Existing Detectors

Commonly utilized methods to detect people using cameras fall into either the background subtraction or pattern recognition class. In one aspect, background subtraction is a methodology that can detect visual novelty from a scene by subtracting each current frame from a "background" image. The background image ideally can comprise a depiction of an empty environment, completely devoid of people. As the background scenery tends to change through time, the main challenges of background subtraction generally lie in obtaining the background image. To at least such end, various background modeling approaches exist. It should be appreciated that despite quality or refinement, a background modeling technique can often misclassify pixels in a variety of scenarios, due to a variety of factors, such as:

(1) natural oscillations in pixel intensity;
(2) changes in lighting (e.g., those imposed by shadows or the movement of the sun);
(3) presence of repetitive background motion (for example, waving foliage or other forms of dynamic foreground);
(4) sudden, unexpected changes in position of static objects in the scene; and
(5) similarity of pixels in foreground objects to pixels from the background.

In connection with scenario (4), most approaches either fail entirely or recover much too slowly thereupon. In addition, it should be appreciated that in numerous real-world situations, such scenario can occur prohibitively often. An example of such scenario can include an environment having one or more office chairs, which can be moved every time someone sits or stands up, and therefore at least one of the one or more chairs can be detected as "foreground" for long periods of time.

In response to such sudden and unexpected changes in scenery, the second class of human-detection methods, pattern recognition, can take a more direct approach to the problem by modeling not the background scenery but the people themselves. Thus, human models can be created by applying machine-learning procedures to images of people in a number of different poses, garments, and/or situations. In some scenarios, pattern-matching can be performed on very specific visual features rather than raw arrays of pixels. Examples of conventional features can comprise Scale Invariant Feature Transform (SIFT) and Histogram of Oriented Gradients (HoG). In addition, an example of an array-based approach is Principal Component Analysis.

It should be appreciated that pattern recognition can have several issues. One exemplary issue, at a practical level, is that pattern recognition can be a substantively more processor-intensive solution than background subtraction. Another exemplary issue is that in order to create the Boolean image from the pattern-similarities computed by pattern-recognition approaches one can rely on heuristically-selected thresholds. Such heuristics can change from one environment to another, or even one time instant to the next. As a direct consequence of this unpredictability, in one aspect, designers of computer vision systems generally elect to overestimate or underestimate the threshold value based on whether robustness is to be prioritized against false positives or false negatives, respectively.

4.2 Example Motion-Based Detector

To address at least some of the issues related to misdetections described herein, the DCL layer can be configured to produce a class of predictable misdetections that can be resolved at a later processing stage. In one aspect, the DCL layer can include a motion-based solution that fails to track a person whenever the person stops (e.g., high false negative rates), but that can detect moving people with high detection rates (e.g., low false positive rates). Then, at a later processing stage, within the TI layer, the false negatives produced by the DCL layer can be corrected by detecting stopped people through the motion measurements from wearable devices (e.g., mobile phones, wrist watches with wireless connectivity, or the like) associated with the people.

It should be appreciated that various conventional solutions use motion as a simple and efficient method to detect people, such solutions include several sensing modalities, such as PIRs and Doppler-shift sensors, and computer vision. In the subject disclosure, rather than expend valuable resources building a representation of the background or the foreground, frame differencing is utilized to classify all or substantially all pixels in the image into one of two groups: (A) pixels that have "moved", and (B) pixels that "stood still". In one aspect, such classification can be achieved by subtracting the current frame from the previous frame, in order to detect pixels that changed in intensity over time. In another aspect, the frame resulting from such subtraction can be subsequently thresholded (for example, using a calculated threshold), resulting in a Boolean image. This operation is robust in scenarios (1), (2), (5) and (4) from the Section 4.1, which we have found to be the most common in certain example embodiments or deployments of the disclosure. It should be appreciated that such motion-based detection can render unnecessary the complex modeling steps of background subtraction and/or pattern detection, thus freeing system resources. It should further be appreciated that a growing body of research is being dedicated to "smart cameras" that extract motion information at the hardware level, which can make motion an evermore attractive feature for fast, low-power scene understanding.

Figure 5A:
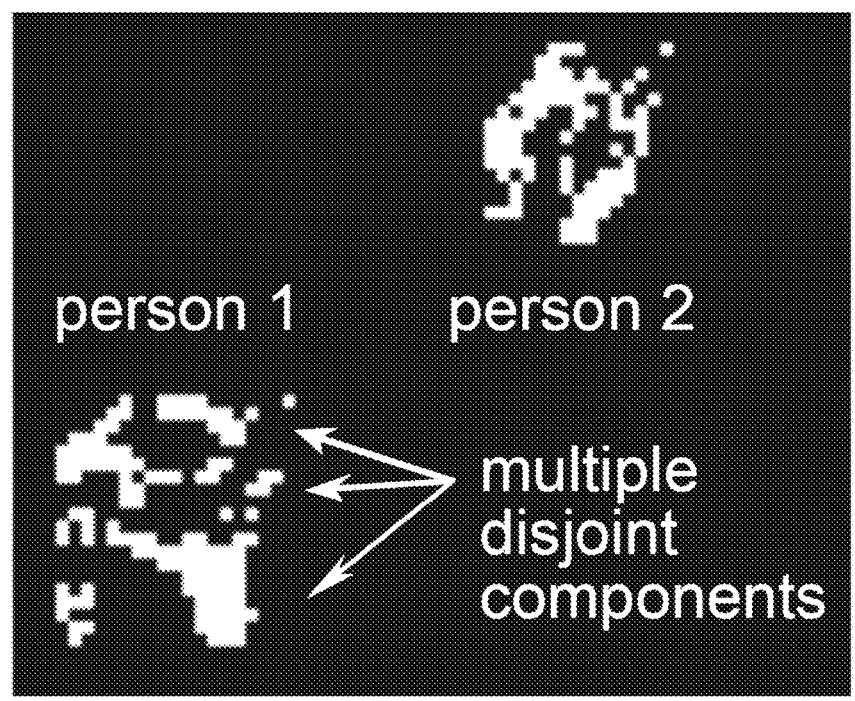
FIG. 5A illustrates Boolean pixels conveying each person in an environment as multiple disjoint components.

It should be appreciated that the disclosure successfully exploits frame difference in a manner that circumvents conventional issues available in conventional solutions that rely on frame differencing for person-detection in computer vision. Exemplary issues circumvented by the disclosure include the following. In one aspect, frame differencing often generates images that are harder to process using conventional segmentation methods such as connected component analysis. Such aspect is illustrated in FIG. 5A, in which the people are detected as several disjoint shapes in the frame-differenced image. In another aspect, estimating the location of people from frame-differenced images is, in itself, a biased process that necessarily results in localization errors approximately proportional to the person's speed. It should be appreciated that, as described herein, a feature associated with frame differencing is that people can only be detected while moving.

In the disclosed systems and methods for subject sensing (e.g., human sensing), the first issue can be solved by using a unique "likelihood histogram" segmentation method, whereas the third issue can be addressed by delegating the responsibility for handling non-moving people to the TI layer. It is noted that data demonstrate that the second issue may not be relevant in most situations, since the localization bias typically is in the order of a few centimeters.

4.3 Example Aspects of the Likelihood Histogram

In one aspect, the DCL layer can embody or can comprise a plug-and-play method for detecting, counting and/or localizing people. By plug-and-play, it is meant, in one aspect, that all parameters of our method can be derived using equations disclosed herein without manual intervention during processing of information associated with subject sensing in accordance with aspects described herein. In one implementation, such method can comprise the following blocks:

(1) Detection. In one aspect, at the pixel level, people can be detected by subtracting consecutive frames (e.g., frame differencing) and binarizing the result. Such detection can produce a Boolean image wherein a pixel having a value of 1 can represent a belief (or an assumption) that a moving object is present at such pixel.

(2) Counting. The pixels in a Boolean image that have a value of 1—which can be referred to as "ON" pixels) can be subdivided into N classes $S_{1:N}$, representing the N people present in a scene. Here, N is a natural number greater or equal than 1. It should be noted that differently from traditional segmentation approaches, in the subject disclosure, the classes $S_{1:N}$ may not be necessarily mutually exclusive. In one aspect, the same pixel may belong to more than one class of the N classes (in scenarios in which N>1).

The counting (or segmentating) step can comprise:
(a) building the likelihood histogram using the algorithm described next in this section; and
(b) finding the local maxima of the histogram. The image areas defined by such maximal bins can be the classes $S_n$ of the segmentation process.

(3) Localization. Finally, the centroid of each class is calculated, thus producing a location inference for each detected person. Centroids are calculated as the mean of the x and y components of the pixels in $S_n$ using the expression below:

$$\tilde{p}_c = \frac{1}{|S_n|} \sum_{(x,y) \in S_n} (x, y) \quad (1)$$

where $S_n \in S_{1:N}$. In one aspect, the centroid $\tilde{p}_c$ is an estimate of person p's true location in the image plane, e.g., their true centroid $p_c = (p_x, p_y)$.

Figure 6:
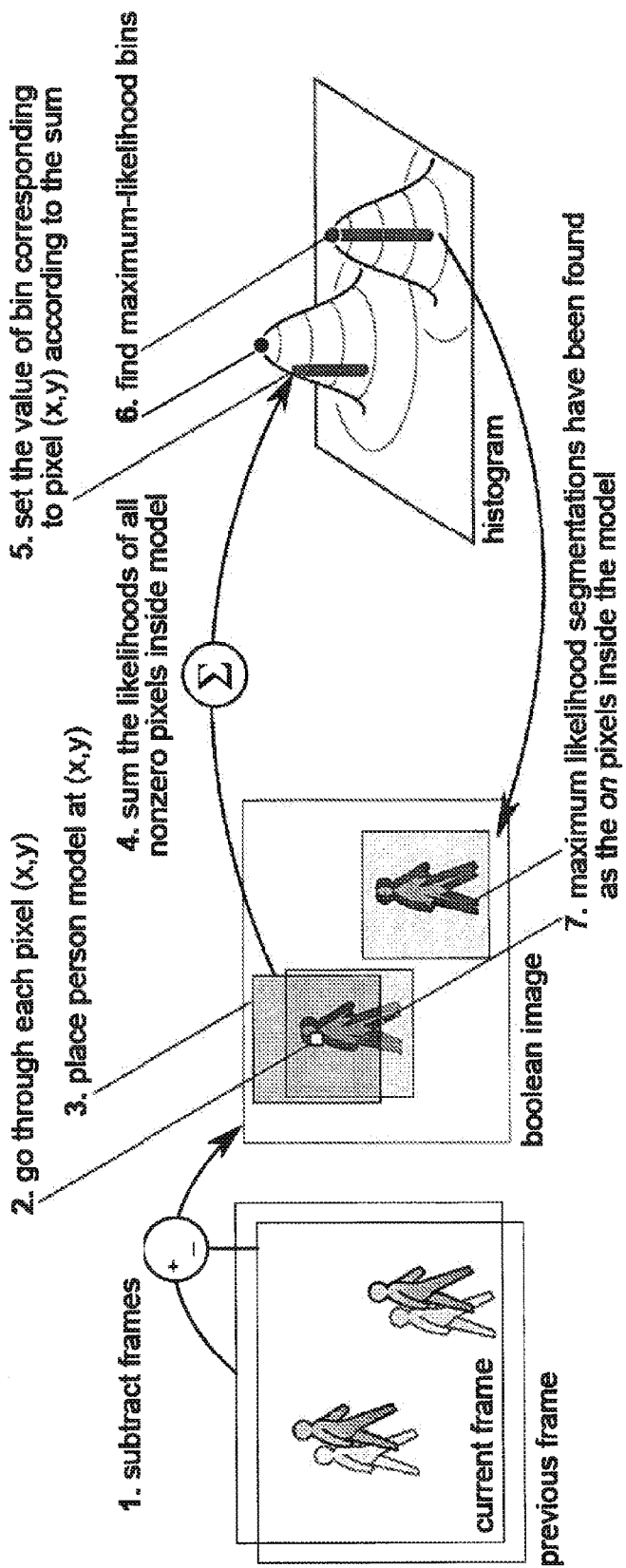
FIG. 6 illustrates an example DCL layer in accordance with one or more aspects of the disclosure.

This example process is illustrated in FIG. 6.

In one implementation, the detection step and localization step described herein can utilize standard techniques from computer vision. Namely, frame differencing and centroid calculation. As such, our main contribution in the DCL layer is the segmentation method from the counting step, which employs a likelihood histogram rather than, for instance, connected component analysis. The likelihood histogram is a simplification of the "pattern matching" class of approaches described earlier, highly adapted to our application, with well-defined guidelines for the selection of its few parameters. The likelihood histogram also can be referred to as the "motion histogram," in order to emphasize that we employ frame-differencing.

It should be appreciated that each pixel (x,y) with value 1 in the Boolean image represents a belief that part of a person is present at image coordinate (x,y). Then, and issue that can be addressed is that, given the beliefs represented by the set of pixels in the image, what are the most likely locations of the people in the scene?

Let $L(p_x, p_y|x,y)$ be the likelihood that a person's coordinates are $(p_x, p_y)$ given the knowledge that pixel (x,y) has value 1. Then, in scenarios in which such likelihood is given a priori, the overall likelihood that a person is located at $(p_x, p_y)$ can be obtained by summing over all pixels:

$$L(p_x, p_y) = \sum_{(x,y) \in I_{on}} L(p_x, p_y | x, y) I(x, y) \quad (2)$$

where I(x,y) is the value of pixel (x, y) in image I, and $I_{on}$ is the set of ON pixels (e.g., nonzero pixels) in the image I. Hence $I_{on} = \{(x,y) | I(x,y) = 1\}$.

The likelihood histogram H can be obtained by evaluating $L(p_x, p_y)$ at different pixel positions $(p_x, p_y)$. Thus, the maximum-likelihood estimate of the centroid of a person can be $$\underset{p_x, p_y}{\mathrm{argmax}} L(p_x, p_y) \quad (3)$$

Stated in alternative terms, people can be detected as peaks in the likelihood histogram. It should be appreciated that, in multiple-person scenarios, the argmax above may not be adequate as it produces only a single result. Accordingly, the argmax is redefined as a function that instead finds local maxima, using, for example, a square search window with side m.

Figure 7:
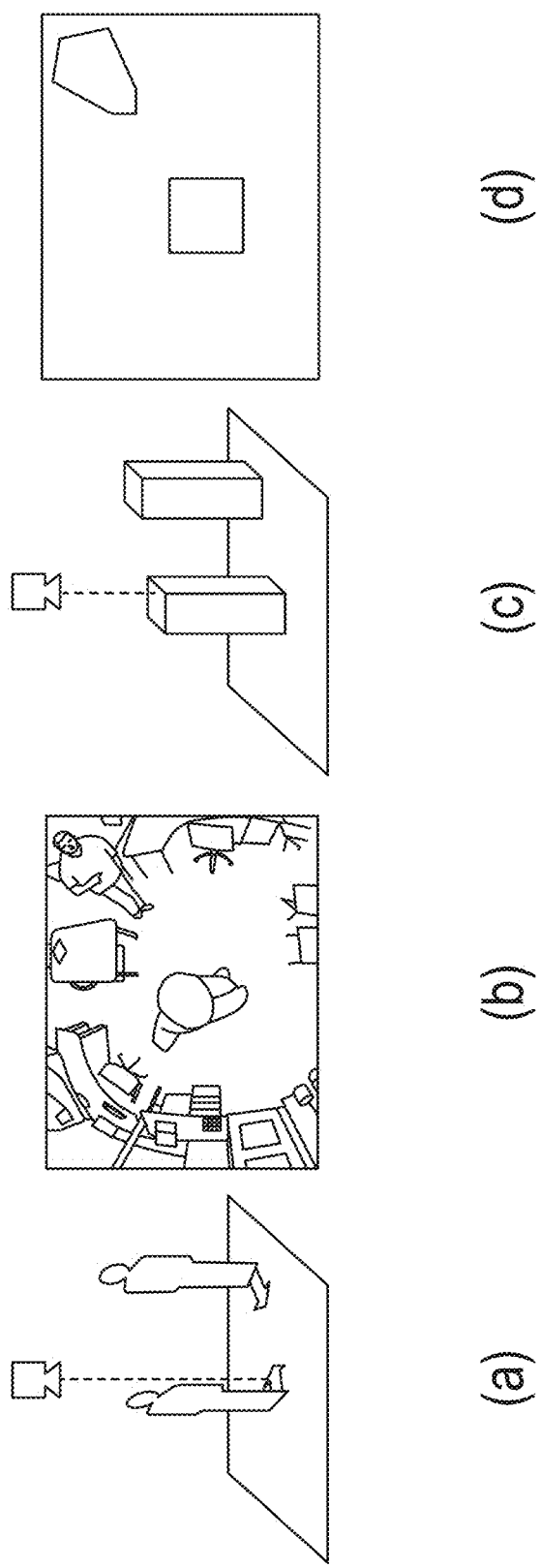
FIG. 7 illustrates the effect of perspective and lens distortion in accordance with one or more aspects of the disclosure: (a) Ground-truth positions of people in an example scenario. (b) Image from top-view camera. (c) 3D cuboid model used to approximate people's locations and size. (d) Location-variant likelihood function $L(p_x, p_y | x, y)$ obtained by projecting the cuboids onto the image plane.

It should be noted that by replacing $L(p_x, p_y|x, y)$ with a convolution kernel—and therefore turning $L(p_x, p_y|x, y)$ into $L(p_x, p_y)$, constant in x,y—, Eq. (2) can become a kernel density estimator (or KDE). It is noted that, in one aspect, a distinction between the disclosed likelihood function $L(p_x, p_y|x,y)$ and traditional estimation approaches such as KDE and Parzen windows is that such likelihood function can translate to different KDE kernels depending on the location of the pixel (x,y). Accordingly, the disclosed systems and methods for human sensing can account for different pixel likelihoods that may arise from perspective effects, as illustrated in FIG. 7, or from occlusions caused by static objects. Although in our previous work this has proven useful, In one embodiment, the likelihood $L(p_x, p_y|x,y)$ function can be simplified by modeling it as a uniform distribution over a square-shaped area with side length $b_w$. In certain embodiments, this can be equivalent to a KDE with a square kernel. Given that the cameras observe the people from the top, we find this to be a good approximation when they are close enough to the camera's axis. With such choice of $L(\cdot)$, applying Eq. (2) can become equivalent to counting the number of nonzero pixels lying within the square model. Thus, if some pixel (x,y) has value 1, the disclosed square-shaped model indicates the assumption that the true centroid ($p_x$, $p_y$) must fall within the $b_w \times b_w$ square centered around (x,y). Applying this square model to equation (2) we find that the value of each square bin b in the histogram H is simply the sum of all on pixels inside the bin's $b_w \times b_w$ square. The pseudocode for this process is shown in FIG. 8. As can be seen in the pseudocode, the process of filling the bins of the likelihood histogram with the appropriate likelihood values is, computationally, extremely simple. When using a more complex likelihood function L(•), speed gains can alternatively be attained through the use of SIMD (single-instruction multiple data) instructions present in GPUs, DSPs, and most consumer CPUs from the last decade, as they are especially well-suited for convolutions.

In ultra-low-power processors, if further speed enhancements are demanded one may introduce a "bin shift" parameter $b_\delta$, which alters the distance between successive placements of the model $L(p_x, p_y, |x, y)$, leading to spaces between the histogram bins, like is the case with Parzen windows. As a result, instead of sweeping the model over all pixels in the image (e.g., $b_\delta=1$), by setting $b_\delta>1$ the model is instead swept across the image in discretized steps of $b_\delta$ in both the vertical and horizontal directions.

An example of the output of the likelihood histogram algorithm is illustrated in FIG. 5B. In the figure, the process described herein was applied to a synthetic image of 80×60-pixel resolution, the same as the camera-nodes used in our evaluation. The histogram parameters used were $b_w=30$ pixels, $b_\delta=4$ pixels, and m=5 bins. Subfigure (a) shows a frame differenced image of two people walking, and the resulting histogram is shown in (b) correctly displaying two peaks, corresponding to the two detected people. The relatively low resolution of the histogram in the figure is a direct effect of the choice of $b_\delta$.

Figure 5C:
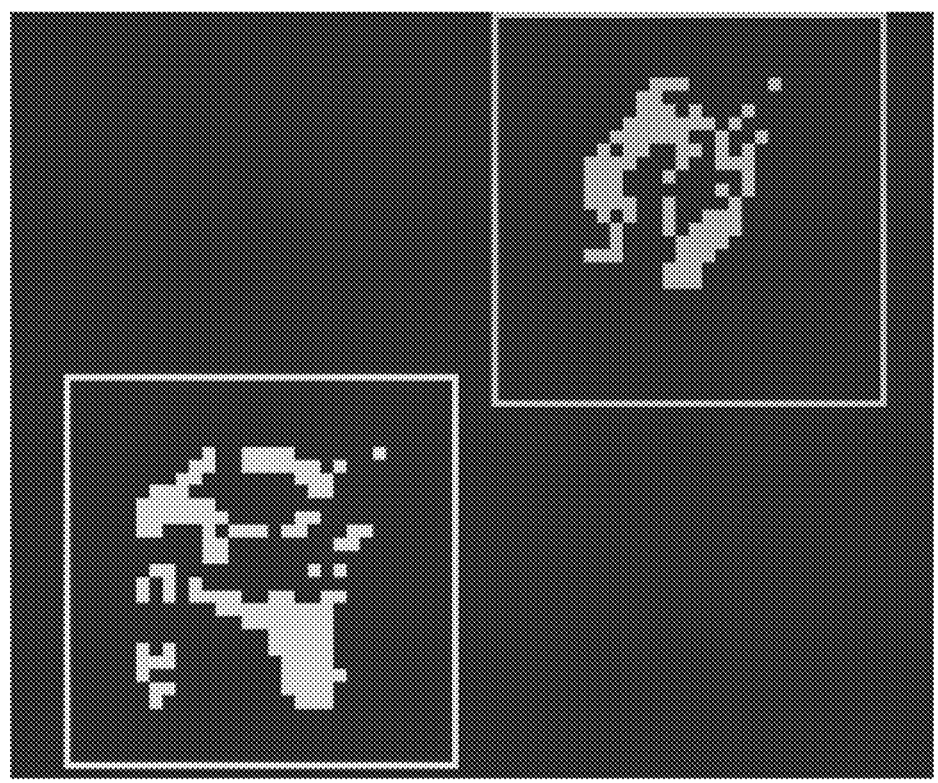
FIG. 5C illustrates segmentation utilizing histogram peaks (the ON pixels inside each square area are detected as belonging to the same person) in accordance with one or more aspects of the disclosure.

Then, as illustrated in FIG. 5C, the correct segmentation is found by mapping the local maxima at the two histogram peaks back to the image, then placing the model at the corresponding pixel. At that point, all ON pixels that fall within the model are marked as belonging to that person. Note that, as a side-effect, the same pixel may be classified as belonging to more than one person whenever two or more such models intersect. This is by design, to allow for denser arrangements of people than otherwise possible. For even more crowded scenarios, the histogram designer may employ better-fitting likelihood functions, such as with the cuboid model previously described (FIG. 7).

4.4 Histogram Parameters

In this section, the main modes of failure of the likelihood histogram are described, which can permit a derivation of the optimal histogram parameters to resolve these issues. For this, consider FIG. 9.

Figure 9:
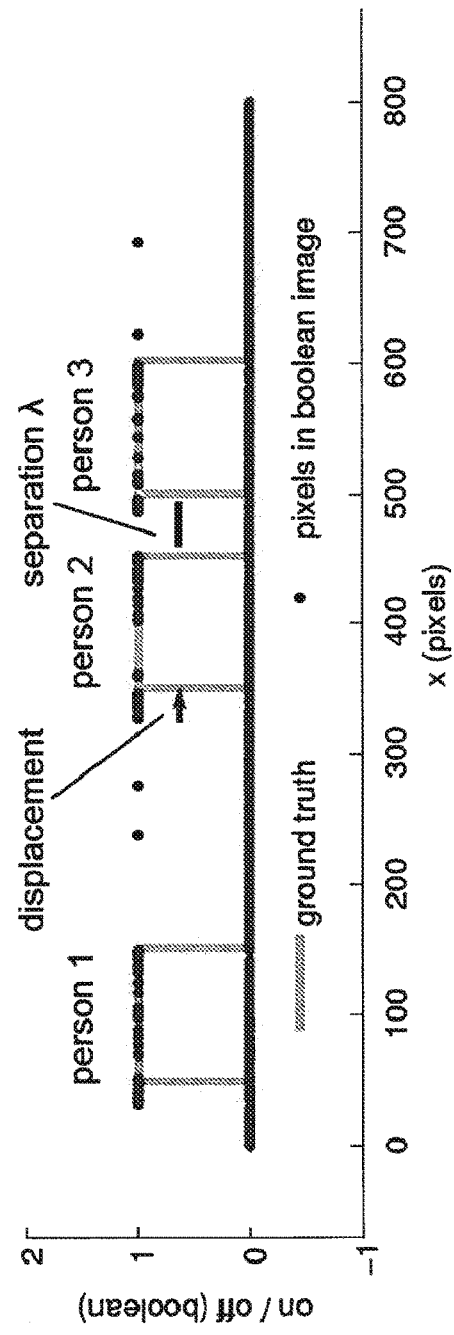
FIG. 9 illustrates the fact that that since frame differencing leads to a large number of ON pixels on the person's edges, whenever the histogram's parameters are not in the optimal or nearly optimal range several artifacts may appear. It should be appreciated that, as illustrated, Person 1 is incorrectly detected as two peaks in the histogram, and Person 2 and Person 3 as several peaks due to the constructive interference between their individual likelihood functions.
Figure 9:
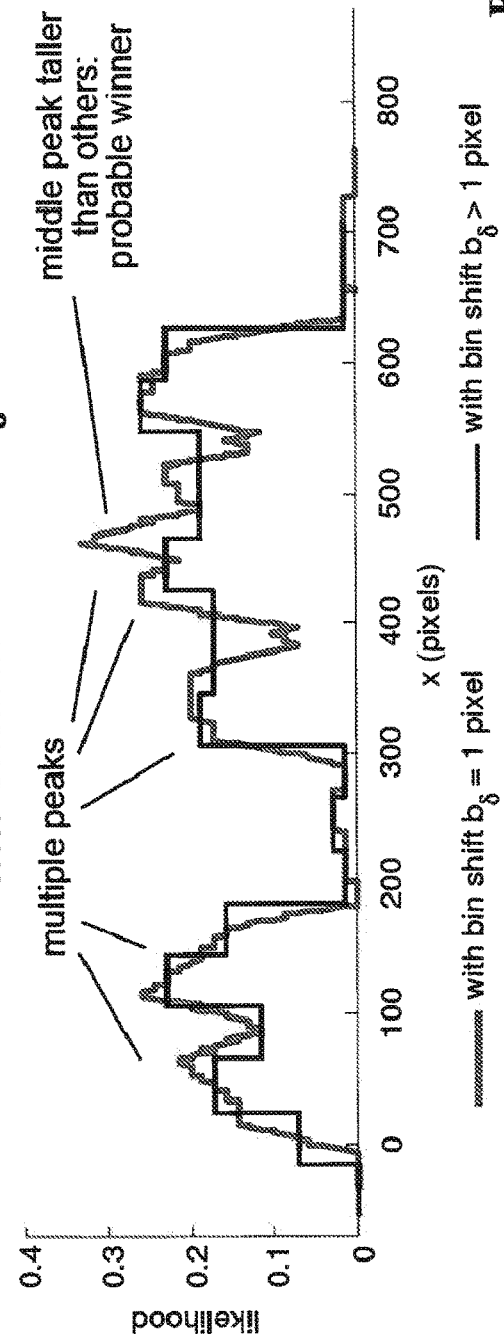

Assume for this section that people are shaped like circles with diameter $p_w$ (e.g., the person's "width"), and that between two consecutive frames people move from left to right with a displacement of $p_\delta$, so that the top plot in FIG. 9 would be an accurate representation of an image cross-section.

Then, as shown on the left side of FIG. 9, given incorrect parameters, a double-peak pattern may emerge from a single person, causing him/her to be detected twice. Similarly, if two people are close together (see persons 2 and 3 in the figure), it is possible that their likelihoods will constructively interfere with one another and lead to multiple peaks being formed, and therefore multiple erroneous detections being made. Alternatively, if the maxima search window m is large enough, it may occur, in certain scenarios, that the only peak that is detected for persons 2 and 3 is the tallest one (the center peak), causing the two people to be incorrectly detected as a single one.

In one aspect, to resolve the single-person error described above (e.g., "person 1" in FIG. 9), a scenario in which there is exactly one person in a scene can be contemplated. In such a scenario, a condition that may guarantee that the histogram produces exactly one peak is that the pixels containing the person in both this frame and the previous one (e.g., represented by $P_w + P_\delta$) are fully covered by the bin width, plus half the size of the maxima search window in the image (e.g., represented by $b_w + [m/2]b_\delta$):

$$b_w + \left\lfloor \frac{m}{2} \right\rfloor b_\delta \geq p_w + p_\delta \tag{4}$$

Similarly, in order to resolve the multi-person error shown for "person 2" and "person 3" in FIG. 9, in certain embodiments, the three following conditions must be satisfied substantially simultaneously:
(1) The bin width must be small enough to guarantee that the center peak is shorter than the left and right peak:

$$b_w < p_w + p_\delta + \lambda \tag{5}$$

where λ is the separation between the two people.
(2) When centered at the left or right peaks, the maxima search window must be large enough to contain the middle peak:

$$\frac{b_w}{2} + \left\lfloor \frac{m}{2} \right\rfloor b_\delta \geq \frac{p_w + p_\delta + \lambda}{2} \tag{6}$$

(3) When centered at the left peak, the maxima search window cannot be so large as to contain the right peak (and vice-versa):

$$\frac{b_w}{2} + \left\lfloor \frac{m}{2} \right\rfloor b_\delta < p_w + p_\delta + \lambda \tag{7}$$

In one aspect, assuming a worst-case scenario in which two people are separated by a distance of 0 (e.g., they are shoulder-to-shoulder, and therefore λ=0), we can combine equations (6) and (7) to obtain a bound for the window size and maxima search window:

$$\frac{p_w + p_\delta}{2} - \frac{b_w}{2} \leq \left\lfloor \frac{m}{2} \right\rfloor b_\delta < p_w + p_\delta - \frac{b_w}{2} \tag{8}$$

although a value closer to the lower bound may be preferable. Similarly, using Eq. (4) and Eq. (5), we find:

$$p_w + p_\delta - \left\lfloor \frac{m}{2} \right\rfloor b_\delta \leq b_w < p_w + p_\delta \tag{9}$$

It should be appreciated that this derivation assumes $p_w$ and $p_\delta$ are known and constant for all people at all times—which, in certain embodiments, is unrealistic since people's shapes and velocities are subject to variations. However, we find that replacing these constants with physically-meaningful approximations, comprising judicious estimates of the mean person width and the mean displacement, can produce good results.

That said, the procedure for selecting the best parameters for the histogram is as follows: first, let $b_w$ equal $p_w+p_s$ (which does not literally satisfy (9) but is a good approximation); then, let $b_\delta=1$ and choose $$\left\lfloor \frac{m}{2} \right\rfloor b_\delta$$

to satisfy the equations above; finally, test the algorithm's speed and slowly increase $b_\delta$ to increase its performance if necessary, all the while readjusting $$\left\lfloor \frac{m}{2} \right\rfloor$$

so that $$\left\lfloor \frac{m}{2} \right\rfloor b_\delta$$

remains constant. Using such values, it is possible to obtain demonstrably high degrees of accuracy as we show in Section 7.1.

5. EXAMPLE ASPECTS OF THE TI LAYER

As described herein, in certain embodiments, cameras can cheaply and unobtrusively detect and localize people within their field-of-view. However, since the identity of each person detected by a camera is not known, it becomes challenging to track people when there are path discontinuities (due to crossing, entering, leaving, clutter, occlusions, etc.). Indeed, the anonymity of a camera's detections also means people cannot be uniquely identified nor, equivalently, localized. To this end, we propose the use of motion measurements to uniquely identify each person, according to the following formulation sketch:
Given anonymous location measurements from a camera network, and inertial measurements (acceleration and direction) from mobile phones of known ID,
Find the (location, inertial) association pairs which maximize the likelihood that the measurement pair originated from the same person.

Figure 10:
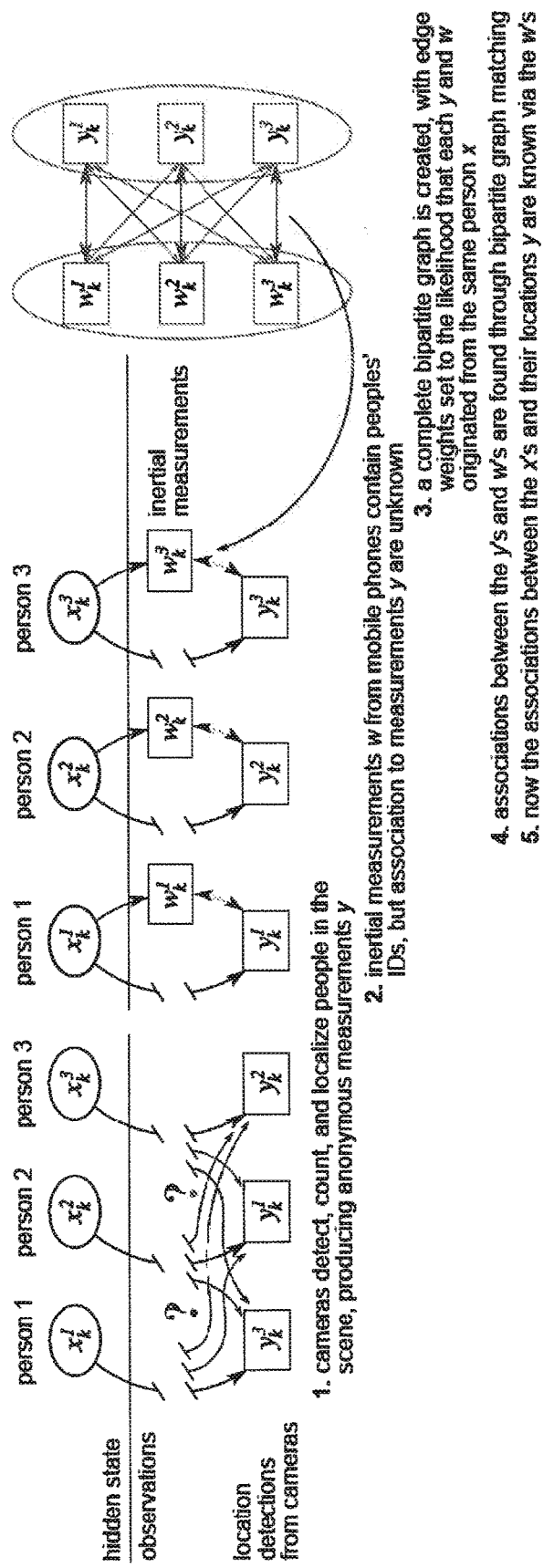
FIG. 10 illustrates an example concept of the disclosure: to use acceleration and magnetic field measurements from mobile phones (with known ID, for example) as a "glue" between the location-detections from a camera network and people's IDs. It is noted that the illustrated features correspond to the instantaneous case described herein, but the overall findings also can be applicable to the multiple-timestep case described herein.

We model this as a missing data problem where each person is observed twice: once from the viewpoint of the camera network, and once from the inertial sensors on the mobile phones. What makes this problem distinct from traditional missing data problems is that, in addition to unknown true states, we also lack knowledge regarding the data association of location observations. This is illustrated in FIG. 10.

Below we describe the problem within a more formal framework. In this discussion it is assumed that the extrinsic calibration parameters of the cameras have been computed a priori using one of several suitable methods, and thus camera placement is known.

Suppose a number of people are present within the sensor network's coverage area at timestep k. Let person is true state at k be represented by the variable $x_k^i$. In one implementation, $x_k^i$ can comprise four components having x, y position coordinates, acceleration magnitude and acceleration direction. Nevertheless, the derivation that follows applies to any other state definition. It should be appreciated that the letter x is utilized herein to differentiate this state variable from the variable p from the DCL layer, although both represent the ground-truth values of some phenomenon related to a person.

We consider the evolution of $x_k^i$ in discrete time to be indexed by the nonzero natural numbers, $k \in \mathbb{N}^*$. Since it is widely accepted that human motion can be approximated by a Markov process, we assume $x_{k-1}^i$ is sufficient to predict $x_k^i$.

Let $\beta_k \in \mathbb{N}$ be the number of people detected with the camera network at time k. Then we can denote a detection instance by $y_k^j$ (where j is in the set $\{1, 2, \ldots, \beta_k\}$, or, more compactly, $1:\beta_k$). The set of all people detected at timestep k is, then, written as $y_k^{1:\beta}$ although when the context is unambiguous we drop the subscripts and superscripts to reduce clutter. Assuming additive noise, we can write:

$$y_k^j = x_k^i + v_k^i \text{ for some } i \quad (10)$$

where $v_k^i$ is the measurement noise. Since the location detections are anonymously detected, the mapping between indices i and j is unknown. In fact, this is what we aim to infer.

Applying a similar formulation to the mobile phone measurements, if a person is known to be carrying phone i, then the person's motion is recorded with inertial measurements $w_k^i$:

$$w_k^i = x_k^i + \epsilon_k^i \quad (11)$$

where $\epsilon_k^i$ is the measurement noise, which is independent of $v_k^i$. Note that the same index i is used to specify both the person's true state and the person's phone. For now we make no assumptions regarding the probability distributions of the v's and $\epsilon$'s, but in our implementation these will be modeled as Gaussian, which simplifies our likelihood calculation. This agrees with the observed values of the noise, as well as with the Central Limit Theorem of probability.

Figure 11:
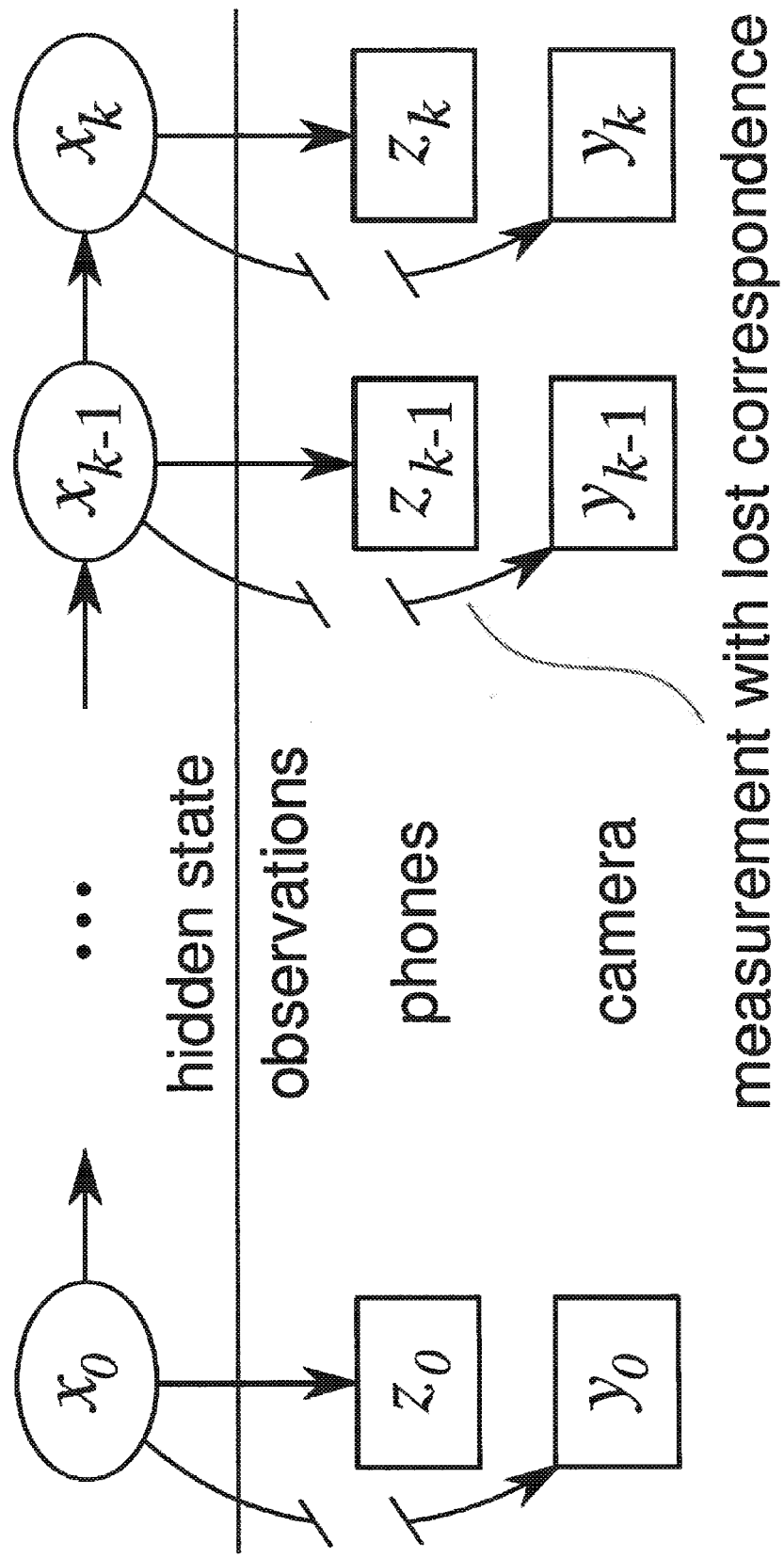
FIG. 11 illustrates an example independence diagram of relating the variables that pertain to the same person in accordance with one or more aspects. Broken arrows are utilized to indicate that the camera observations do not carry the person's ID.

The relationship between a person's x, y and w is shown in FIG. 11. As portrayed in the figure, the x's and w's form a hidden Markov model (HMM) with observations $\{w_k^i\}k=1:K$ (from mobile phones) that are conditioned on states $\{x_k^i\}k=1:K\bullet$. In the subject disclosure, the generalized definition of hidden Markov models is utilized in [Cappé et al. 2005] has been adopted. Such definition permits incorporation of continuous state spaces. In multiple person scenarios, several such HMMs will coexist, each indexed by a distinct i. What is atypical in our problem is the existence of a second set of HMM-like structures whose observations $\{y_k^j\}k=1:K$, despite being conditioned on some state $\{x_k^i\}k=1:K$, do not carry the implicit information of which state they are conditioned upon (that is, which i goes with which j). When multiple people are present, the indices of their detected locations will be shuffled. Then, person-localization will depend on unshuffling these indices to assign IDs to each anonymous detection from the camera. This is equivalent to discovering the association matrix M for the bipartite graph shown on the right side of FIG. 10.

In view of at least the foregoing, the subject sensing problem can be stated as follows:
Identification Problem
Given: location detections $y_k^j$ (from a camera network, for example) and inertial measurements $w_k^i$ (from mobile phones, for example)
Find: the $\gamma \times \beta$ match matrix $M_k$ that assigns each $w_k^i$ to at most one $y_k^j$ with maximum global probability over all timesteps k=1:K.

where $\gamma \in N$ is the number of people equipped with a wearable device (e.g., a mobile phone) having an inertial sensor. The matrix M is such that $M_k^{ij} \in \{0,1\}$ and $M_k^{ij}=1$ if and only if detection j is identified as person i. This implies $\Sigma_{\forall i} M_k^{ij} \in \{0,1\}$ and $\Sigma_{\forall j} M_k^{ij} \in \{0,1\}$, that is, the rows and columns contain at most one 1.

Note that in this system the terms "localization" and "identification" become duals of one another: when an ID i is assigned to a detection $y_k^j$, such $y_k^j$, is referred to as being identified, and the person i is referred to as having been localized. Also note that any solution to the identification problem necessarily solves the Correspondence Problem (e.g., tracking) in the process, since each person becomes consistently labeled with their real-world ID.

This section is divided into two parts. First, the foundation of the disclosed methods is demonstrated by considering only the information from a single timestep. Then, the Markov assumption is utilized to derive a more precise ID inference by considering all past timesteps.

5.1 Optimal Instantaneous ID Assignments

From equations (10) and (11), it is readily apparent that there exists a statistical dependence between the y and w that belong to the same person. This can be easily quantified by subtracting the two equations:

$$y_k^j = w_k^i + (v_k^j - \epsilon_k^i) \quad (12)$$

It should be appreciated that one objective of the disclosure can be, in one aspect, to infer which combinations of i, j best follow the above equation, that is, which (y, w)-pairs display the tightest statistical dependence.

From (10) and (11) it follows that if the probability distributions of v and e are known, then so are the emission probabilities $p(y_k^i|x_k^i)$ and $p(w_k^i|x_k^i)$. Then, the likelihood that $y_k^j$ and $w_k^i$ were emitted from the same $x_k^i$ (no matter the actual value of $x_k^i$, for example) can be found by marginalizing $x_k^i$:

$$L(y_k^j, w_k^i) = \int p(x_k^i, y_k^j, w_k^i) dx_k^i \quad (13)$$

$$= \int p(y_k^j|w_k^i, x_k^i) p(w_k^i|x_k^i) p(x_k^i) dx_k^i \quad (14)$$

$$= \int p(y_k^j|x_k^i) p(w_k^i|x_k^i) p(x_k^i) dx_k^i \quad (15)$$

where the last equality arises from the conditional independence of $y_k^j$ and $w_k^i$ given $x_k^i$. In addition, if the prior of $x_k^i$ is uniformly distributed, then the term $p(x_k^i)$ can be cancelled out without adverse effects.

By calculating the likelihood in (15) over all combinations of inertial nodes and detections, we obtain a likelihood matrix $\Omega_k$:

$$\Omega_k = \begin{bmatrix} L(y_k^1, w_k^1) & L(y_k^2, w_k^1) & \ldots & L(y_k^{\beta_k}, w_k^1) \\ L(y_k^1, w_k^2) & L(y_k^2, w_k^2) & \ldots & L(y_k^{\beta_k}, w_k^2) \\ \vdots & \vdots & \ddots & \vdots \\ L(y_k^1, w_k^\gamma) & L(y_k^2, w_k^\gamma) & \ldots & L(y_k^{\beta_k}, w_k^\gamma) \end{bmatrix} \quad (16)$$

The likelihoods in $\Omega_k$ constitute the edge weights in the bipartite graph from FIG. 10. The most likely global ID assignments are, then, the ones that maximize the joint likelihood, as found using the following optimization:

$$\operatorname*{argmax}_M \prod_{i \in 1:\gamma} \prod_{j \in 1:\beta_k} \Omega_k^{ij} M^{ij} \bigg| \quad (17)$$

In order to increase robustness against false positives, and to provision for people that are not carrying phones, we set $\Omega_k^{ij}$ to 0 if it is below some threshold $\Omega_{min}$.

The optimization in (17) can be efficiently solved (in polynomial time) using the Hungarian assignment algorithm, as is common in the computer vision arts. In one aspect, prior to that, it can be necessary to convert the multiplications into summations by using log-probabilities.

5.2 Maximum a Posteriori Estimate

The disclosed hidden Markov model formulation (FIG. 11) hints that a more precise estimate can be found by following the evolutions of w, y and x through all timesteps $k \in 1:K$. For this, let us consider $x_{1:K}$, $w_{1:K}$ and $y_{1:K}^{j_1:K} y_{1:K}^{j_1:K}$, where the latter is a track obtained by associating multiple consecutive location-detections:

$$y_{1:K}^{j_1:K} = (y_1^{j_1}, y_2^{j_2}, \ldots, y_K^{j_K}) \quad (18)$$

with $j_k \in 1:\beta_k$.

In the single-timestep case from the previous section, we marginalized x to compute the emission probability for each y, w given a common x. In the multiple-timestep case, this would translate to marginalizing $x_{1:K}^i$ and computing all possible combinations of $w_{1:K}^i$ and $y_{1:K}^{j_1:K}$ through a long set of nested integrals. This, however, is not feasible, also because the rank of the space of all possible tracks is exponentially large. It should be appreciated that assuming, for illustration purposes, that the number of people detected by the camera network is known to be constant and equal to $\beta_k = \beta_2$, then the number of possible tracks during $k \in 1:K$ is $\beta^K$. If, additionally, people are allowed to enter or leave at any timestep, then the exponent gains a factorial function, and the number becomes $\beta^{K!}$ [Stone et al. 1999]. Hence, to marginalize $x_{1:K}^i$ it may be necessary, in one aspect, to solve $\beta^{K!}$ K-variable integrals! Clearly, this situation quickly becomes unmanageable.

Rather than marginalize the multiple-timestep hidden state, our solution is to recursively compute what would be the maximum a posteriori (MAP) estimate $\bar{x}_K^i$ of $x_K^i$ if a given pair of y and w did indeed originate from the same person. We, then, use $p(\bar{x})$ to quantify the likelihood of our assumption, and generate a likelihood matrix much like (16).

For this, let $\theta_K^h$ compactly denote a track hypothesis, such that $\theta_K^h = y_{1:K}^{j_1:K} = \{y_1^{j_1}, y_2^{j_2}, \ldots, y_K^{j_K}\}$. Then $\theta_K = (\theta_K^{h_1}, \theta_K^{h_2}, \ldots, \theta_K^{h_{\gamma_K}})$ is the set of all track hypotheses up to frame K. Then we can calculate the following joint probability:

$$p(x_{1:K}^i, \theta_K^h, w_{1:K}^i) = p(x_{1:K}^i, \theta_K^h) p(w_{1:K}^i|x_{1:K}^i, \theta_K^h) \quad (19)$$

$$= p(x_{1:K}^i, \theta_K^h) p(w_{1:K}^i|x_{1:K}^i) \quad (20)$$

$$= p(x_{1:K}^i) p(\theta_K^h|x_{1:K}^i) p(w_{1:K}^i|x_{1:K}^i) \quad (21)$$

$$= p(x_1^i) \prod_{k=2:K} p(x_k^i|x_{k-1}^i) \quad (22)$$

$$\prod_{k=1:K} p(y_k^{j_k}|x_k^i) p(w_k^i|x_k^i)$$

-continued $$= p(x_K^i | x_{K-1}^i) p(y_K^{jK} | x_K^i) p(w_K^i | x_K^i) \times \quad (23)$$

$$p(x_1^i) \prod_{k=2:K-1} p(x_k^i | x_{k-1}^i)$$

$$\prod_{k=1:K-1} p(y_k^{jk} | x_k^i) p(w_k^i | x_k^i)$$

$$= p(x_K^i | x_{K-1}^i) p(y_K^{jK} | x_K^i) p(w_K^i | x_K^i) \times \quad (24)$$

$$p(x_{1:K-1}^i, \theta_{K-1}^h, w_{1:K-1}^j)$$

where (20) arises from the conditional independence of w,y given x, and (22) from the Markov assumption.

Then we may use (24) to derive the MAP estimate $\bar{x}_K^i$ of the latest hidden state ($x_k$):

$$\hat{x}_K^i = \underset{x_K^i}{\operatorname{argmax}} p(x_K^i | x_{K-1}^i, \theta_K^h, w_{1:K}^j) \quad (25)$$

$$= \underset{x_K^i}{\operatorname{argmax}} p(x_{1:K}^i, \theta_K^h, w_{1:K}^j) / p(x_{1:K-1}^i, \theta_K^h, w_{1:K}^j) \quad (26)$$

$$= \underset{x_K^i}{\operatorname{argmax}} p(x_{1:K}^i, \theta_K^h, w_{1:K}^j) \quad (27)$$

$$= \underset{x_K^i}{\operatorname{argmax}} p(x_K^i | x_{K-1}^i) p(y_k^{jk} | x_k^i) p(w_K^i | x_K^i) \times \quad (28)$$

$$\times p(x_{1:K-1}^i, \theta_{K-1}^h, w_{1:K-1}^j)$$

where the denominator in (26) was cancelled out as it did not change the result of the maximization. With this, the likelihood that all y and w originated from a given sequence of $\hat{x}$'s is simply:

$$L_{MAP}(\theta_K^h, w_{1:K}^j) = p(\hat{x}_{1:K}^i, \theta_K^h, w_{1:K}^j) \quad (29)$$

$$= p(\hat{x}_K^i | \hat{x}_{K-1}^i) p(y_k^{jk} | \hat{x}_k^i) p(w_K^i | \hat{x}_K^i) \times \quad (30)$$

$$\times p(\hat{x}_{1:K-1}^i, \theta_{K-1}^h, w_{1:K-1}^j)$$

As it was done in Eq. (16) for the single-timestep case, the edge weights of the bipartite graph in FIG. 10 can be assigned by setting $$\Omega_K^{ih} = [L_{MAP}(\theta_K^h, w_{1:K}^i)]^{\forall i,h} \quad (31)$$

It should be noted that the matrix $\Omega_k$ considers only the track hypotheses that are still "alive" at time K (e.g., the ones that contain an endpoint in K) rather than all tracks from 1:K. The solution to the multiple-timestep identification problem can, then, be found as the match matrix M that maximizes the global probability:

$$\underset{M}{\operatorname{argmax}} \prod_{i \in 1:y} \prod_{h \in 1:\zeta_k} \Omega_K^{ih} M^{ih} \quad (32)$$

Returning to the physical context of the disclosure, each wearable device (e.g., a mobile phone) can locally generate its own row in Ω from the broadcast position measurements. At that point, the locally-best solution for each wearable device (e.g., mobile phone) is simply the maximum of that row. However, without inter-communication, multiple wearable devices (e.g., mobile phones) may end up selecting the same coordinates as their location, which may lead to conflict. In one aspect, such conflict can be resolved by transmitting each locally calculated row back to a central location to piece together the likelihood matrix Ω, with which the optimization in Eq. (32) may be performed.

It should be appreciated that the central part of this derivation, equation (24), is a recursive relation. Such recursive aspect can permit efficient computation of the MAP estimate and its likelihood at each new timestep by simply multiplying the previous value with the latest transition and emission probabilities.

6. EXAMPLE IMPLEMENTATION

Several aspects of an example implementation are described hereinbelow.

6.1 Simplified Tracking

The output of the DCL layer contains two types of correspondence ambiguities that must be resolved by the TI layer. In this subsection we consider the first type, which we call proximity ambiguities A proximity ambiguity is the event that two or more people occupy the same approximate location, so that the TI layer may end up confusing them. For example, in FIG. 12a two people meet for 5 s and quickly separate, leaving it up to the tracker to decide how to connect the pre-ambiguity track segments with the post-ambiguity measurements (e.g., the Correspondence Problem). In many cases, even a 5-second ambiguity can lead to thousands of track hypotheses being generated (with the upper bound being $\zeta_k = 2^{5a \times 30}$Hz track hypotheses, where 30 Hz is the camera's sampling rate). In certain embodiments, a large number of track hypotheses may be problematic, because the innermost multiplication in Eq. (32) iterates over the set of all track hypotheses, thus leading to high computational complexity.

In one aspect, making any decision about track correspondence can be postponed until the very end of an ambiguity, so that the $\zeta_k$ for FIG. 12a is reduced to merely $2^2=4$ track hypotheses. The use of such a lazy tracking method is generally risky, as it increases the chances of dropping the correct track from the set of all track hypotheses φ. Yet, since the disclosed system does not rely only on temporal queues to maintain track consistency—in fact, we mainly use the ID/motion information from the mobile phones for this—the assignment of the correct ID hypothesis does not rely on the φ's but on the w's instead. Hence, we can use this lazy tracking in the TI layer without noticeable loss of precision.

6.2 Handling Stopping

Figure 12:
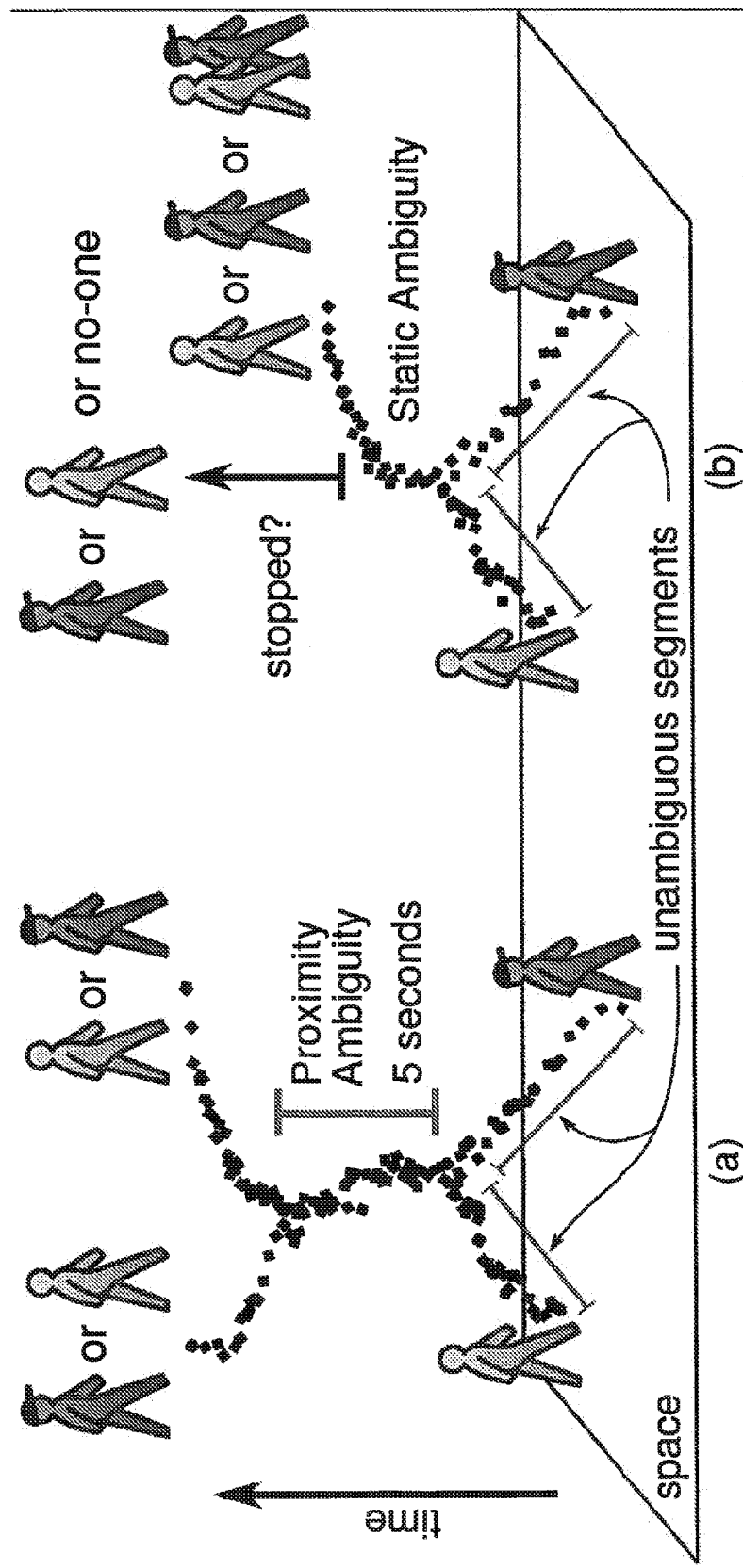
FIG. 12 illustrates (a) proximity ambiguity in accordance with one or more aspects of the disclosure: Two people approach one another, talk for a few seconds, for example, then resume moving. It should be appreciated that in certain embodiments, it is not possible to disambiguate the tracks based on motion alone, even if the system is able to detect stopped people. In panel (b)

The second type of tracking ambiguity experienced by the TI layer can comprise static ambiguities. These take place when two or more people cross paths and at least one of them stops moving, as shown in FIG. 12, panel (b). In response to such event, the stopped person "disappears" from the set of detections $\{y_K^j\}j=\beta_K$ of the DCL layer. This is illustrated in FIG. 12, wherein immediately after the meeting time, three hypotheses exist: (i) either both people have moved together, (ii) "Person 1" walked away while "Person 2" stayed still at the meeting place, or (iii) "Person 2" was the one who walked away.

In one embodiment, leverage the motion measurements from the accelerometers can be leveraged to identify or detect which person stopped. It should be appreciated that such identification or detection cannot be performed using cameras only. With this information, the TI layer can mark (or otherwise tag or identify) the person as "stopped" and extend the person's track through time, thus bypassing the issue of static ambiguities altogether.

6.3 State and Observation Variables

The derivation in Section 5 is discussed using the state variable x and observations y, w in a rather generic manner, without going into much detail about their internal components. As such, here we describe how these variables were implemented in our simulations and experiments:

The hidden state, $x^j_K$, is a vector with the following components: $s_x, s_y, |\ddot{s}|_{base\ 2}, \ddot{s}_{yaw}$. These are the person's location (x,y coordinates), motion status (walking or stopped), and absolute motion direction (an angle). In addition, the person's ID is implicitly given by the superscript index i. Note that we employ a binary motion status $|\ddot{s}|_{base\ 2}$ rather than the continuous acceleration itself $|\ddot{s}|$. This is because we found in our experiments that people generally walk in piecewise segments of nearly-constant speed, which makes the use of non-binary motion sensing largely superfluous. This agrees with the literature on human locomotion [Willis et al. 2005] [Brogan and Johnson 2003], where it is found that walking paths are mostly linear and at a piecewise constant preferred walking speed [Bertram and Ruina 2001].

The observation of each person as detected by the camera network, represented by $y^j_k$, carries the same components as the hidden state defined above: The location component is simply a centroid detected by the DCL layer, while the motion status and motion direction are found from the magnitude and phase of the person's acceleration vector (obtained by double-integrating the position measurements). Of course, as stated throughout the paper, in this case the superscript index j of the $y^j_k$'s have no connection with the person's real-world ID.

Finally, the inner components of the inertial measurements $w^i_k$ are much like the x's and y's above except that they carry no information regarding the person's location. Therefore, the w are comprised solely of motion status and motion direction. As these are obtained from a wearable sensor, however, the ID i of the inertial measurements is implicitly present in the w's in the form of their superscripts.

Figure 13:
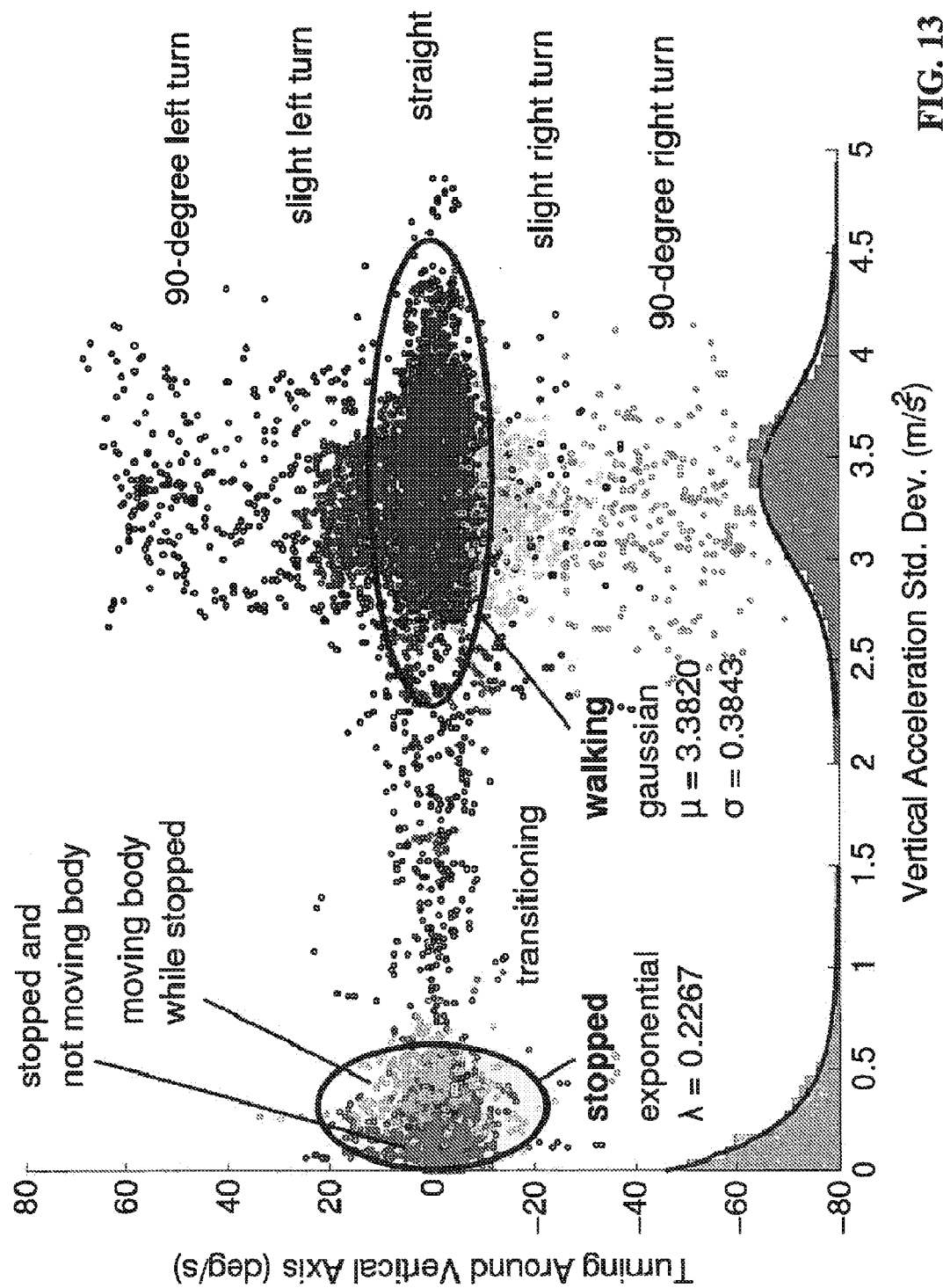
FIG. 13 illustrates an example dataset used for training the classification of "walking" versus "stopped" in accordance with one or more aspects of the disclosure.

For the w's, the motion status ('walking' or 'stopped') can be found by measuring the amount of vertical bobbing observed by the wearable accelerometer. For this, a training dataset (shown in FIG. 13) can be acquired, and the 'walking' and 'stopped' classes can be fit to a Gaussian and exponential distribution, respectively. We have found that the same distribution parameters can be used for different people without any noticeable loss in precision. This can permit to infer the binary motion state at run time from a simple likelihood ratio test. In addition, the direction component can be calculated using basic trigonometry on the magnetometer's 3D magnetic field measurements.

6.4 Obtaining the Required Probability Distributions

In one embodiment, the three key pieces of information that must be known a priori for the HMM in Section 5, e.g., the emission probabilities $p(y^i_k|x^i_k), p(w^i_k|x^i_k)$, and the transmission probability $p(x^i_k|x^i_{k-1})$, were heuristically estimated from a set of simple experiments. In such experiments, a person carrying an inertial measurement unit (IMU) walked aimlessly in the field-of-view of a USB camera for about 10 times, for a duration of 1 minute each time. The "ground-truth" measurements (the x's) were calculated from the videos themselves using traditional computer vision techniques that were customized (e.g., hand-tuned) for the occasion, and whose errors were manually corrected where appropriate. In one aspect, the three probability distributions were coarsely estimated by fitting the experimentally-observed frequencies with common probability distributions. For instance, the fits shown in FIG. 13 that were utilized for the stopping/walking binarization were also employed as the emission probabilities for the IMU's motion status. Similar procedures were applied to the other two components (e.g., location and direction).

6.5 Maxima Calculation

Given that the PDFs in equation (24) can get very complex very quickly, in our implementation we numerically approximate the argmax in (28) through Monte Carlo sampling. This is the same approach that has been recently popularized by particle filters (PFs), except in our case we do not propagate particles into the next timestep. Instead, only the argmax's of local track hypotheses are ever propagated (e.g., a single value per i,j combination) and then combined into global hypotheses at each frame with the bipartite graph matching in equation (28). Compared to other authors' PFs [Schulz et al. 2003], where each particle represents a different global hypothesis, not only is our approach much faster but it also guarantees that the correct i,j combinations are never dropped from the set of hypotheses (which may occur in the resampling stage of PFs). Thus, our system may always recover from temporary misidentifications.

6.6 Sensor Limitations and Assumptions

One issue we have observed in our real-world deployments of the DCL layer, is that cameras can often suffer from under- and over-exposure problems such as when a dark indoor scene contains a bright sunny window. In our solution, we ignore this sort of adverse effect by assuming that the cameras are placed in such a way that bright windows and doors are not present in their fields of view, or that the cameras' image sensors have a high dynamic-range.

Similarly, on the wearable sensor side, magnetic readings can be affected by the presence of metal or ferromagnetic objects in a room. Although in our experience this unwanted effect has not been noticeable, it can be corrected (up to a point) by constructing a priori a map of the environment's magnetic fields. A similar process is already done behind the scenes in many mobile phones to account for deviations in the Earth's magnetic field using the World Magnetic Model produced by the U.S. National Geospatial-Intelligence Agency.

7. EXAMPLE EVALUATION OF DCL LAYER AND TI LAYER

In one embodiment, the DCL and TI layers through a number of simulations and experiments. For this, two performance metrics can be employed:
(1) Multiple-Object Tracking Accuracy (MOTA), defined as $$MOTA = 1 - \frac{\sum_{\forall k}(m_k + fp_k + mme_k)}{\sum_{\forall k} g_k} = \frac{\sum_{\forall k} \text{correct identifications in } k}{\sum_{\forall k} \text{number of objects in } k} \quad (33)$$

Where $m_k$, $fp_k$, and $mme_k$ are the number of misses, false positives, and mismatches for time frame k, and $g_k$ is the number of objects in k (all using the original paper's notation). Thus MOTA can be used as a measure of how accurate the tracking/identification attempts are. A main difference between MOTA and the classic precision/recall metrics is that MOTA considers the output of the system at all moments in time, rather than solely the final inference. This allows it to catch even momentary variations in accuracy, giving a good picture of the real-time performance of the system.

(2) Multiple-Object Tracking Precision (MOTP), the second metric proposed by Bernardin et al., is defined by them as $$MOTP = \frac{\sum_{\forall i,k} d_{i,k}}{\sum_{\forall k} c_k} = \frac{\sum_{\forall i,k} \text{localization error for detection } i \text{ in frame } k}{\sum_{\forall k} \text{number of identifications in } k} \quad (34)$$

where the localization error is measured using $d_{i,k} = [(s_x^{dct} - s_x^{gt})^2 + (s_y^{dct} - s_y^{gt})^2]^{1/2}$. That is to say, in the authors' notation the MOTP can comprise the norm of the vector difference between the person's detected location ($s_x^{dct}$, $s_y^{dct}$) and the ground truth location ($s_x^{gt}$, $s_y^{gt}$) This translates to $d_{i,k} = \|p_c - \bar{p}_c\|$ in our notation. The MOTP is, therefore, used for measuring the average spatial precision of the location estimates.

Described hereinafter is the evaluation of the DCL layer, where the applicable metric is the MOTP. Then, in Section 7.2 the accuracy of the TI layer is evaluated using the MOTA metric.

7.1 Example DCL Layer Evaluation

Figure 14:
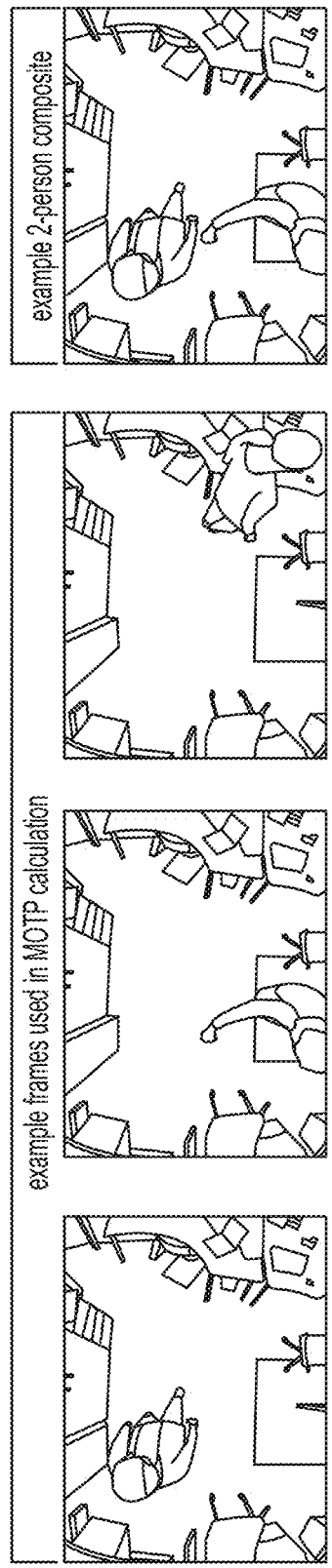
FIG. 14 illustrates three frames from different single-person data traces (used to calculate the MOTP) (left panel), and a sample frame of one of the 2-person composites used to evaluate the segmentation process and histogram parameters (right panel) in accordance with one or more aspects of the disclosure.

In one aspect, for the evaluation of the DCL layer, a single person was filmed from a top-view camera for 10 runs of approximately 1 minute each. The person walked in different unscripted paths for each run. The camera was equipped with a wide-angle lens, and mounted on the lab ceiling, at a height of 2.1 m. The full videos produced by the camera was saved in a computer through USB. The images were down-sampled to 160 pixels×120 pixels to conserve processing time, given that in this section each frame was processed for several hundred different parameter variations. In these conditions, the side of the bounding of around a person at the center of the image typically lies in the 40 px-35 px range. FIG. 14 shows some sample frames from these videos. Note that although the USB camera was set to stream video at 30 Hz, the captured file contained duplicates of every frame, and many frames were even present in triplicate! And so, in order to properly evaluate this data all repeated frames were removed prior to any computation, resulting in a frame-rate between 10 Hz and 15 Hz.

In order to calculate the MOTP, one must compare against the ground truth data each localization inference made by the DCL layer. In this evaluation, our ground truth trace is obtained by processing the image sequences using a carefully-tuned background subtraction process, followed by the usual centroid computation procedure.

Figure 15A:
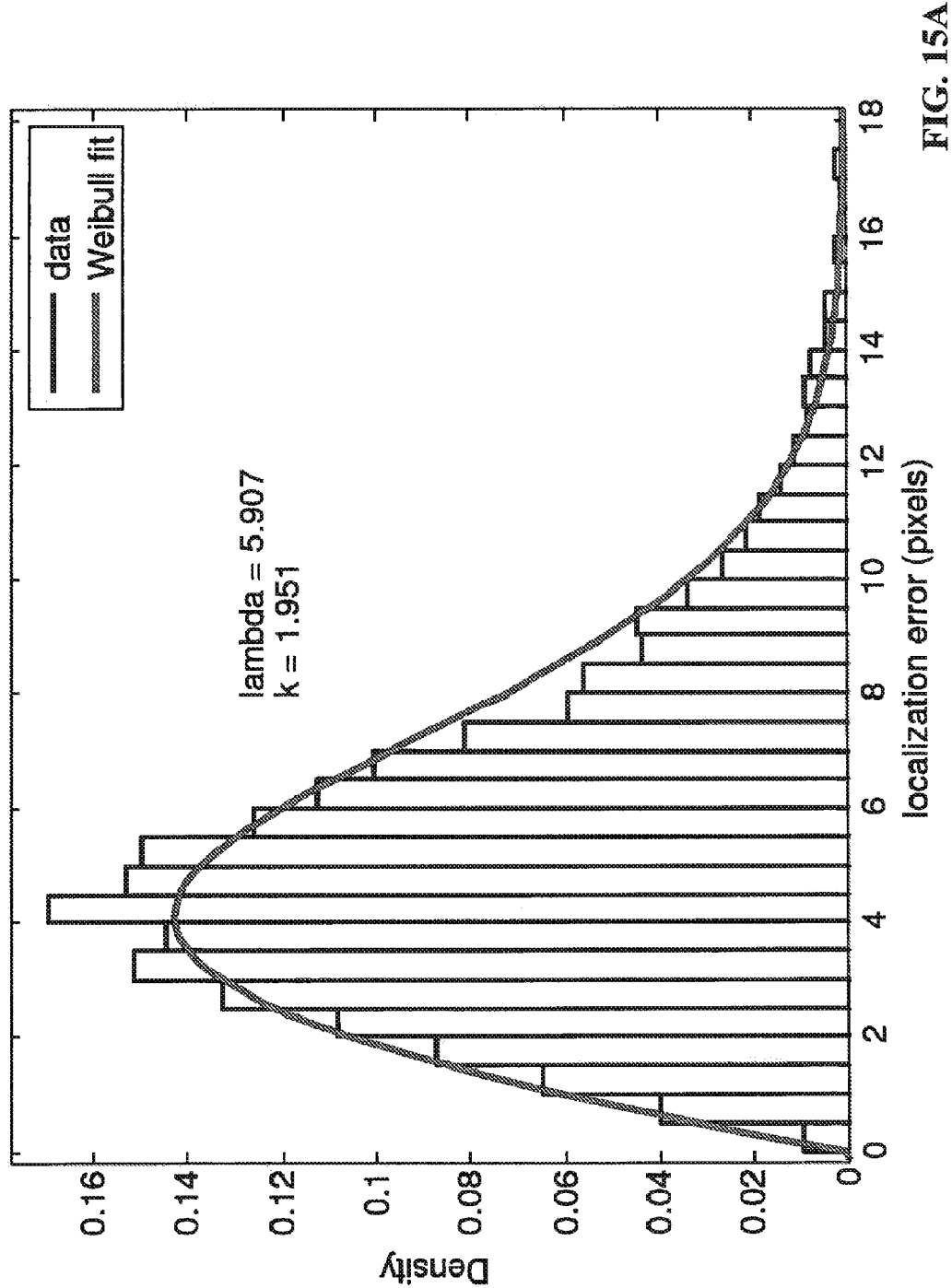
FIG. 15 illustrates (a) histogram of the localization error values for all 10 traces, with a Weibull PDF overlayed onto it; and (b) Quantile-quantile plot of the localization error (labeled "data" in the figure) versus a Weibull distribution (labeled "probability") in accordance with one or more aspects of the disclosure. It should be appreciated, in one aspect, that since the plot closely follows the x=y line, it can be gleaned that the localization error can be distributed according to the Weibull probability distribution.
Figure 15B:
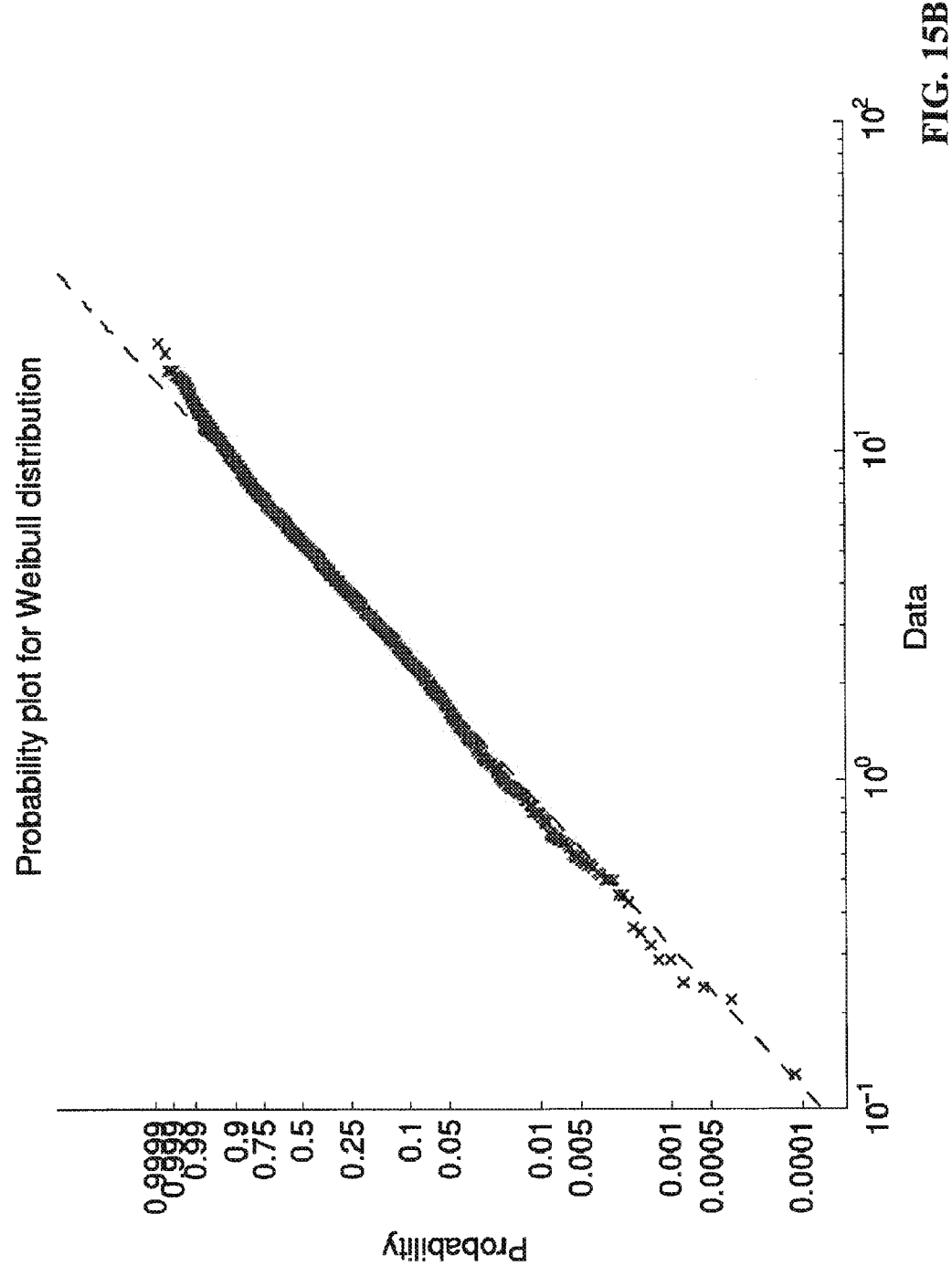

The distribution of the localization error for these experiments is plotted in FIG. 15a. As can be seen in the figure, this data closely follows the Weibull distribution, with parameters A=5.907 and k=1.951. This is further supported by quantile-quantile plot in FIG. 15b. Since the data in the figure lies mainly in (or near) the x=y line, the Weibull distribution can be considered a very good fit for the data.

Figure 16A:
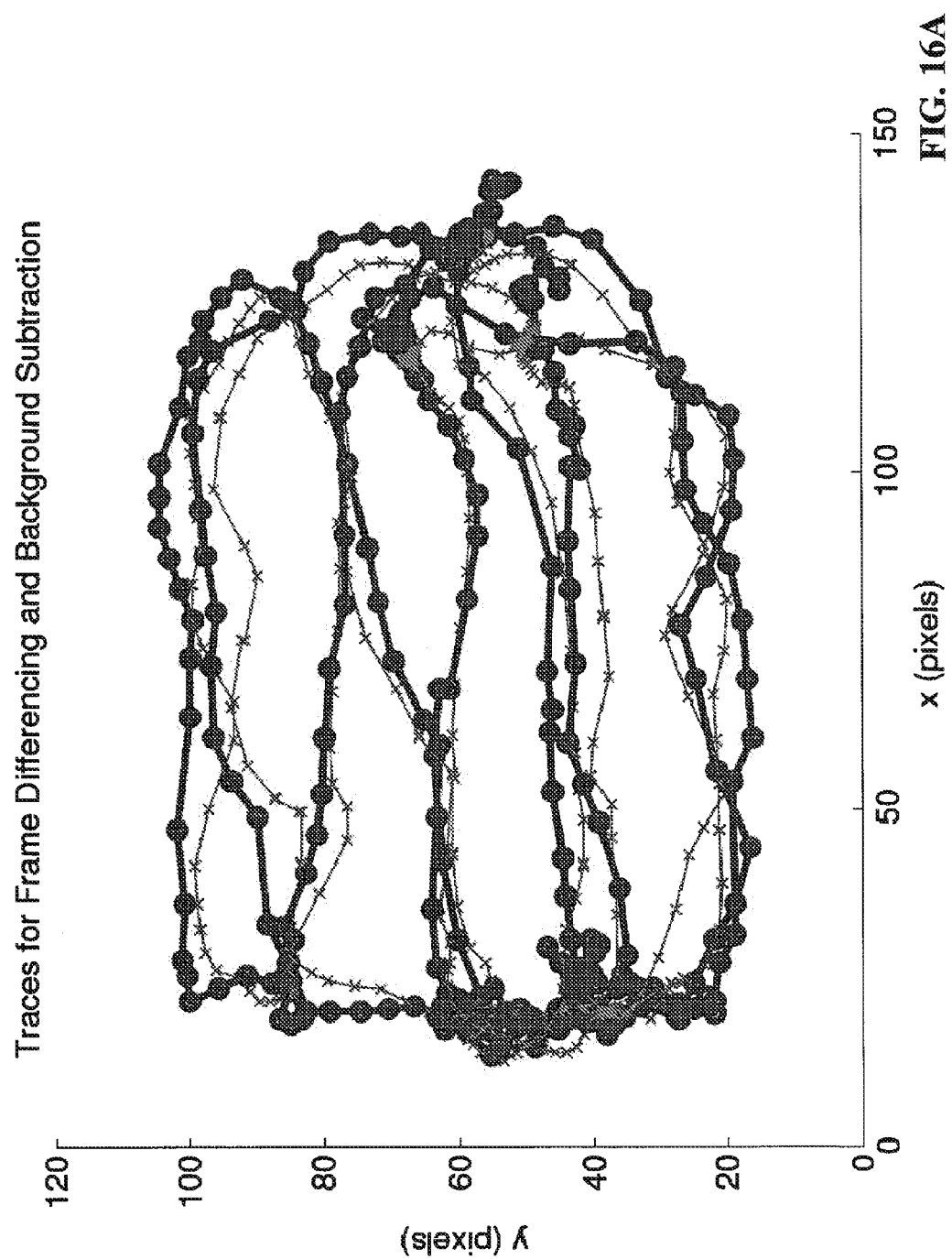
FIG. 16 illustrates an examplary plot of the ground truth locations (thin light-grey line with x markers) and detected locations (thick dark-grey blue line with o markers) in accordance with one or more aspects of the disclosure.
Figure 16B:
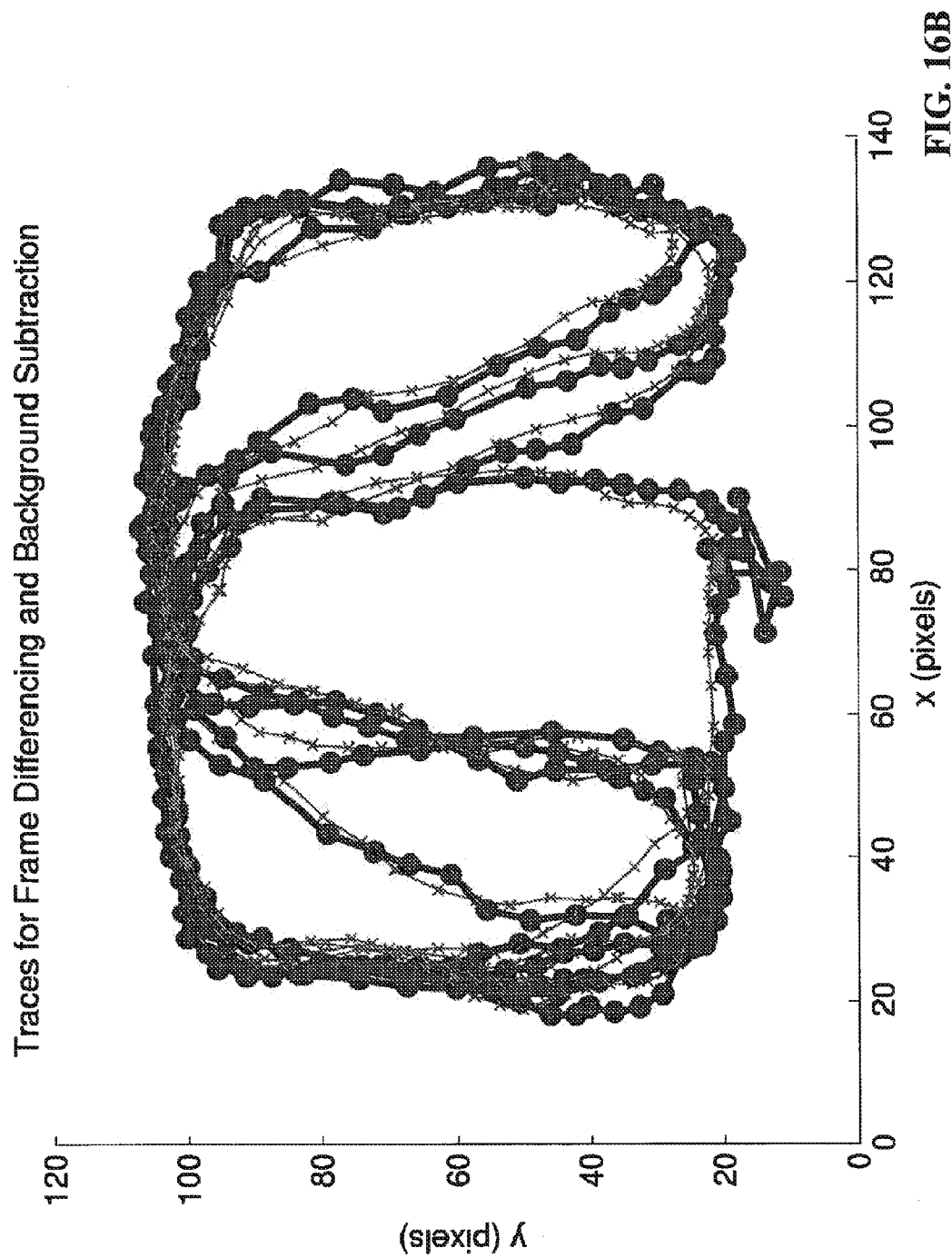

The MOTP is, then, simply the mean of the data in the figure, that is 5.24 pixels, which translates to roughly 7.15 cm on the plane parallel to the floor, passing through the person's center of mass. By correcting the erratic frame-rate of the camera in this experiments to its intended 30 Hz, this number should fall to approximately 3.00 cm (using 12.5 Hz as the average experimental frame rate for this calculation), since the centroid error in a frame differenced is proportional to the person's speed between consecutive frames. For a visual representation of what an MOTP of 5.24 pixels means, FIG. 16 shows two 30-second segments of the person's path. The ground truth is shown with the x markers, while the output of the likelihood histogram is represented with the o markers.

Figure 17:
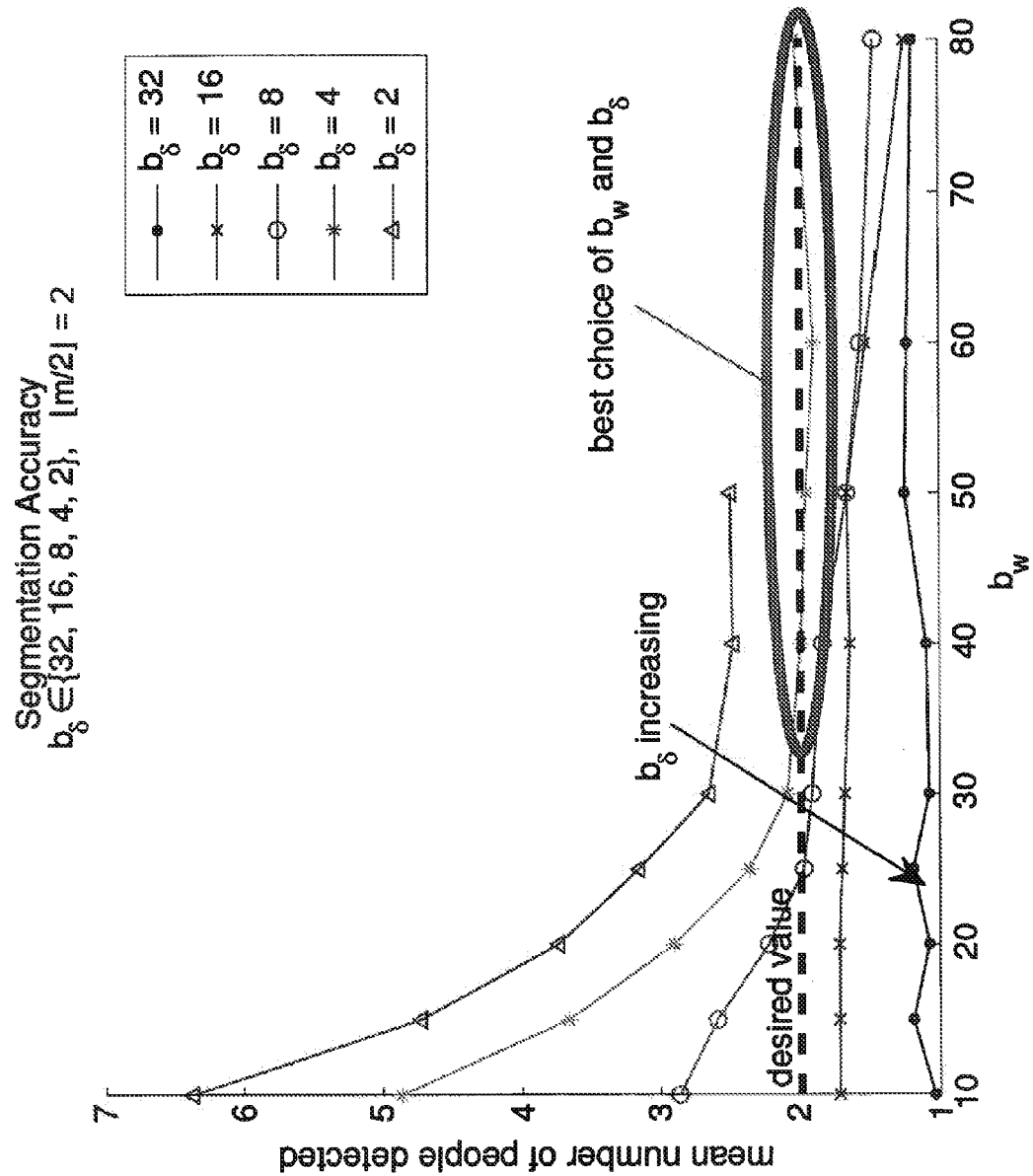
FIG. 17 illustrates an example experimental determination of optimal parameters in an analysis histogram in accordance with one or more aspect of the disclosure.

In addition to calculating the MOTP, we have also analyzed the success of the segmentation process itself. For this, we generated three two-person videos from 6 of the one-person experiments described above. Then, the likelihood histogram method was applied for different values of bin width ($b_w$), bin shift ($b_\delta$), and search window size (m). The best combinations of the three parameters are those that are most often correct about the number of people in the scene. FIG. 17 reports on the average number of detections per frame as a function of $b_w$ for different values of $b_\delta$ (and with m=5, so that $\lfloor m/2 \rfloor$=2). Since exactly two people were present in these videos, this number should be exactly 2, meaning that the plot should preferably be near the dashed y=2 line. Anything higher than that characterizes a situation of "oversegmentation", where the pixels belonging to the two people were segmented into 3 or more classes. And any number smaller than 2, denotes a case of "undersegmentation", where the two people were either merged into 1 or not detected at all.

As can be appreciated from FIG. 17, the best-performing combination of the three parameters is $b_\delta$=4, $\lfloor m/2 \rfloor$=2, and $b_w \in [35,80]$. This is explained by equations (8) and (9), which state that $b_{w/2} + b_\delta \lfloor m/2 \rfloor$ should be comparable in size to the moving person's dimensions in the image. For the videos in question, these dimensions were measured to be 48.9 px on average (e.g., the side of the smallest bounding box). This implies that the optimal value of $b_w$ should be 40.9 px whenever $b_\delta \lfloor m/2 \rfloor$=8. As it can be seen in FIG. 17, it is exactly for this value that the segmentation is the most correct, with the plot actually touching the y=2 line. Thus, the equations for the optimal parameters in Section 4.4 are validated to be, on average, correct in these experiments.

A video showing the experimental output of the DCL layer can be seen online at http://enaweb.eng.yale.edu/drupal/dclvideo. In the video, the entire DCL layer executes on a network of 4 iMote2 sensor nodes, as further described in Section 7.2.

7.2 TI Layer Evaluation

Figure 18:
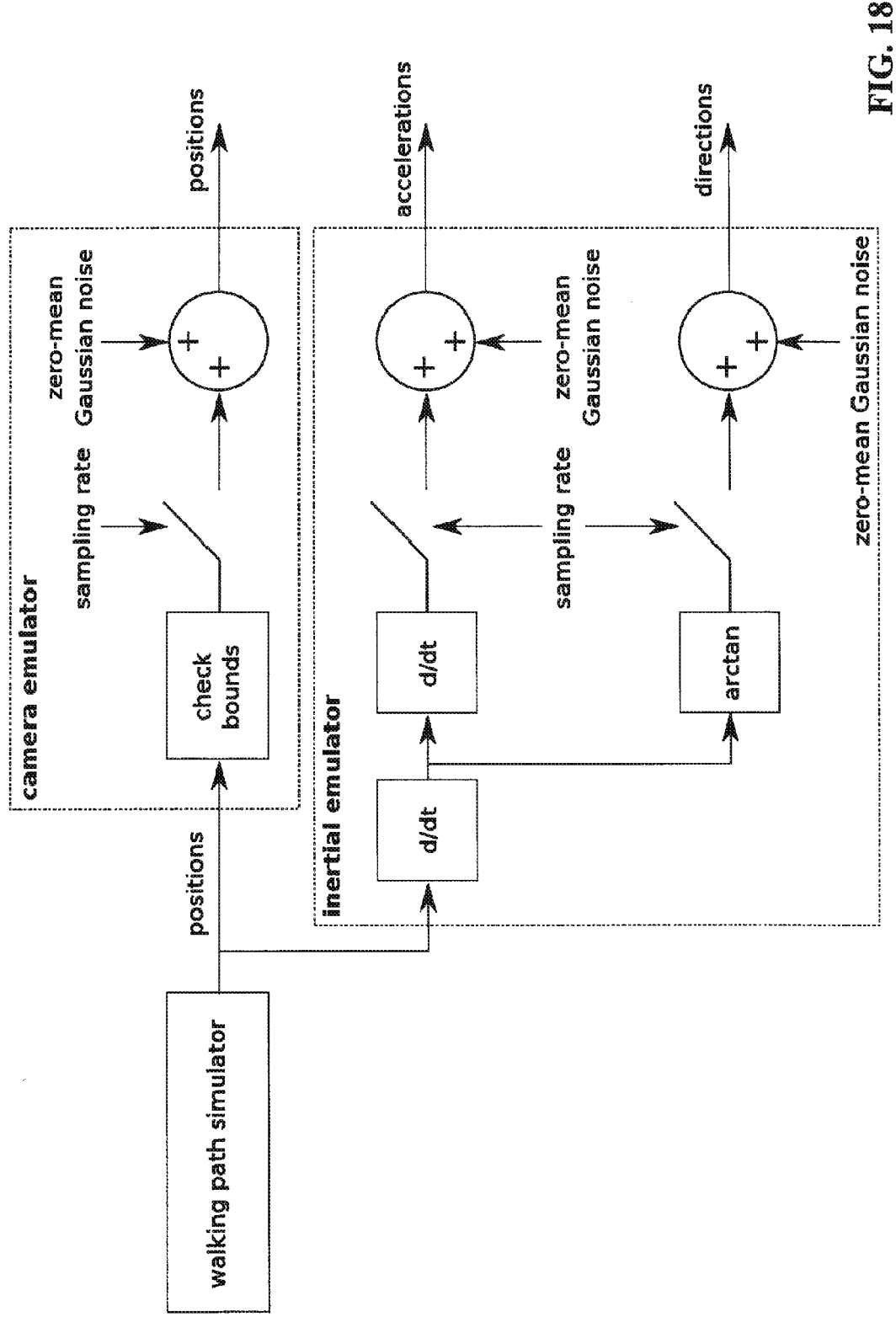
FIG. 18 illustrates an example visual depiction of the process by which cameras and inertial sensors are emulated from the simulated data output by the simulator.

In one aspect, to evaluate the TI layer separately from any effects that may arise in our DCL layer, we developed a custom multiple-person simulator to characterize the performance of the tracking/identification method given different target densities (the number of people in the network divided by the coverage area). The simulator can use either a random walk or a random waypoint model to generate scenarios where multiple people move at different speeds and possibly stop for some random time duration. Once people's paths are generated, the software emulates cameras and wearable inertial sensors using different noise characteristics and sampling rates. The noise is assumed to be Gaussian, zero-mean, and additive. However, while in the case of the cameras the noise is added to each person's position, for the inertial sensors it is added to their direction (magnetometer) and acceleration (accelerometer), as depicted in FIG. 18. Finally, the sampling rate of each sensor is simulated by skipping time frames from the simulated sequence. This is possible because the simulator's internal frequency is defined as the least common multiple of the sampling frequencies of the camera and inertial sensor. And so, for a camera at 15 Hz and inertial sensor at 50 Hz, the baseline sampling frequency is 150 Hz. The camera emulator is, then, set to record every $5^{th}$ sample while the inertial emulator records every $3^{rd}$.

Figure 19C:
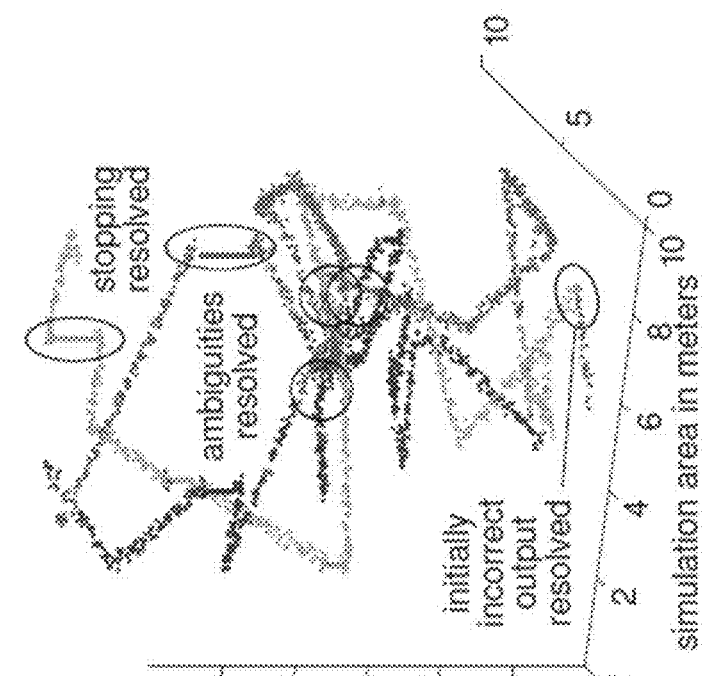
FIG. 19 illustrates (a) simulation showing three people moving in a 10 m×10 m area in accordance with one or more aspects of the disclosure. Track segments that are unambiguous are shown with different colors; (b) calculated probabilities for each track segment from (a), where the tracks selected after global optimization are shown with thick lines, and the ground truth assignments are shown in black (mostly within the thick lines); and (c) the identification method joins together the segments from (a) into three long tracks with 3 people's IDs.
Figure 19A:
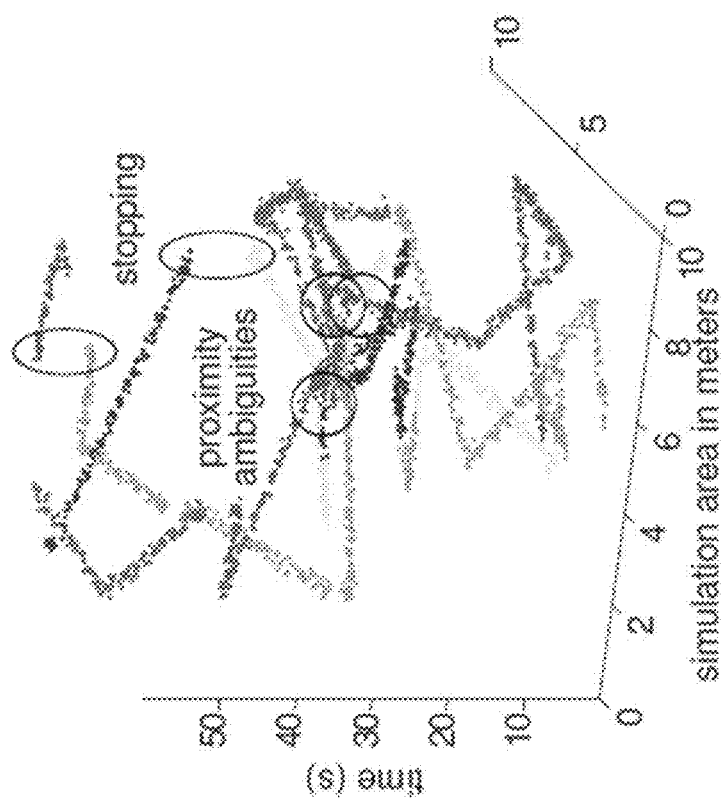

The traces from a three-person simulation using the random waypoint model are shown in FIG. 19(a). In the figure, the detections from the simulated camera are colored according to which piecewise-unambiguous track segments they belong to. In visual terms, the TI layer is in charge of (i) stitching these track segments together, and (ii) identifying who they belong to.

Figure 19B:
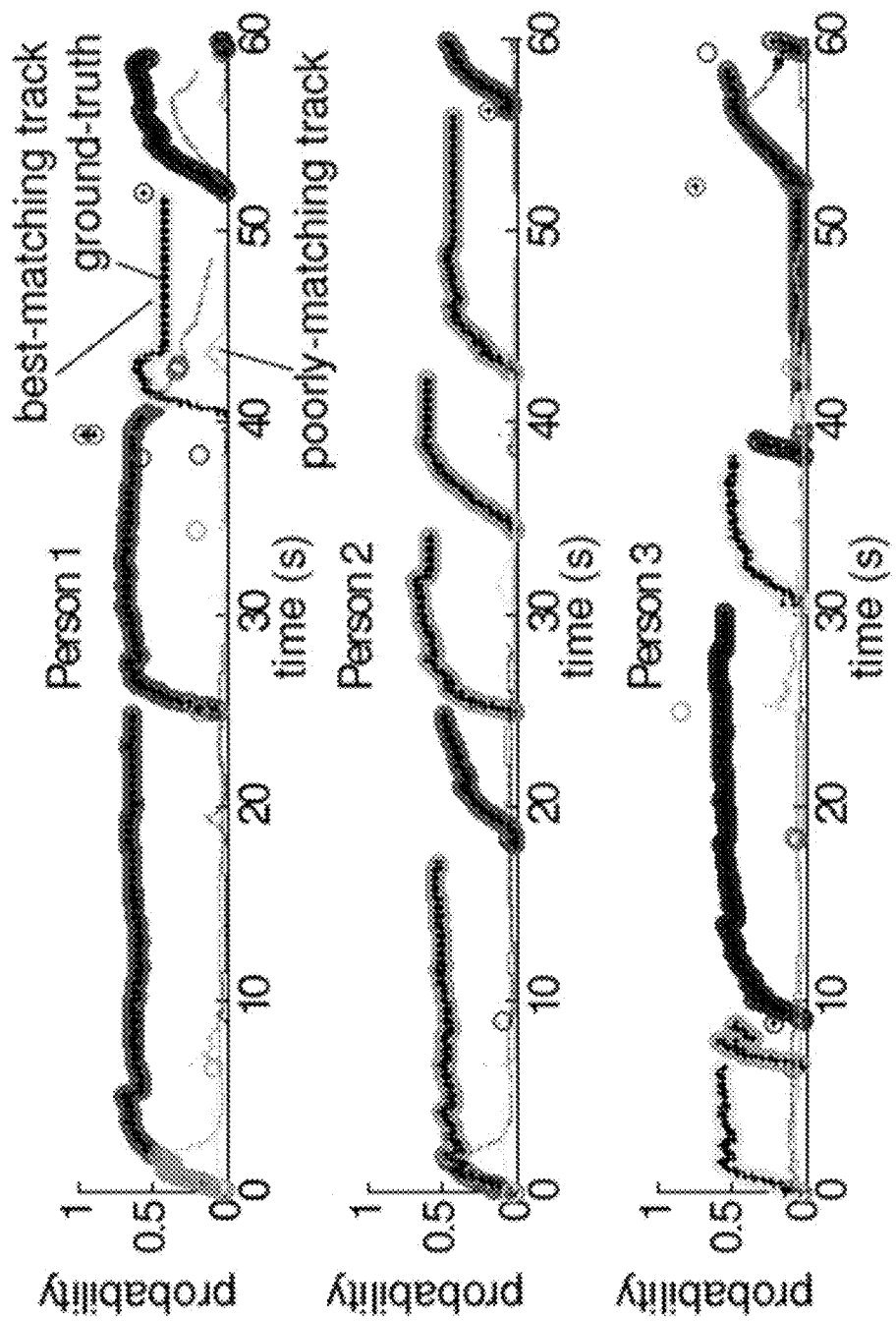

For this, we compute the probabilities in the likelihood matrix Q, from equation (31) at each timestep. These probabilities are shown in FIG. 19(b). Shading is used to indicate the same track segments as in FIG. 19(a). Ground-truth is shown in thin black lines, and the current belief after the global optimization step is shown with a thick stroke. In the figure, most locally-best matches (e.g., the "tallest" lines) coincide with the global optimum (the thick lines), but this is often not true in other scenarios, which is why the global optimization step is necessary in the first place. Finally, a plot of the best global matches is shown in FIG. 19(c). The figure shows that people's IDs have been recovered, e.g., track segments belonging to the same person are correctly joined into long same-color paths without spatio-temporal gaps.

To quantify the accuracy of the disclosed systems and methods for subject sensing, 100 scenarios comprising 1 to 10 people in a 10 m×10 m area were simulated. In one aspect, the simulated cameras were sampled at 20 Hz and the inertial sensors at 100 Hz. We considered the three following sensor setups:
(1) Ideal sensors—As a sanity-check, we consider the simulation of ideal noiseless sensors to verify the correctness of the proposed approach.
(2) Non-ideal sensors and cameras—We simulate non-ideal cameras and inertial sensors to assess the identification accuracy when using a regular camera under realistic conditions. For this, zero-mean Gaussian noise is added to all sensor readings, with $\sigma=0.15$ m (cameras), 0.03 m/s² (accelerometers) and 0.02×H (magnetometers), where H is the magnitude of the Earth's magnetic field.
(3) Non-ideal sensors and frame-differencing cameras—Finally, we provide a baseline against which the experimental evaluation can be compared by emulating the noise characteristics of the DCL layer in a scenario comparable to our experimental testbed. For this, the inertial measurements were simulated like in the previous case, but the location measurements were additionally quantized to 15 cm increments prior to the addition of noise. This setup has the coarsest resolution of all three simulated scenarios, and should present the toughest conditions for person-identification.

Figure 20:
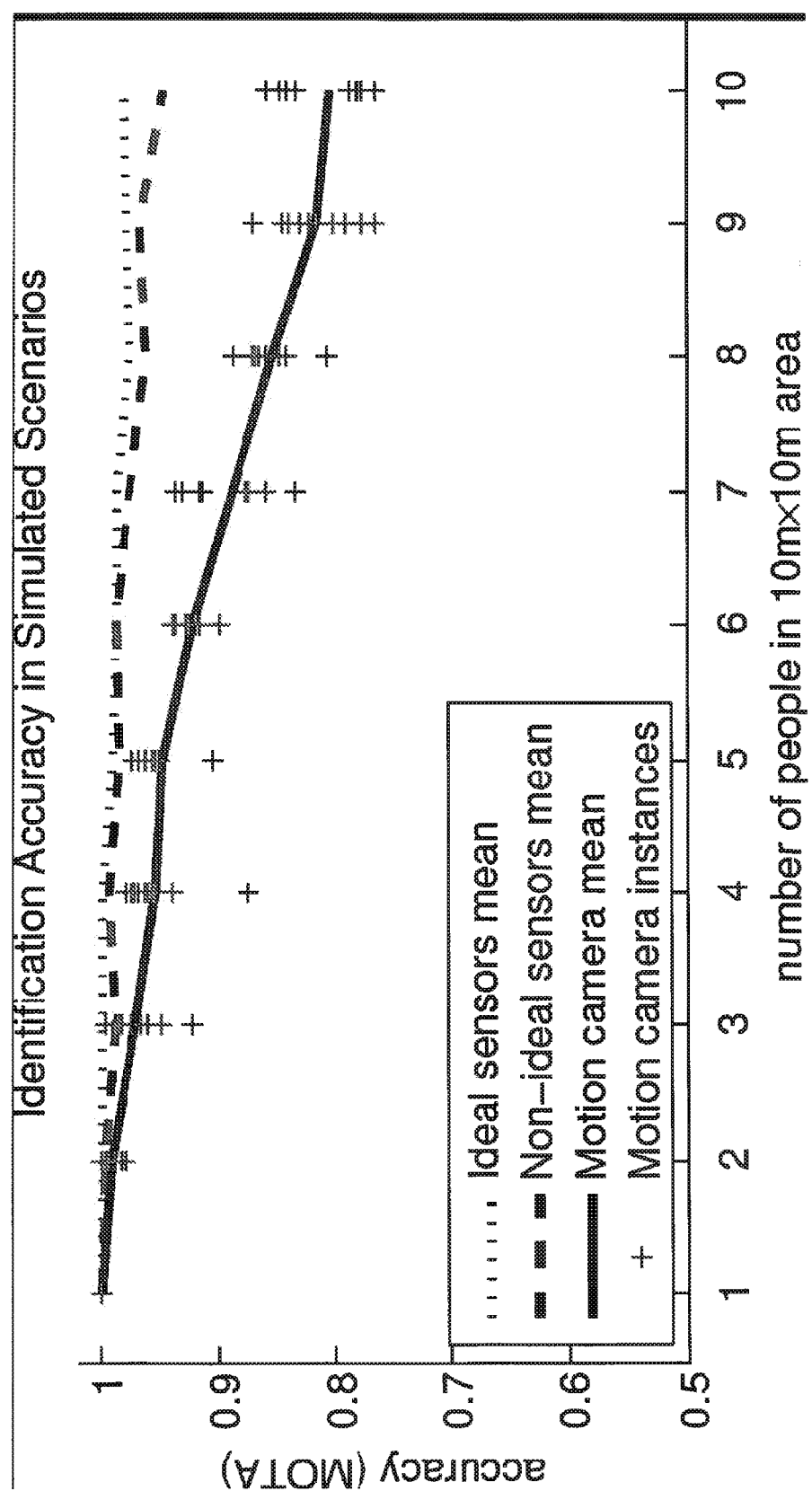
FIG. 20 illustrates identification accuracy (MOTA) as a function of target density in accordance with one or more aspects of the disclosure. In the drawing, 100 simulations are illustrated where the number of people, or more generally, subjects, in the scene varies from 1 to 10. The mean is shown with a thick blue line.

FIG. 20 shows the simulated accuracy of the method averaged over 10 runs for each datapoint. The accuracy found for the ideal simulation is approximately 100% for all cases, which serves to corroborate the correctness of the approach. When using noisy data, the method achieves an accuracy of over 95% with the regular cameras, and over 80% with the frame-differencing cameras. The performance loss in the latter case can be explained by its low resolution, which adds considerable quantization noise to the $y_k^j$'s.

Figure 21:
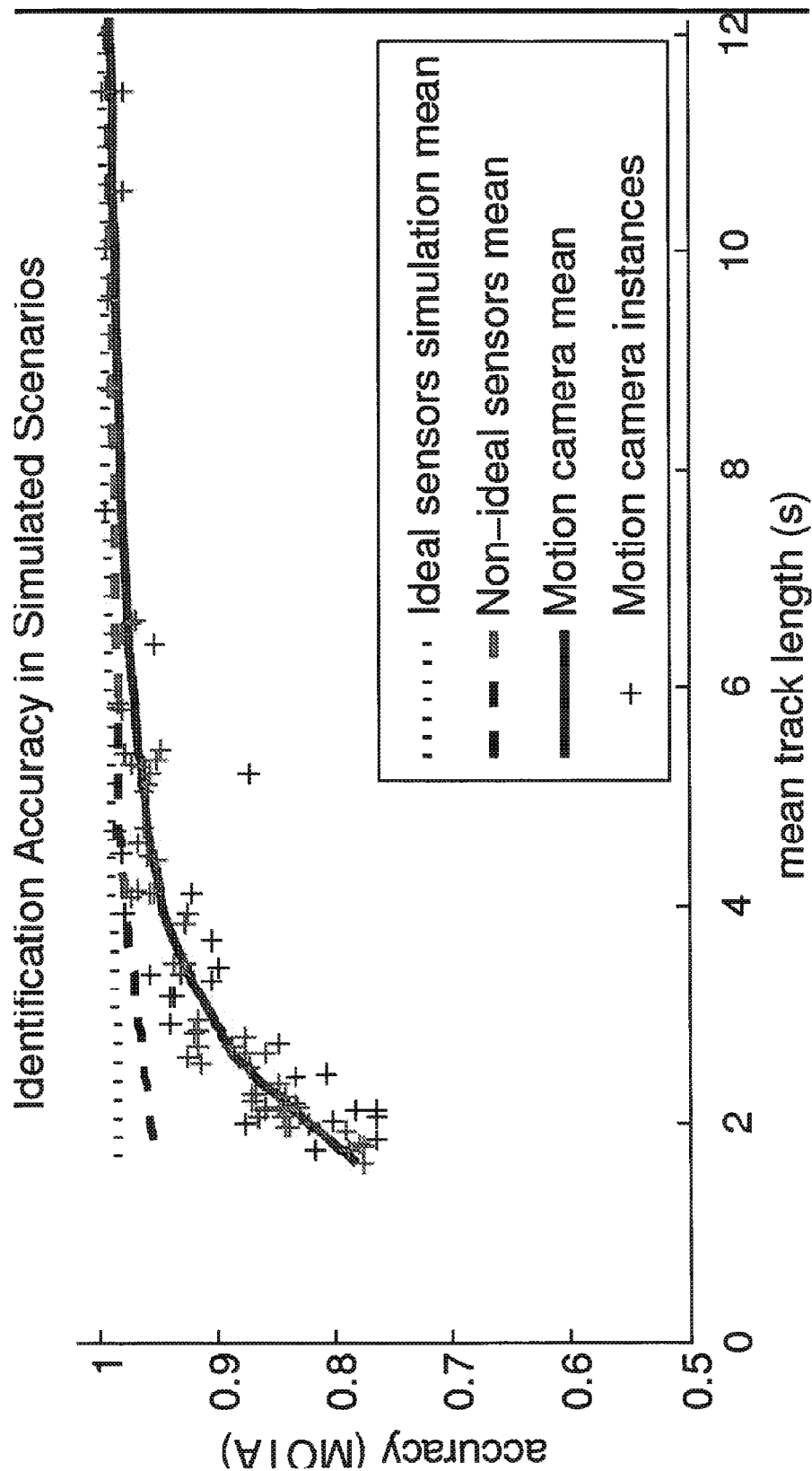
FIG. 21 illustrates plotting the same data as FIG. 20, but as a function of inter-ambiguity time in accordance with one or more aspects of the disclosure. An identification accuracy (MOTA) of over 0.9 is obtained for piecewise-unambiguous tracks lasting as short as 3.5 s. Of course, the longer the track segments, the higher the chance the method can correctly identify the person.

The data in FIG. 20 can be better interpreted with the knowledge as the number of people increases, so do the ambiguities become more frequent, causing people's tracks to be harder to identify. It makes sense, therefore, to analyze the accuracy of the system as a function of the mean interambiguity time, as shown in FIG. 21, which is independent of the dimensions of the simulated area. Such analysis shows that the proposed identification procedure has a mean accuracy of over 90% for tracks lasting as little as 2.9 s, even in the challenging of the three simulated scenarios. In most home and office situations, for instance, we expect interambiguity times to be much longer, leading to increased accuracy as shown in the right side of the plot.

7.2.1 Performance Analysis in Corner Case.

The corner case where two people move either identically or very similar to one another can be evaluated. For this, consider that there are two people in a scene with states $x_1$ and $x_2$. Let us call these people "person 1" and "person 2", or simply $p_1$ and $p_2$. They each carry a mobile phone, which takes measurements $w_k^1$ and $w_k^2$ at each timestep k. Assume, for simplicity, that all sensors are time-synchronized. It should be appreciated that in the disclosed experiments, this was simulated by simple interpolation.

If two people are detected by the camera network, with detections $y_k^1$ and $y_k^2$, then the identification procedure is responsible for labeling $y_k^1$ and $y_k^2$ with unique IDs by matching them with inertial measurements $w_k^i$ and $w_k^2$. Normally, this is possible because people's movements may be quite different from one another. In this section, however, it is assessed what would happen if the two people are actually moving in paths that are interdependent, so that their paths can no longer be assumed to be "sufficiently different".

Consider, therefore, the corner case where person 2 is tasked with following Person 1's path very closely. Then, it is reasonable to assign $p_2$ the following state equation:

$$x_k^2 = x_{k-\delta k}^1 + \eta_k \quad (35)$$

In other words, person 2's state will follow person 1's with a delay $\delta_k$ and some random variation $\eta\square$. It should be appreciated that $\eta_k$ is a random vector comprising the same combination of spatial and motion components as the states $w_k^1$ and $w_k^2$.

And so the relevant measurements in this situation can be $$w_k^1 = x_k^1 + \epsilon_k^1 \quad (36)$$

$$y_k^{(1)} = x_k^1 + v_k^1 \quad (37)$$

$$w_k^2 = x_k^2 + \epsilon_k^2 = x_k^1 + \eta_k + \epsilon_k^2 \quad (38)$$

$$y_k^{(2)} = x_k^2 + v_k^2 = x_{k-\delta k}^1 + v_k^2 + \eta_k \quad (39)$$

where the superscripts with parentheses are being used to indicate ground-truth IDs.

In certain scenarios, one aspect of importance is assessing the probability that person 1's ID can be incorrectly associated with the location measurement for person 2 at some time k=K?

In view of equations (28), (30), and (31), the answer is that it depends on whether the following is true:

$$L_{MAP}(\theta_K^{(1)}, w_{1:K}^1) \stackrel{?}{<} L_{MAP}(\theta_{K-1}^{(1)}, y_{K-1}^{(2)}, w_{1:K}^1) \quad (40)$$

That is, misdetections can occur if and only if our likelihood computation for the correct ID ($L_{MAP}(\theta_K^{(1)}, w_{1:K}^1)$) gives a lower value than that for the incorrect ID ($L_{MAP}(\theta_{K-1}^{(1)}, y_K^{(2)}, w_{1:K}^1)$).

In a scenarion in which Eq. (40) is expanded as follows:

$$\max_{\forall x_K^1}[p(x_K^1|\hat{x}_{K-1}^1)p(y_K^{(1)}|x_K^1)p(w_K^1|x_K^1)p(\hat{x}_{1:K-1}^1,\theta_{K-1}^{(1)},w_{1:K-1}^1)] \stackrel{?}{<} \quad (41)$$

$$\max_{\forall x_K^1}[p(x_K^1|\hat{x}_{K-1}^1)p(y_K^{(2)}|x_K^1)p(w_K^1|x_K^1)p(\hat{x}_{1:K-1}^1,\theta_{K-1}^{(1)},w_{1:K-1}^1)]$$

which can be further simplified by removing the factors that do not depend on $x_k^i$:

$$\max_{\forall x_K^1}[p(x_K^1|\hat{x}_{K-1}^1)p(y_K^{(1)}|x_K^1)p(w_K^1|x_K^1)] \stackrel{?}{<} \quad (42)$$

$$\max_{\forall x_K^1}[p(x_K^1|\hat{x}_{K-1}^1)p(y_K^{(2)}|x_K^1)p(w_K^1|x_K^1)]$$

and, now, substituting the expressions from Eqs. (37) and (39), this becomes $$\max_{\forall x_K^1}[p(x_K^1|\hat{x}_{K-1}^1)p(x_K^1+v_K^1|x_K^1)p(w_K^1|x_K^1)] \stackrel{?}{<} \quad (43)$$

$$\max_{\forall x_K^1}[p(x_K^1|\hat{x}_{K-1}^1)p(x_{K-\delta K}^1+v_K^2+\eta K|x_K^1)p(w_K^1|x_K^1)]$$

It should be appreciated that in the calculation above, the factor $p(x_{K-\delta K}^1+\mu_K^2+\eta_K)$ is computed using the same density function as $p(x_K^1+v_K^2)$, even though the probability distribution of $x_{K-SK}^1+v_K^2+\eta_K$ in fact differs from that of $x_K^1+v_K^2$.

Such result is rather straightforward, since it is not known at run-time that $y_K^{(2)}$ belongs to person 2 rather than person 1.

Remember that in our implementation the state variables can comprise two spatial components, $s_x$ and $s_y$, and two inertial components, $|\ddot{s}|$ and $\ddot{s}_{yaw}$. And so, an in-depth analysis of the relation described in (43) should consider all possible values the x's, plus all different instances of the random variables $\epsilon_*^{(*)}$, $v_*^{(*)}$, $\eta_*$, thusly encompassing at least 24 dimensions. Therefore, in the interest of simplicity, here we analyze the probability of Eq. (43) in a numeric fashion, rather than analytically.

For this numerical analysis, 60 s-long random walks in 2D space for two people can be generated, and, in one aspect, can be filtered with a sliding Gaussian window to provide added smoothness. Time is quantized in ⅟₁₅ s increments. These walks are used to produce the four components of person 1's state $x_k^1$. For person 2, $x_k^2$ is produced from Eq. (35) for different values of $\delta_k$ and $\sigma_n$, (the standard deviation of $\eta_k$, which is assumed to be zero-mean Normal). The w's and y's are similarly generated by letting the δ'S and v's be Normally distributed with the following somewhat pessimistic parameters:

$s_x$ component of $v \sim N(0,0.3 \text{ m})$ \quad (44)

$s_y$ component of $v \sim N(0,0.3 \text{ m})$ \quad (45)

$|\ddot{s}|$ component of $\epsilon \sim N(0,0.3 \text{ m/s}^2)$ \quad (46)

Figure 22:
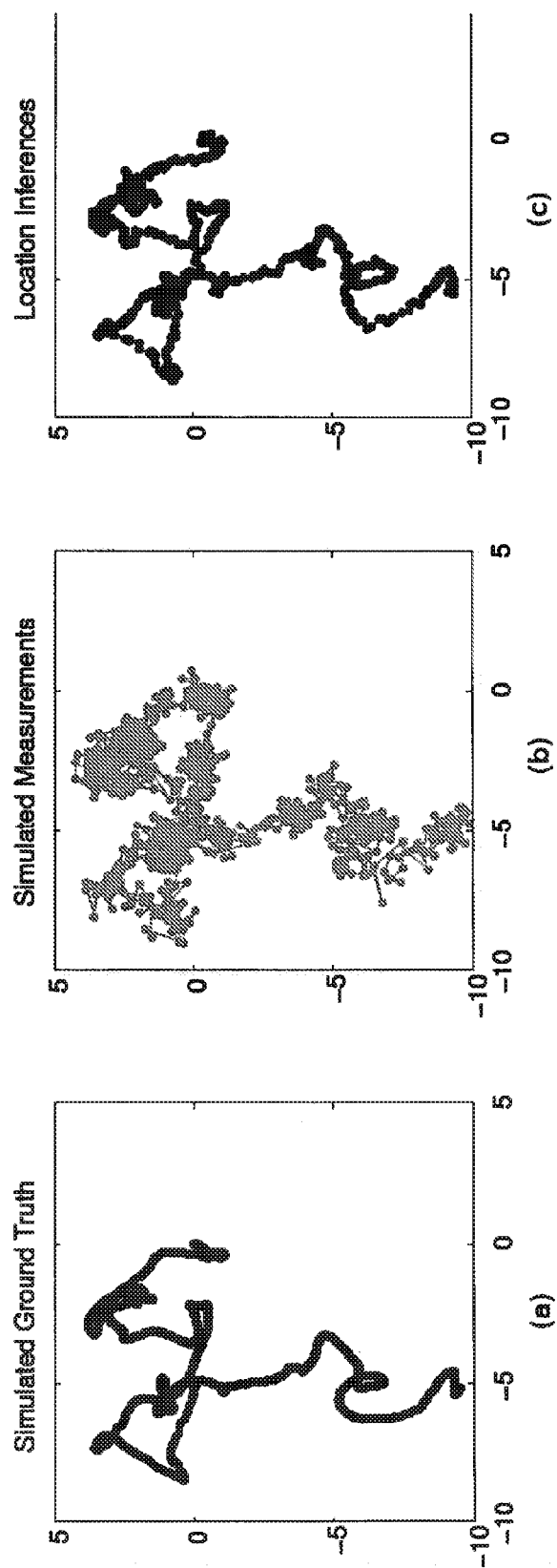
FIG. 22 illustrates an example of how the identification approach can also be used for location filtering. The axes show 2D-space in meters. The true state of person 1's locations is shown in (a), while (b) shows the noisy measurements. The path obtained from the ID inference process is shown in (c), which is clearly much more similar to the original path than were the measurements.

$\ddot{s}_{yaw}$ component of $\epsilon \sim N(0.50°)$ \quad (47)

and the deviation between person 1's path and person 2's (that is, $\eta_k$) was considered to be $$\eta_k \sim N(0,\sigma_n) \quad (48)$$

where $\sigma_n$ was taken as a free parameter. An example dataset of one person simulated using these parameters is shown in FIG. 22B, whereas the ground-truth path is given in FIG. 22A.

For the HMM, the distribution of transition probability $p(x_k|x_{k-1})$ was assumed Normal for the spatial components, with standard deviation 0.4 m and mean $x_{k-1}$. That is, the model used did not make any assumptions about the person's motion, other than that the next location will be near the current location.

We, then, calculate the two sides of equation (43) and here we report on how frequently the correct hypothesis is picked out of the two (e.g., how frequently the LHS of (43) is greater than the RHS) using the following metric:

$$F_{det} = \text{frequency of correct detection} = \sum_{k=1:K} \frac{1(k)}{K} \quad (49)$$

where $$1(k) = \begin{cases} 1 & \text{if } L_{MAP}(\theta_k^{(1)}, w_{1:k}^1) > L_{MAP}(\theta_{k-1}^{(1)}, y_k^{(2)}, w_{1:k}^1) \\ 0 & \text{otherwise} \end{cases} \quad (50)$$

Figure 23A:
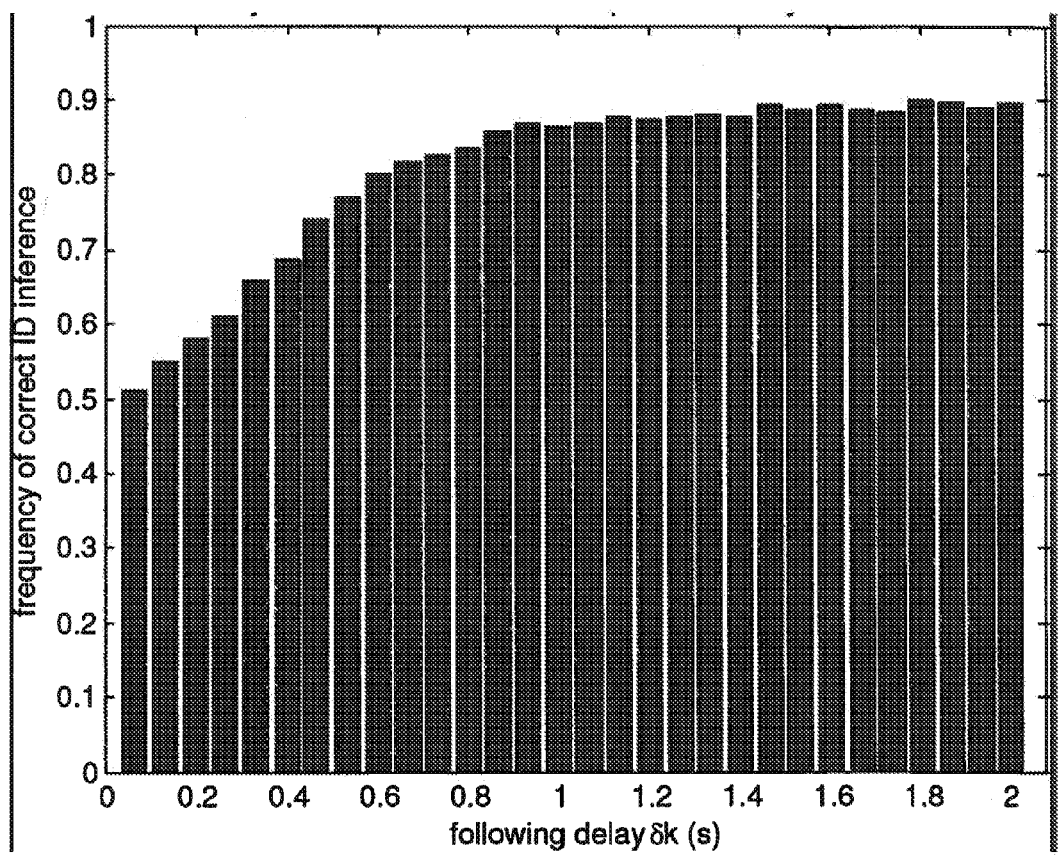
FIG. 23A illustrates accuracy of ID inference for scenario where one person follows another person. This plot displays how often the likelihood $L_{MAP}(\theta_K^{(1)}, w_{1:K}^1)$ is greater than $L_{MAP}(\theta_{K-1}^{(1)}, y_K^{(2)}, w_{1:K}^1)$, meaning that person $p_1$ was correctly identified. The x axis denotes the distance between the two people, given in seconds, as characterized by the variable $\delta_k$ described herein. Provided a similar scenario, where one person follows another.

The results are shown in FIG. 23, where each datapoint is reported from the average of 10 such calculations. For FIG. 23A, $\sigma_n$ is set to 0, meaning that person 2 follows person 1's path exactly. Then, the delay with which $p_2$ follows $p_1$ is varied from 0 to 2 seconds, by adjusting the δk.

As can be seen in the figure, when the delay is 0 the frequency of correct detection is as low as 0.5. This makes intuitive sense, as it means that $p_1$ and $p_2$ are occupying the exact same location in space at all times—a physically-unlikely situation where correctly identifying a person is as likely as a coin toss. However, as person 2 starts gaining some distance from person 1 the frequency grows toward 1.0, albeit slowing down considerably after reaching the 0.9 mark.

Figure 23B:
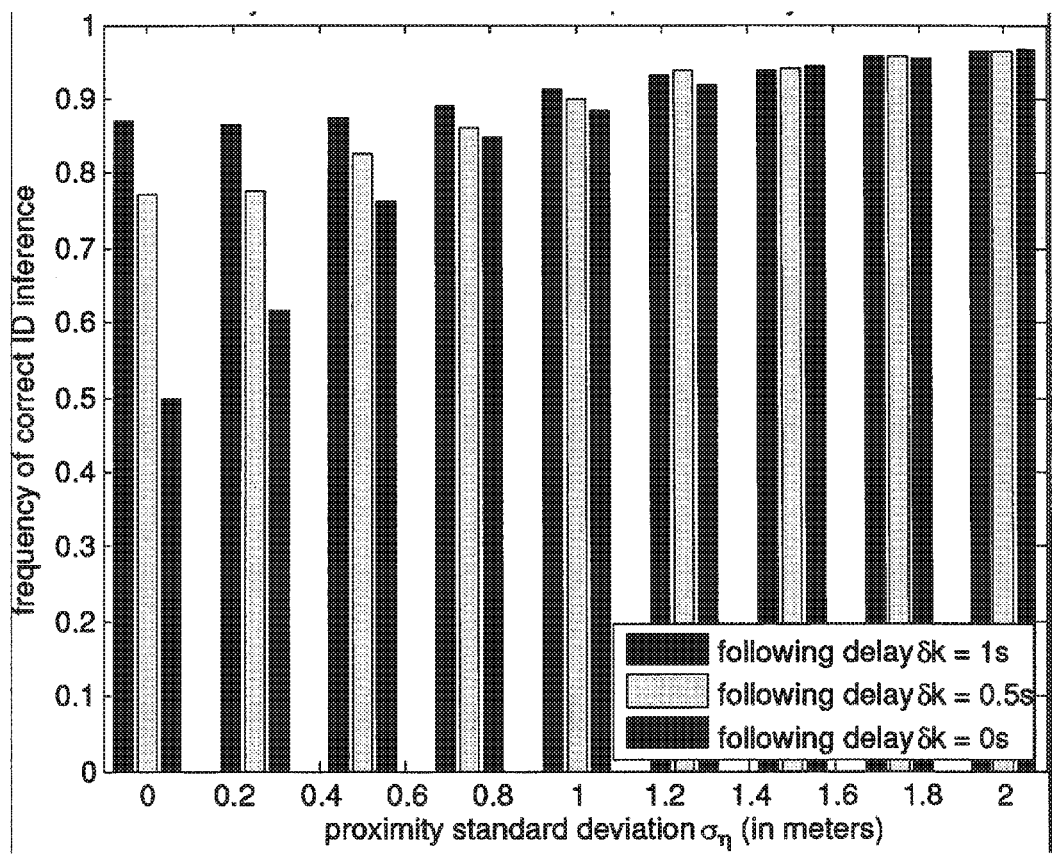
FIG. 23B presents the accuracy of the person-identification approach as a function of the standard deviation of the locations between the two people. This is done for three $\delta_k$'s, which can indicate how closely person 2 follows person 1. The first three bars in this plot are, therefore, a summary of the behavior seen in (a).
Figure 24:
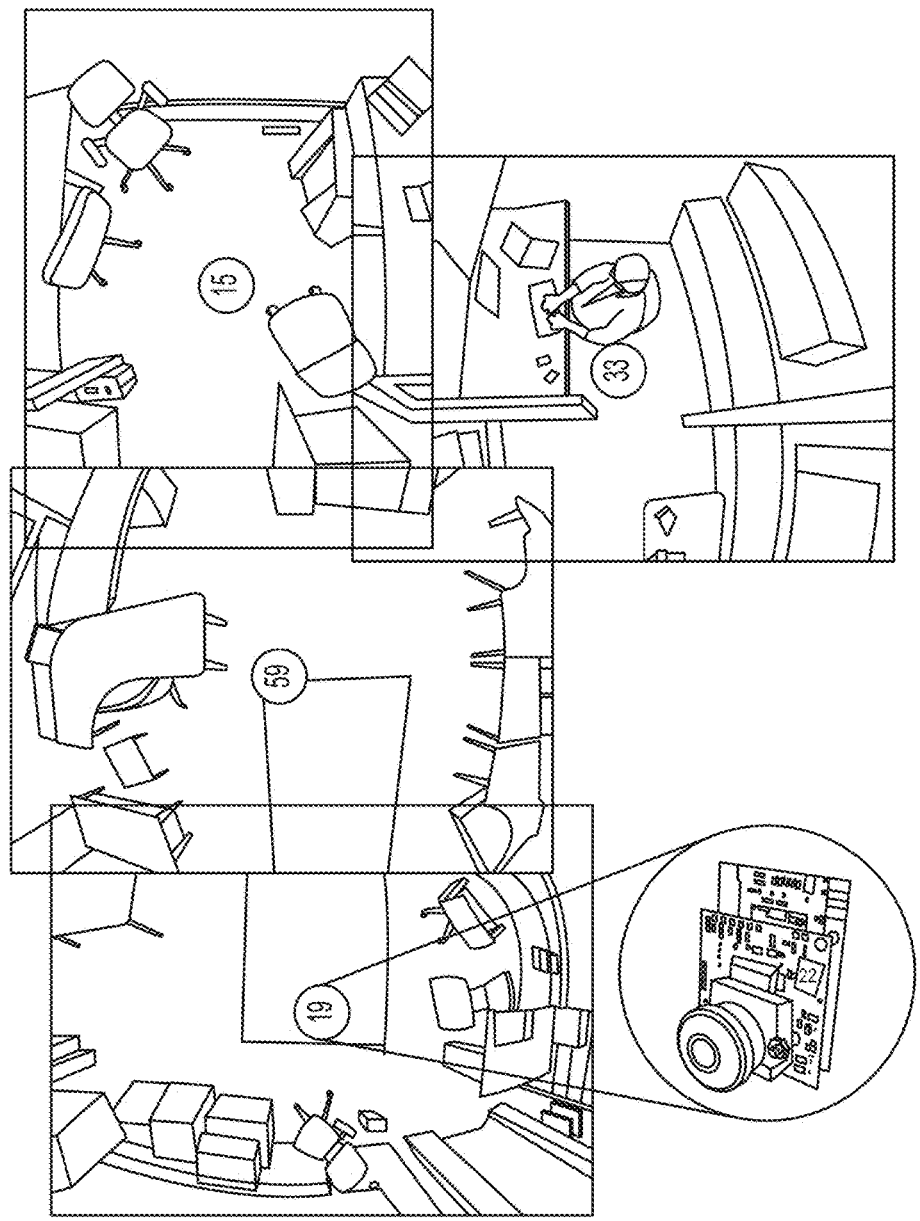
FIG. 24 illustrates an experimental testbed with 4 iMote2 sensor nodes instrumented with the custom camera boards.

FIG. 23B shows the same sort of data, but as a function of the standard deviation $\sigma_n$. For this plot, δk was one of {0, 7, 15}, meaning that person 2 was either 0 s, 0.5 s, or 1.0 s away from Person 1 on average. As such, the leftmost group of three bars in FIG. 23B are a summarized version of the plot in FIG. 23A. Here again, the datapoints for the 0 s-delay case are presented only to illustrate the general trends, as they represent a situation that is physically impossible.

The conclusion that can be taken from these two trends is that identification based on matching of inertial properties, as proposed in this section, is capable of accuracy in the range $F_{det} \in [0.7,0.8]$ even in tough scenarios where one person closely follows another. This is seen in the first few bars for the 0.5 s and 1.0 s series in FIG. 23B.

Furthermore, although not discussed at any length in this paper, a positive side effect of applying our HMM framework is that the noisy location estimates inherently undergo a filtering process, similar to what occurs with other Bayesian methods, such as Kalman filtering and particle filtering. This can be seen in FIG. 22 where the plot of $\hat{x}$ (see, e.g., FIG. 22C) is closer to (a) than to (b).

7.3 Full System Evaluation

In order to evaluate the performance of the entire system (the DCL and TI layer together), we performed experiments on a testbed deployment of 4 Intel iMote2 sensor nodes equipped with custom camera boards. The iMote2's PXA271 processor was set to operate at 208 MHz, allowing it to detect people in using the likelihood histogram approach at frame rate of approximately 14 Hz. The cameras were placed on the ceiling, facing down, at a height of 2.1 m. We used a 162° wide-angle lens to be able to capture the full height of a person in an area of approximately 3 m×4 m for each camera (partial images of people could be seen from areas much larger). The location of each detected person was streamed online over 802.15.4 and recorded at a nearby laptop. At the same time, the person's acceleration and direction, measured using a SparkFun6DoF inertial measurement unit (IMU) attached to the person's belt, was transmitted to the laptop using a Bluetooth link at a sampling frequency of 100 Hz. The nodes' internal clocks were loosely synchronized by simply transmitting a beacon with the global time at the beginning of the experiments, leading to synchronization disparities as high as 50 ms. In addition, whereas multiple camera systems in the literature often use high-speed links to synchronize the cameras' sampling rates, the camera nodes sampled each frame in a completely asynchronous manner. This is in agreement with the conditions of existing camera infrastructure.

Figure 25A:
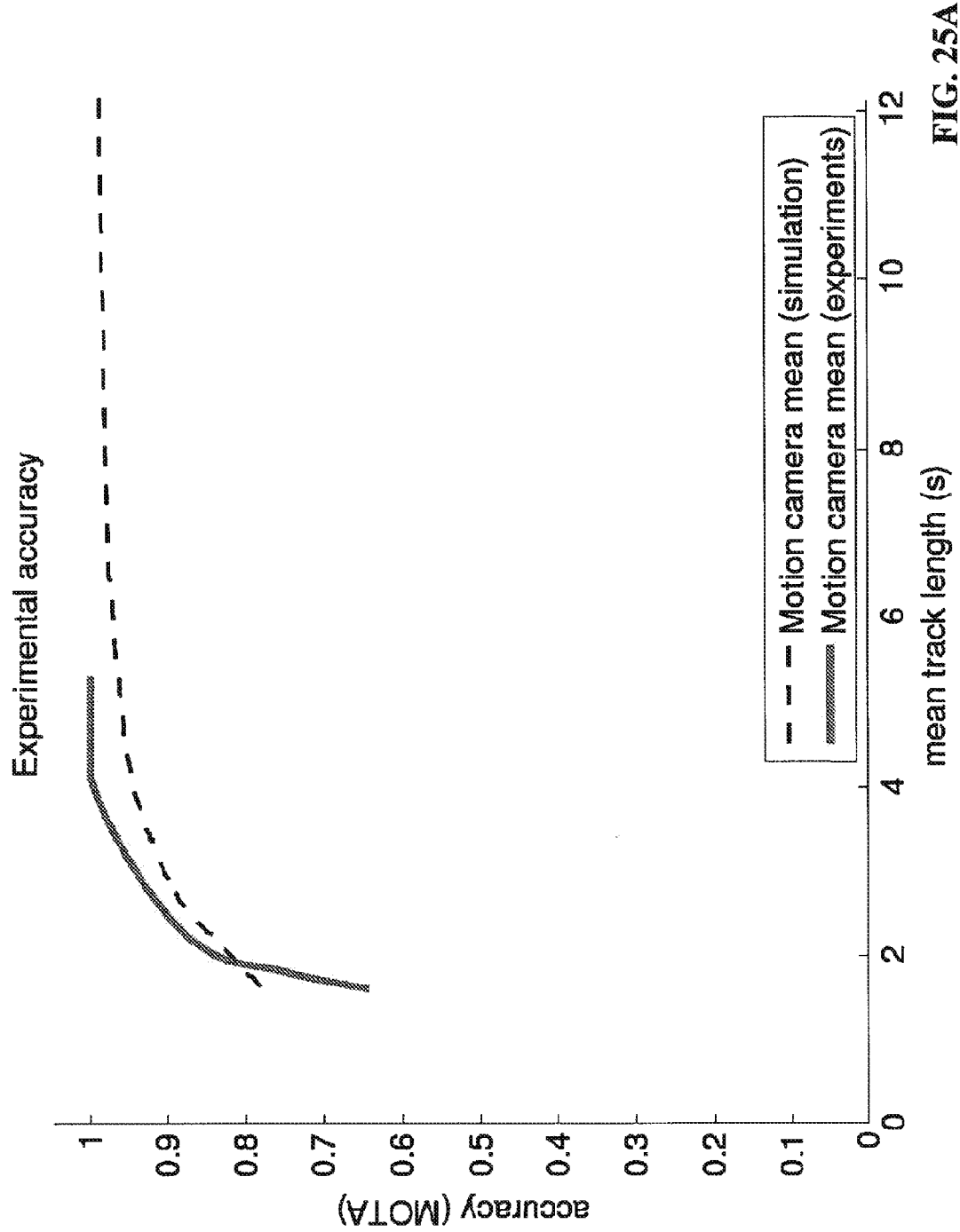
FIG. 25A illustrates experimental results from overlapping up to four 1-person experiments at a time in accordance with one or more aspects of the disclosure. The experimentally-found accuracy closely follows the trend from the simulation results.

We performed two sets of experiments in the person-identification testbed. On the first set, we acquired 15 experimental traces where 1 person freely walked for 1 minute within the 4-node testbed carrying the inertial sensor. We, then, superimposed N of these 1-person traces onto one another to generate datasets where the ground truth was perfectly known for all N people involved. The number N of people was varied from 1 to 4, with 5 repetitions each. The results, shown in FIG. 25a as a function of interambiguity time, are approximately in agreement with the trend found in the simulations (dashed line).

As can be seen from the plot, the interambiguity time in the experiments were found to be quite short, lower than 4.5 s. This was caused by two factors: (1) the large density of people for such a small deployment caused frequent proximity ambiguities, and (2) due to frame differencing the cameras often failed to detect people who slowed down before making a turn, leading to high track fragmentation. Nonetheless, accuracy exceeded 90% for interambiguity rates as high as one every 3.5 seconds.

For the second set of experiments, we evaluated the capability of the system to disambiguate between two people after an ambiguity. For this, we acquired 36 traces where the two people walked from one end of the deployment to the other, in trajectories that lasted approximately 4 to 5 seconds, spanning 3 different camera nodes on average. Only one of the persons was carrying an inertial sensor node.

These traces are quite challenging given their short duration, and serve as a stress test on the ability of the system to quickly recover from ambiguities.

Figure 25B:
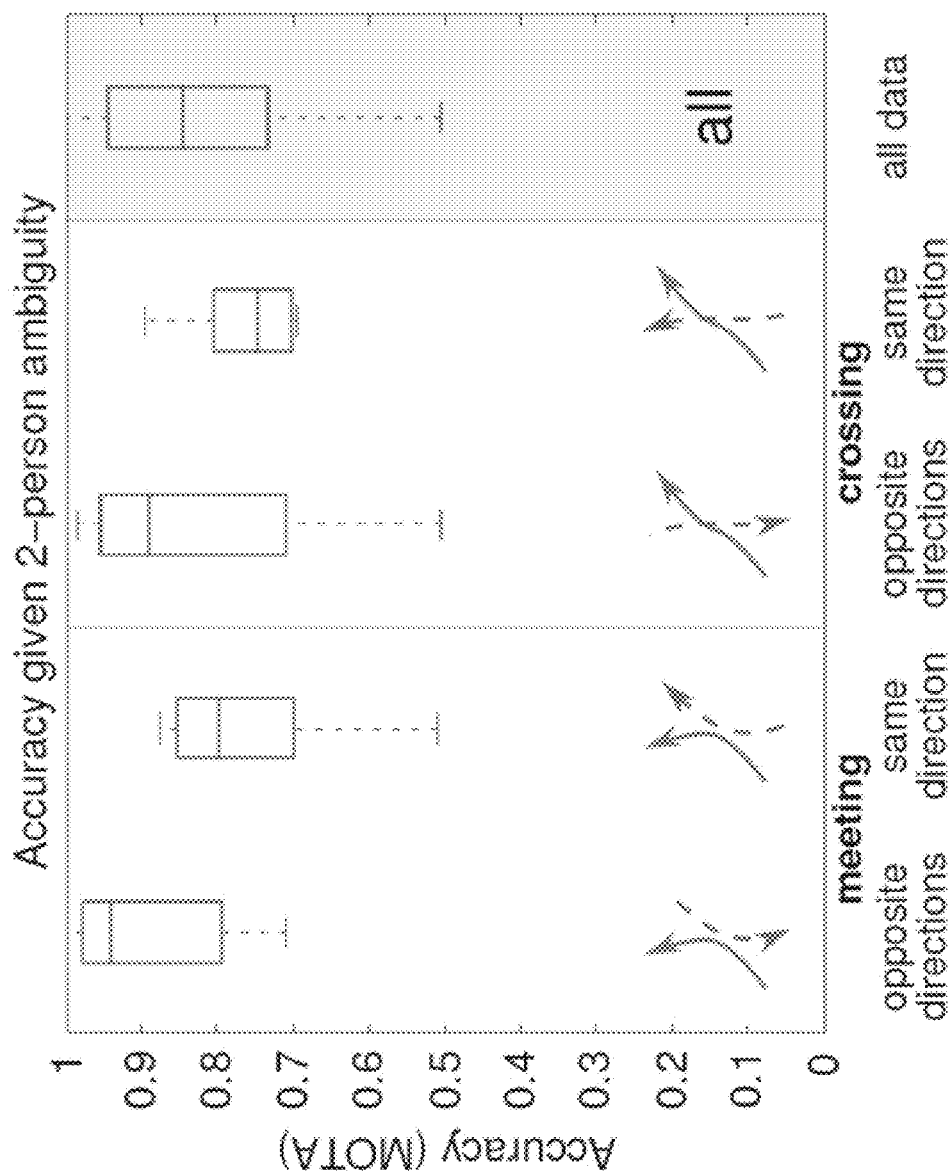
FIG. 25B illustrates experimental results for 36 ambiguity-resolution tests. The median accuracy for all experiments was found to be 84.37%, as predicted by the simulations.

In one embodiment, there were 9 experimental runs comprising one of four scenarios: (1) two people walking in opposite directions, crossing paths in the middle of the trace; (2) two people walking in opposite directions, meeting in the middle of the trace, but not crossing paths; (3) two people walking in the same direction, crossing paths; (4) two people walking in the same direction, meeting but not crossing. The accuracy of the identification method is shown in FIG. 25B.

The average accuracy (e.g., median of the set of 'all data') was found to be 0.8437. This agrees with the simulation for tracks lasting 2.25 s—or approximately half the duration of the traces, given that the piecewise-unambiguous tracks were interrupted at the middle. As expected, the accuracy for opposite-direction traces is on average higher than for same-direction ones, owing to a larger contribution from the magnetometer measurements. Finally, of all simulations and experiments, the worst case running time for the proposed identification method was approximately 6× faster than real-time.

Figure 26:
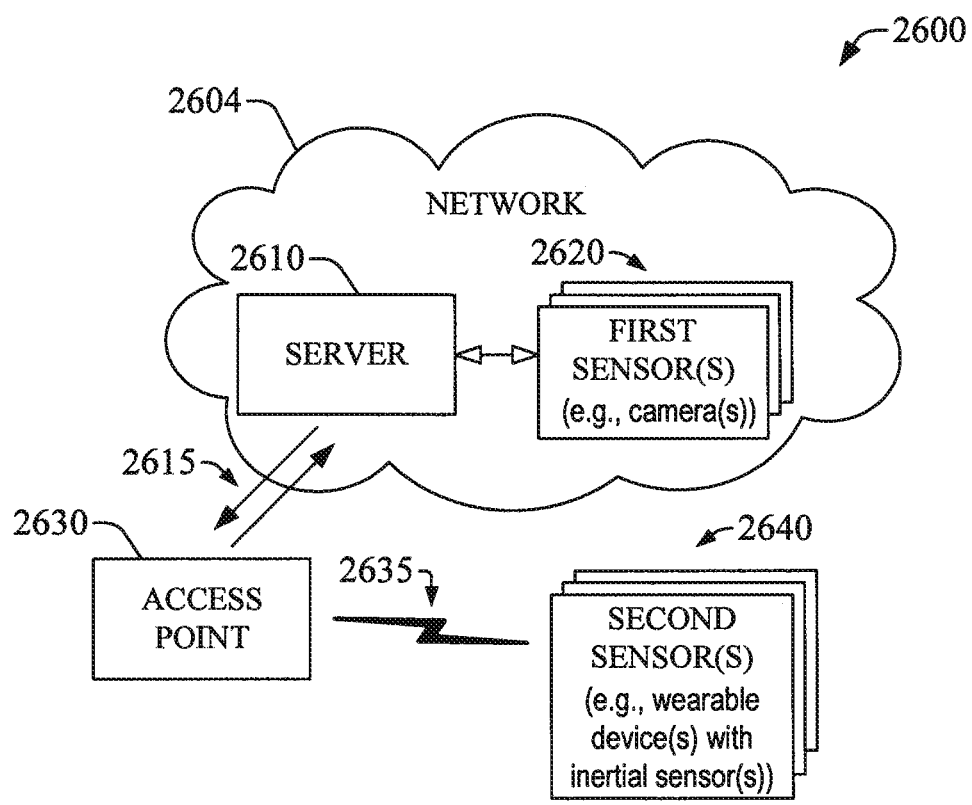
FIG. 26 illustrates an example system for subject sensing in accordance with aspects of the subject disclosure.

FIG. 26 illustrates an example system 2600 for subject sensing in accordance with one or more aspects described herein. In one aspect, the functional elements of the system 2600 can operate in accordance with the various features of the disclosure. As illustrated, the system 2600 can include a network of sensors 2604 than can comprise a server 2610, or any other computing device, functionally coupled to one or more first sensors 2620. In one embodiment the first sensor(s) 2620 can comprise a plurality of sensors, such as a plurality of cameras (e.g., CCD cameras or conventional cameras). As described herein, in certain embodiments, the first sensor(s) 2620 can generate (e.g., collect or measure) location information associated with a plurality of subjects (human and/or non-human subjects). A sensor of the first sensor(s) 26320 can communicate such location information to the server 2610 for analysis. In one aspect, the server 2610 can perform information analysis in accordance with one or more aspects of the disclosure. For instance, the server 2610 can embody or can comprise at least a portion of the DCL layer and related functionality described herein. In certain embodiments, the server 2610 also can embody or can comprise the TI layer and related functionality. In other embodiments, the server 2610 can embody can comprise at least a portion of the DCL layer and the TI layer.

In one aspect, the server 2610 can be functionally coupled to a wireless access point 2630 which can exchange (e.g., transmit and/or receive) information with one or more second sensor(s) 2640. The wireless access point 2630 can exchange information with at least one of the one or more sensors 2640 via a wireless link 2635 comprising a downstream link (DL) and an upstream link (UL). The access point 2630 can communicate with a sensor of the second sensor(s) 2640 according to one or more radio technology protocols, including point-to-point protocols or cellular radio protocols. In one embodiment, the second sensor(s) 2640 can be contained in at least one wearable device (such as mobile phones or other mobile computing devices) having at least one inertial sensor.

In one aspect, the server 2610 can transmit location information to a sensor of the second sensor(s) 2640 or can receive location information from such sensor in accordance with one or more aspects of the subject disclosure. In certain implementations, the server 2610 can receive first location information of a plurality of subjects in an environment from at least one sensor of the first sensor(s) 2620 in accordance with one or more aspects of the disclosure. In addition, in such implementations, the server 2610 can receive second location information of at least one subject of the plurality of subjects from at least one sensor (e.g., an inertial sensor, such as an accelerometer or magnetometer) of the second sensor(s) 2640. In response to receiving such location information, the server 2610 can match the second location information with the first location information in accordance with one or more aspects described herein. In response to such matching, the server 2610 can assign a subject location to the at least one subject of the plurality of subjects based on the first location information in accordance with one or more aspects of the subject disclosure. In addition or in the alternative, in response to such matching, the server 2610 can assign a subject identity (ID) to the at least one subject based on identifying information associated with the at least one sensor of the second sensor(s) 2640.

In the example system 2600, the second sensor(s) 2640 can embody or can comprise the TI layer described herein.

In one aspect, the second sensor(s) 2640 can comprise a wearable device, such as a mobile phone, in accordance with aspects described herein. The wearable device can comprise at least one inertial sensor (e.g., a magnetometer, and accelerometer, a combination thereof, or the like). In another aspect, in accordance with one or more aspects of the disclosure, the wearable device (e.g., a mobile phone) can be configured to generate information indicative of a location-to-ID match comprising a subject location and a subject ID. In addition or in the alternative, the wearable device can be configured to supply the information indicative of a location-to-ID match comprising the subject location and the subject ID in accordance with aspects described herein. It should be appreciated that generation of such location-to-ID match can permit tracking subjects or products as the wearable device changes ID, or as it passes from a first subject to a second subject or a first product to a second product.

Figure 27:
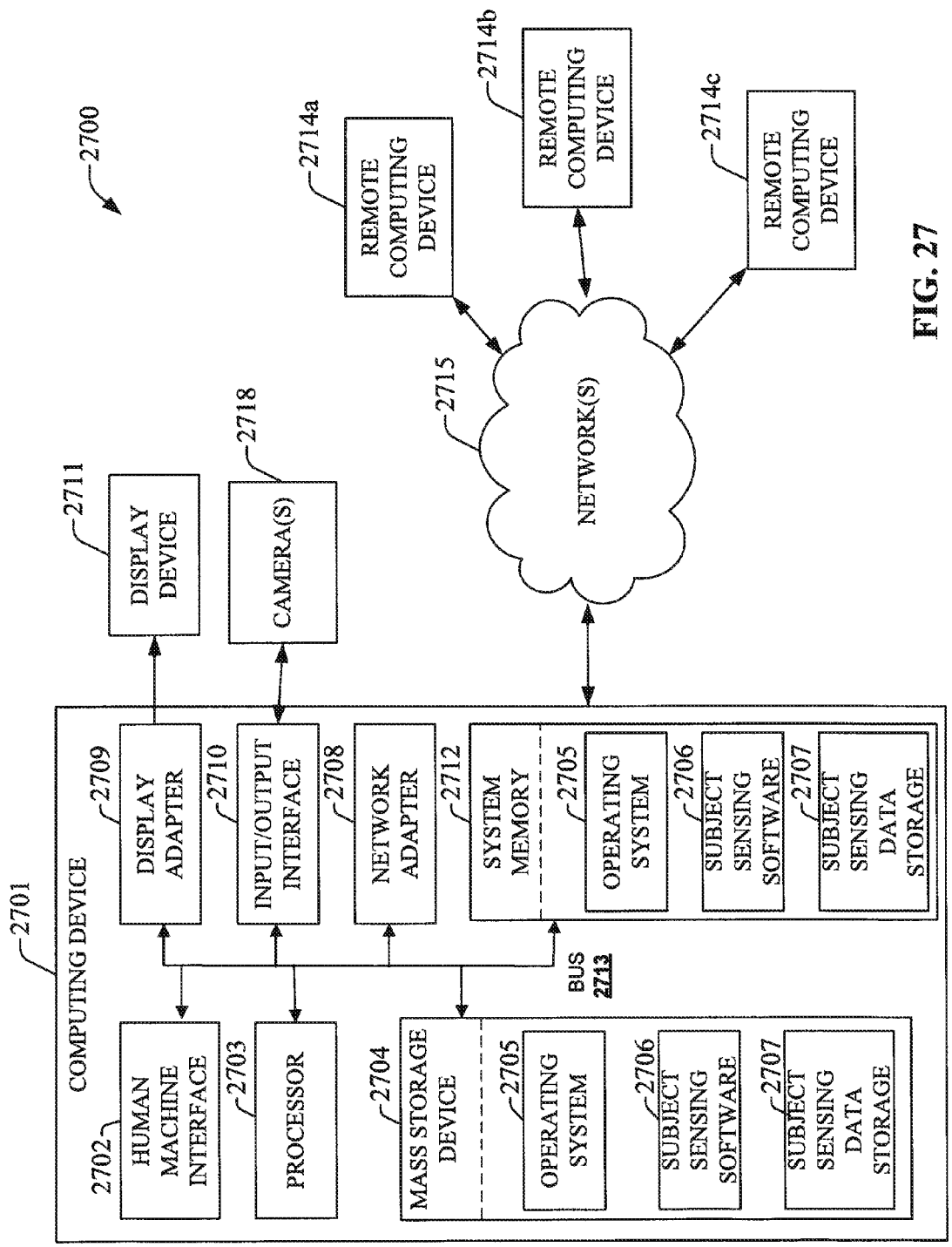
FIG. 27 illustrates a block diagram of an exemplary operating environment in accordance with one or more aspects of the disclosure.

FIG. 27 illustrates a block diagram of an exemplary operating environment 2700 having a computing device 2701 that enables various features of the disclosure and performance of the various methods disclosed herein. Computing device 2701 can embody analysis unit 130. This exemplary operating environment 2700 is only an example of an operating environment and is not intended to suggest any limitation as to the scope of use or functionality of operating environment architecture. Neither should the exemplary operating environment 2700 be interpreted as having any dependency or requirement relating to any one or combination of functional elements (e.g., units, components, adapters, or the like) illustrated in such exemplary operating environment.

The various embodiments of the disclosure can be operational with numerous other general purpose or special purpose computing system environments or configurations. Examples of well known computing systems, environments, and/or configurations that can be suitable for use with the systems and methods of the disclosure comprise personal computers, server computers, laptop devices or handheld devices, and multiprocessor systems. Additional examples comprise mobile devices, programmable consumer electronics, network PCs, minicomputers, mainframe computers, distributed computing environments that comprise any of the above systems or devices, and the like.

The processing effected in the disclosed systems and methods can be performed by software components. In one aspect, the disclosed systems and methods can be described in the general context of computer-executable instructions, such as program modules, being executed by one or more computers, such as computing device 2701, or other computing devices. Generally, program modules comprise computer code, routines, programs, objects, components, data structures, etc. that perform particular tasks or implement particular abstract data types. The disclosed methods also can be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 2701. The components of the computer 2701 can comprise, but are not limited to, one or more processors 2703, or processing units 2703, a system memory 2712, and a system bus 2713 that couples various system components including the processor 2703 to the system memory 2712. In the case of multiple processing units 2703, the system can utilize parallel computing.

In general, a processor 2703 or a processing unit 2703 refers to any computing processing unit or processing device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally or alternatively, a processor 2703 or processing unit 2703 can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors or processing units referred to herein can exploit nano-scale architectures such as, molecular and quantum-dot based transistors, switches and gates, in order to optimize space usage or enhance performance of the computing devices that can implement the various aspects of the subject disclosure. Processor 2703 or processing unit 2703 also can be implemented as a combination of computing processing units.

The system bus 2713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 2713, and all buses specified in this specification and annexed drawings also can be implemented over a wired or wireless network connection and each of the subsystems, including the processor 2703, a mass storage device 2704, an operating system 2705, subject sensing software 2706, subject sensing data storage 2707, a network adapter 2708, system memory 2712, an Input/Output Interface 2710, a display adapter 2709, a display device 2711, and a human machine interface 2702, can be contained within one or more remote computing devices 2714*a,b,c* at physically separate locations, functionally coupled (e.g., communicatively coupled) through buses of this form, in effect implementing a fully distributed system.

Subject sensing software 2706 can configure the computing device 2701, or a processor thereof, to perform the weighing of moving objects in accordance with aspects of the disclosure. In scenarios in which computing device 2701 embodies the analysis unit 130, subject sensing software 2706 can configure such unit to perform the functionality described in the subject disclosure. Subject sensing software 2706 can be retained in a memory as a group of computer-accessible instructions, e.g., computer-readable instructions, computer-executable instructions, or computer-readable computer-executable instructions. In one aspect, the group of computer-accessible instructions can encode the methods of the disclosure (such as the exemplary methods illustrated in FIGS. 28-30). In another aspect, the the group of computer-accessible instructions can encode various formalisms (e.g., image segmentation) for computer vision tracking. Certain implementations of subject sensing software 2706 can include a compiled instance of such computer-accessible instructions, a linked instance of such computer-accessible instructions, a compiled and linked instance of such computer-executable instructions, or an otherwise executable instance of the group of computer-accessible instructions. An implementation of subject sensing software 2706 retained in a memory of the computing device 2701 can embody at least a portion of the DCL layer or at least a portion of the TI layer, wherein in response to execution of the implementation of the subject sensing software 2706 by the processor 2701, for example, implements the described functionality of the DCL layer and/or the TI layer.

Subject sensing data storage 2707 can comprise various types of data that can permit implementation (e.g., compilation, linking, execution, and combinations thereof) of the subject sensing software 2706. In one aspect, subject sensing data storage 2707 can comprise tracking data described herein, such as images of a non-empty set of physical objects, and data structures containing information associated with weighing of an object. The information can comprise tracking information, trajectory information, or weight information.

The computing device 2701 typically comprises a variety of computer readable media. Exemplary readable media can be any available media that is accessible by the computer 2701 and comprises, for example and not meant to be limiting, both volatile and non-volatile media, removable and non-removable media. The system memory 2712 comprises computer readable media in the form of volatile memory, such as random access memory (RAM), and/or non-volatile memory, such as read only memory (ROM). The system memory 2712 typically contains data (such as a group of tokens employed for code buffers) and/or program modules such as operating system 2705 and subject sensing software 2706 that are immediately accessible to and/or are presently operated on by the processing unit 2703. Operating system 2705 can comprise OSs such as Windows operating system, Unix, Linux, Symbian, Android, iOS, Chromium, and substantially any operating system for wireless computing devices or tethered computing devices.

In another aspect, computing device 2701 can comprise other removable/non-removable, volatile/non-volatile computer storage media. As illustrated, computing device 2701 comprises a mass storage device 2704 which can provide non-volatile storage of computer code (e.g., computer-executable instructions), computer-readable instructions, data structures, program modules, and other data for the computing device 2701. For instance, a mass storage device 2704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 2704, including by way of example, an operating system 2705, and subject sensing software 2706. Each of the operating system 2705 and subject sensing software 2706 (or some combination thereof) can comprise elements of the programming and the subject sensing software 2706. Data and code (e.g., computer-executable instruction(s)) can be retained as part of subject sensing software 2706 and can be stored on the mass storage device 2704. Subject sensing software 2706, and related data and code, can be stored in any of one or more databases known in the art. Examples of such databases comprise, DB2®, Microsoft® Access, Microsoft® SQL Server, Oracle®, mySQL, PostgreSQL, and the like. Further examples include membase databases and flat file databases. The databases can be centralized or distributed across multiple systems.

In another aspect, a user can enter commands and information into the computing device 2701 via an input device (not shown). Examples of such input devices comprise, but are not limited to, a camera; a keyboard; a pointing device (e.g., a "mouse"); a microphone; a joystick; a scanner (e.g., barcode scanner); a reader device such as a radiofrequency identification (RFID) readers or magnetic stripe readers; gesture-based input devices such as tactile input devices (e.g., touch screens, gloves and other body coverings or wearable devices), speech recognition devices, or natural interfaces; and the like. These and other input devices can be connected to the processing unit 2703 via a human machine interface 2702 that is coupled to the system bus 2713, but can be connected by other interface and bus structures, such as a parallel port, game port, an IEEE 1394 Port (also known as a Firewire port), a serial port, or a universal serial bus (USB).

In yet another aspect, a display device 2711 also can be functionally coupled to the system bus 2713 via an interface, such as a display adapter 2709. It is contemplated that the computer 2701 can have more than one display adapter 2709 and the computer 2701 can have more than one display device 2711. For example, a display device can be a monitor, an LCD (Liquid Crystal Display), or a projector. In addition to the display device 2711, other output peripheral devices can comprise components such as speakers (not shown) and a printer (not shown) which can be connected to the computer 2701 via Input/Output Interface 2710. Any step and/or result of the methods can be output in any form to an output device. Such output can be any form of visual representation, including, but not limited to, textual, graphical, animation, audio, tactile, and the like.

As illustrated, one or more camera(s) 2718 can be functionally coupled to the system bus 2713 through an I/O interface of the one or more I/O interface(s) 2710. Through the functional coupling through such I/O interface, the one or more camera(s) can be functionally coupled to other functional elements of the computing device. In one embodiment, the I/O interface, at least a portion of the system bus 2713, and system memory 2712 can embody a frame grabber unit that can permit receiving imaging data acquired by at least one of the one or more camera(s) 2718. Such frame grabber can be an analog frame grabber or a digital frame grabber, or a combination thereof. In case of an analog frame grabber, processor 2703 can provide analog-to-digital functionality and decoder functionality, and the I/O interface can include circuitry to collect the analog signal received from at least one camera of the one or more camera(s) 2718. In one aspect, in response to execution by processor 2703, subject sensing software 2706 can operate the frame grabber to receive imaging data in accordance with various aspects described herein. In one aspect, the one or more camera(s) 2718 can embody the one or more first sensor(s) 2620. In another aspect, the one or more camera(s) 2718 can embody the cameras network illustrated in FIG. 4.

The computing device 2701 can operate in a networked environment (e.g., an industrial environment) using logical connections to one or more remote computing devices 2714*a,b,c*, and equipment 2716. By way of example, a remote computing device can be a personal computer, portable computer, a mobile telephone, a server, a router, a network computer, a peer device or other common network node, and so on. Logical connections between the computer 2701 and a remote computing device 2714a,b,c can be made via a local area network (LAN) and a general wide area network (WAN). Such network connections can be implemented through a network adapter 2708. A network adapter 2708 can be implemented in both wired and wireless environments. Such networking environments can be conventional and commonplace in offices, enterprise-wide computer networks, intranets. The networking environments generally can be embodied in wireline networks or wireless networks (e.g., cellular networks, such as Third Generation (3G) and Fourth Generation (4G) cellular networks, facility-based networks (femtocell, picocell, Wi-Fi networks, etc.). A group of one or more network(s) 2715 can provide such networking environments. In one scenario, the one or more network(s) can comprise a LAN deployed in an industrial environment comprising the exemplary system 100 described herein. In such scenario, the computing device 110 can embody analysis unit 130, remote computing devices 614a,b,c can embody cameras of the one or more camera(s) 120, and equipment 2716 can comprise weighing platform 110.

As an illustration, application programs and other executable program components such as the operating system 2705 are illustrated herein as discrete blocks, although it is recognized that such programs and components reside at various times in different storage components of the computing device 2701, and are executed by the data processor(s) of the computer. An implementation of subject sensing software 2706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer-readable media can comprise "computer storage media," or "computer-readable storage media," and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The computing device 2701 also can embody a wearable device having one or more inertial sensors (e.g., magnetometer and/or accelerometers) as described herein. In such embodiments, the I/O interface 2710 can include a radio interface or radio unit having circuitry that permit wireless exchange of information with a wireless access point such as access point 2630. In such embodiments, the radio unit (not shown) can permit communication of various location information in accordance with one or more aspects of the disclosure. The radio unit can implement such communication in accordance with one or more radio communication protocols.

Figure 28:
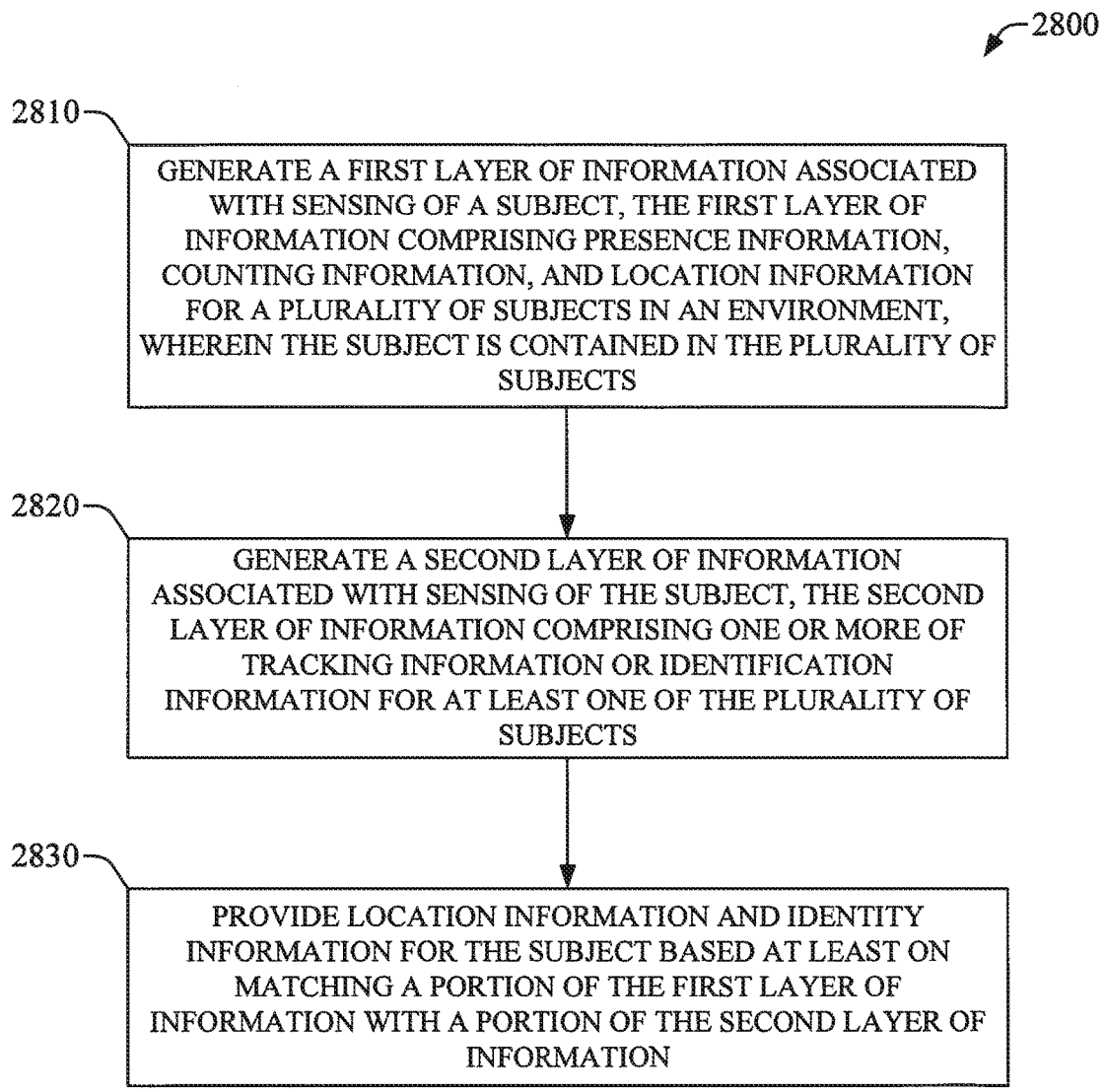
FIGS. 28-30 illustrate a flowchart of an example method for subject sensing according to one or more aspects of the subject disclosure.
Figure 29:
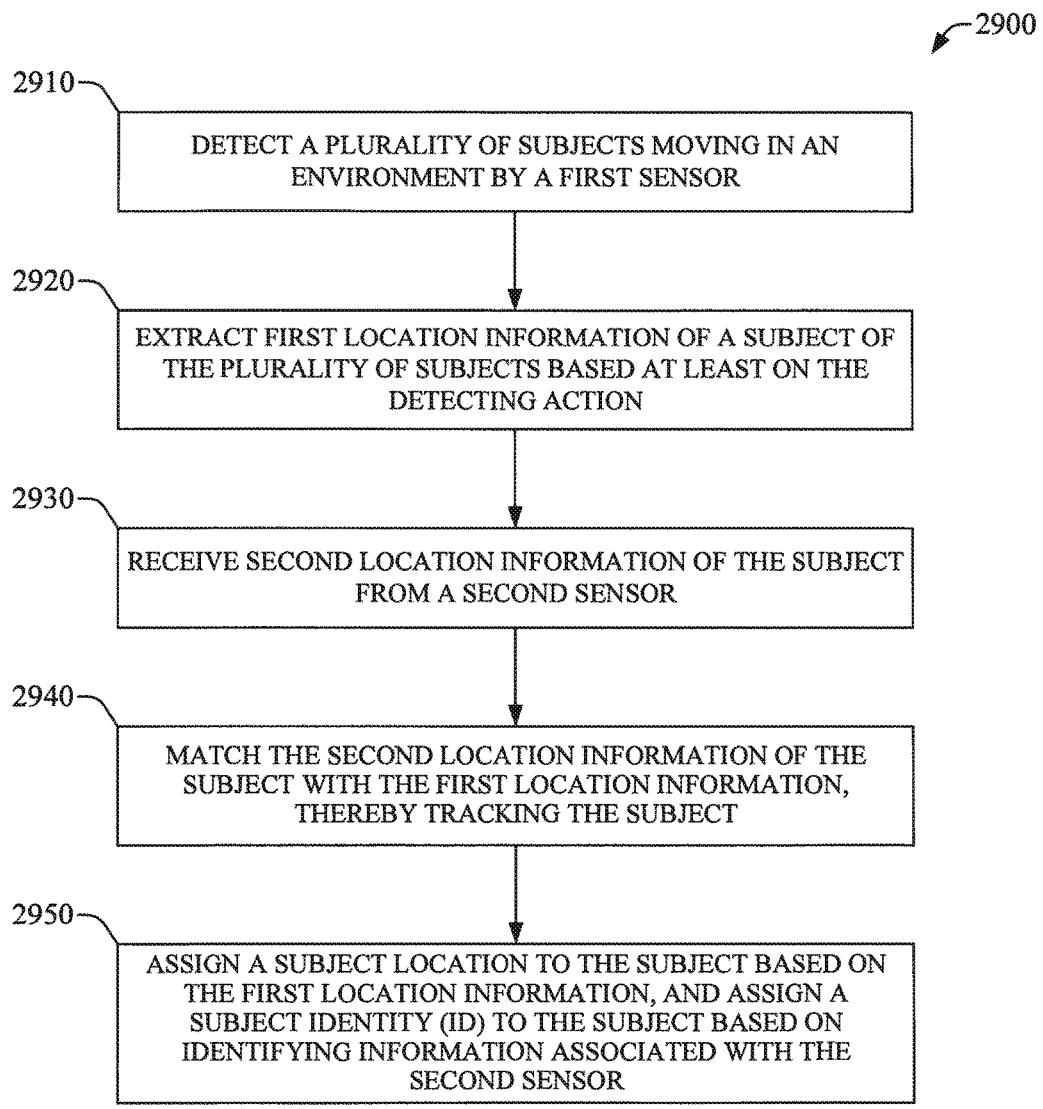
Figure 30:
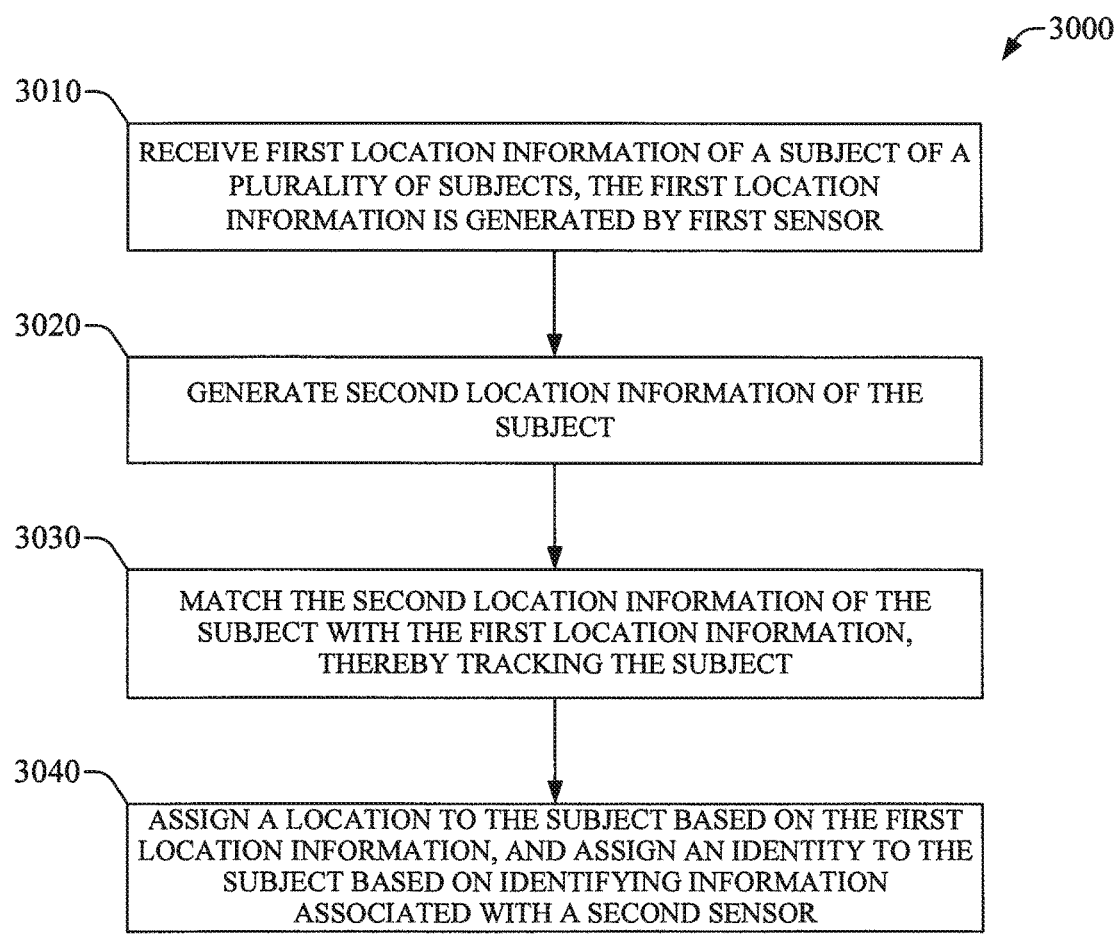

In view of the aspects described hereinbefore, an exemplary method that can be implemented in accordance with the disclosed subject matter can be better appreciated with reference to the flowcharts in FIGS. 28-30. For purposes of simplicity of explanation, the exemplary method disclosed herein is presented and described as a series of acts; however, it is to be understood and appreciated that the claimed subject matter is not limited by the order of acts, as some acts may occur in different orders and/or concurrently with other acts from that shown and described herein. For example, the various methods or processes of the subject disclosure can alternatively be represented as a series of interrelated states or events, such as in a state diagram. Furthermore, not all illustrated acts may be required to implement a method in accordance with the subject disclosure. Further yet, two or more of the disclosed methods or processes can be implemented in combination with each other, to accomplish one or more features or advantages herein described.

It should be further appreciated that the exemplary methods disclosed throughout the subject specification can be stored on an article of manufacture, or computer-readable medium, to facilitate transporting and transferring such methods to a computing device (e.g., a desktop computer, a mobile computer, a mobile telephone, a blade computer, a programmable logic controller, and the like) for execution, and thus implementation, by a processor of the computing device or for storage in a memory thereof.

FIG. 28 illustrates a flowchart of an example method 2800 for subject sensing according to one or more aspects of the subject disclosure. In one embodiment, the subject example method 2800 can be implemented (e.g., executed) by a computing device, such as computing device 2701, or a processor functionally coupled therein. At block 2810, a first layer of information associated with sensing of a subject is generated, the first layer of information can comprise presence information, counting information, and location information for a plurality of subjects in an environment, wherein the subject is contained in the plurality of subjects. At block 2820, a second layer of information associated with sensing of the subject is generated, the second layer of information comprising one or more of tracking information or identification information for at least one of the plurality of subjects. At block 2830, location information and identity information for the subject is provided, the location information and the identity information can be based at least on matching a portion of the first layer of information with a portion of the second layer of information.

FIG. 29 illustrates a flowchart of an example method 2900 for subject sensing according to one or more aspects of the subject disclosure. In one embodiment, the subject example method 2800 can be implemented (e.g., executed) by a computing device, such as computing device 2701, or a processor functionally coupled therein. At block 2910, a plurality of subjects moving in an environment is detected by a first sensor. Implementation on the block 2910 can be referred to as the "detecting action." At block 2920, first location information of a subject of the plurality of subjects is extracted. In one aspect, the first location information can be based at least on the detecting action and information (e.g., data or metadata) generated in response to such action. At block 2930, second location information of the subject is received from a second sensor. At block 2940, the second location information of the subject is matched with the first location information, thereby tracking the subject. In response to the matching action, block 2950 can be implemented, in which a subject location is assigned to the subject based on the first location information, and a subject identity (ID) is assigned to the subject based on identifying information associated with the second sensor.

FIG. 30 illustrates a flowchart of an example method 3000 for subject sensing according to one or more aspects of the subject disclosure. In one embodiment, the subject example method 2800 can be implemented (e.g., executed) by a computing device, such as computing device 2701, or a processor functionally coupled therein. At block 3010, first location information of a subject of a plurality of subjects is received. In one aspect, the first location information can be generated by first sensor. At block 3020, second location information of the subject is generated. At block 3030, the second location information of the subject is matched with the first location information, thereby tracking the subject. In response to the matching action, block 3040 can be implemented, in which and, in response to the matching, a location is assigned to the subject based on the first location information, and an identity is assigned to the subject based on identifying information associated with a second sensor.

8. CONCLUSION

System and methods are disclosed for subject sensing (human subjects and non-human subjects are contemplated). In certain embodiments, the disclosed systems and methods can solve the Basic Human Sensing Problem by fusing information from cameras placed in the environment with acceleration and magnetic field measurements from mobile phones carried by each person. This can be accomplished by dividing the problem into two parts: (1) Detection, Counting and Localization, handled by the DCL layer; (2) Tracking and Identification, handled by the TI layer. This combination of wearable sensors and infrastructure sensors presents a number of advantages. For one, the wearable sensors (mobile phones) allow us to track people even across large sensing gaps and even identify them with unique IDs, neither of which can be reliably done with infrastructure sensors alone. A second advantage is that, differently from other instrumented solutions, the proposed system is still able to detect, count, and localize people even when they are not carrying a phone. Thus, the system gracefully degrades from DCL/TI mode to simply DCL on a per-person basis if needed In one aspect, the disclosed simulations and experiments demonstrate: (1) A localization precision of 7.15 cm using a low-sampling-rate camera, which can increase to $\approx 3$ cm for a regular 30 Hz image sensor; (2) An ambiguity resolution accuracy of above 84% (median) in experiments; (3) And, finally, an identification accuracy above 95% even in scenarios where people crossed paths or met every $\approx 3.5$ s (experimental) or $\approx 4.0$ s (simulated). Of course, this high identification accuracy also means the system is able to automatically correct poor ambiguity-resolution decisions in the long run.

In certain embodiments, adversarial scenarios where even uninstrumented people need to be tracked and identified can be contemplated. In additional or alternative embodiments, overcrowded environments where the mean inter-ambiguity time is shorter than 3 s also are contemplated. In such embodiments, supplementary signal features, or even addition of other sensing modalities, can be implemented for data generation and processing in accordance with aspects of the disclosure. It such be appreciated that the formalisms described herein can be extended to model such embodiments in view that such formalism are largely independent of the choice of sensors. For instance, tracking and identification can be achieved by incorporating image features (such as SIFT, HoG, and color histograms) into the camera measurements $\{y_k^j\}$, or signal strength measurements and even gait signatures into the wearable data $\{w_k^i\}$.

It should be noted that the DCL layer can be deployed in home networks, wherein the DCL layer can comprise the iMote2 implementation described in Section 7. Such deployment can operate for extended periods (e.g., several months) at a time alongside other sensor modalities such as PIR sensor nodes. In effect, each camera node in these deployments acts as an evolved PIR, in the sense that in addition to person-detection they are also able to count and localize each moving person—while being unable to transmit full videos, due to bandwidth and processing constraints.

In additional or alternative embodiments, the DCL layer can be developed constructed in silicon within the imager chips themselves, so that image(s) remain available in-chip rather than off-chip. Such development can permit cheap, privacy-preserving DCL layer sensors that can displace the ever-present PIRs in a new class of smart buildings.

It should be appreciated that while various features of the disclosure are illustrated for human sensing, the disclosure is not so limited and can be applied to sensing of subjects that are human or non-human, such as animals or non-living entities, such as vehicles fitted with inertial sensors and related communication circuitry. In addition, as described herein, mobile device comprising inertial sensors are one example of wearable devices having sensors that can provide location information (e.g., position, orientation, etc.) in accordance with the disclosure.

In various embodiments, the systems and methods of the subject disclosure for subject sensing can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., Expert inference rules generated through a neural network or production rules from statistical learning).

While the systems, devices, apparatuses, protocols, processes, and methods have been described in connection with exemplary embodiments and specific illustrations, it is not intended that the scope be limited to the particular embodiments set forth, as the embodiments herein are intended in all respects to be illustrative rather than restrictive.

Unless otherwise expressly stated, it is in no way intended that any protocol, procedure, process, or method set forth herein be construed as requiring that its acts or steps be performed in a specific order. Accordingly, in the subject specification, where description of a process or method does not actually recite an order to be followed by its acts or steps or it is not otherwise specifically recited in the claims or descriptions of the subject disclosure that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

It will be apparent to those skilled in the art that various modifications and variations can be made in the subject disclosure without departing from the scope or spirit of the subject disclosure. Other embodiments of the subject disclosure will be apparent to those skilled in the art from consideration of the specification and practice of the subject disclosure as disclosed herein. It is intended that the specification and examples be considered as non-limiting illustrations only, with a true scope and spirit of the subject disclosure being indicated by the following claims.

What is claimed is:

1. A method for subject sensing, comprising:
generating a first layer of information associated with sensing of a subject, the first layer of information comprising location information for a plurality of subjects in an environment, wherein the subject is contained in the plurality of subjects;
generating a second layer of information associated with sensing of the subject, the second layer of information comprising tracking information, wherein the tracking information comprises an inertial measurement of the subject;
generating a 2-tuple indicator of a location of the subject that maximizes a likelihood of matching a portion of the first layer of information with a portion of the second layer of information; and
associating, for the subject, identification information with location information based on the 2-tuple indicator.

2. The method of claim 1, wherein generating the first layer of information comprises producing a Boolean image having a value indicative of the likelihood the subject is detected.

3. The method of claim 2, wherein generating the first layer of information further comprises classifying a plurality of pixels in the Boolean image into a set of categories having a cardinality indicative of a number of subjects in the plurality of subjects.

4. The method of claim 3, wherein generating the first layer of information further comprises computing a centroid for each category of the set of categories, each centroid is indicative of a location of each subject in the plurality of subjects.

5. A method for subject sensing, comprising:
detecting a plurality of subjects moving in an environment by a first sensor;
extracting first location information of a subject of the plurality of subjects based at least on the detecting action;
receiving second location information of the subject from a second sensor, wherein the second location information comprises an inertial measurement of the subject;
generating a 2-tuple indicator of a location of the subject that maximizes a likelihood of matching second location information of the subject with the first location information, thereby tracking the subject; and
assigning, based on the generated 2-tuple indicator, a subject location to the subject based on the first location information, and assigning a subject identity (ID) to the subject based on identifying information associated with the second sensor.

6. The method of claim 5, further comprising supplying information indicative of a location-to-ID match comprising the subject location and the subject ID.

7. The method of claim 5, wherein extracting the first location information comprises extracting anonymous coordinates of the person.

8. The method of claim 5, wherein matching the second location information of the subject with the first location information is performed in real-time.

9. The method of claim 5, wherein the first sensor is a camera and the camera is one of a conventional camera or a feature-detecting camera.

10. The method of claim 9, wherein the second sensor is a wearable sensor.

11. The method of claim 5, wherein the second sensor further comprises a radiofrequency identification (RFID) device.

12. A method for subject sensing, comprising:
receiving first location information of a subject of a plurality of subjects, the first location information is generated by first sensor;
generating second location information of the subject, where in the second location information comprises an inertial measurement of the subject;
generating a 2-tuple indicator of a location of the subject that maximizes a likelihood of matching second location information of the subject with the first location information, thereby tracking the subject;
assigning to the subject, in response to generating the 2-tuple indicator, a location based on the 2-tuple indicator, and an identity based on identifying information associated with a second sensor.

13. The method of claim 12, wherein the first sensor is a camera and the camera is one of a conventional camera or a feature-detecting camera.

14. The method of claim 12, wherein the the second sensor is a wearable sensor.

15. The method of claim 12, wherein the second sensor further comprises a radiofrequency identification (RFID) device.

16. A system for subject sensing, comprising:
a plurality of sensors; and
a computing device for information analysis, the computing device functionally coupled to the plurality of sensors and configured to:
transmit first location information of a plurality of subjects to a wearable device, the first location information is generated by at least one of the plurality of sensors,
receive, from the wearable device, second location information associated with a subject of the plurality of subjects, wherein the second location information comprises an inertial measurement of the subject,
generate a 2-tuple indicator of a location of the at least one of the plurality of subjects that maximizes a likelihood of matching the second location information with the first location information and,
assign to the subject, in response to generating the 2-tuple indicator, a subject location based on the 2-tuple indicator, and a subject identity (ID) based on identifying information associated with the wearable device.

17. The system of claim 16, wherein the plurality of sensors comprises a plurality of cameras.

18. The system of claim 16, wherein the wearable device is configured to generate information indicative of a location-to-ID match comprising the subject location and the subject ID.

19. The system of claim 18, wherein the wearable device is configured to supply the information indicative of a location-to-ID match comprising the subject location and the subject ID.

20. The method of claim 1, wherein the indicator of location of the subject further comprises one or more of identification information for at least one of the plurality of subjects or magnetometer data for at least one of the plurality of subjects.

21. The method of claim 16, wherein the wearable device comprises an accelerometer and a wireless transmitter.

\* \* \* \* \*